United States Patent
Yoshida

(10) Patent No.: US 10,034,344 B2
(45) Date of Patent: Jul. 24, 2018

(54) CONTROL INTERFACE FACILITY MANAGEMENT SYSTEM

(71) Applicant: Kenji Yoshida, Tokyo (JP)

(72) Inventor: Kenji Yoshida, Tokyo (JP)

( * ) Notice: Subject to any disclaimer, the term of this patent is extended or adjusted under 35 U.S.C. 154(b) by 0 days.

(21) Appl. No.: 14/649,636

(22) PCT Filed: Dec. 5, 2013

(86) PCT No.: PCT/JP2013/082748
§ 371 (c)(1),
(2) Date: Jun. 4, 2015

(87) PCT Pub. No.: WO2014/088081
PCT Pub. Date: Jun. 12, 2014

(65) Prior Publication Data
US 2015/0319821 A1 Nov. 5, 2015

(30) Foreign Application Priority Data
Dec. 5, 2012 (JP) ................. 2012-266454

(51) Int. Cl.
*G06K 19/00* (2006.01)
*H05B 33/08* (2006.01)
(Continued)

(52) U.S. Cl.
CPC ......... *H05B 33/0863* (2013.01); *G05B 15/02* (2013.01); *G06F 3/0321* (2013.01);
(Continued)

(58) Field of Classification Search
USPC .................. 235/435, 439, 454, 462
See application file for complete search history.

(56) References Cited

U.S. PATENT DOCUMENTS 7,281,664 B1 * 10/2007 Thaeler ............... G06F 3/03545
235/462.46
2007/0063050 A1 * 3/2007 Attia ................. G06F 17/30879
235/462.46
(Continued)

FOREIGN PATENT DOCUMENTS

EP  2 161 947 A1  3/2010
EP  2 479 507 A1  7/2012
(Continued)

OTHER PUBLICATIONS

International Search Report dated Mar. 18, 2014, issued in corresponding application No. PCT/JP2013/082748, (1 page).
(Continued)

*Primary Examiner* — Matthew Mikels
(74) *Attorney, Agent, or Firm* — Westerman, Hattori, Daniels & Adrian, LLP

(57) ABSTRACT

A printed matter, on which a dot pattern, in which a dot code corresponding to the control operation of equipment to be controlled is encoded; a storage that stores a table that includes a correspondence between the dot code and the control operation of the equipment; a remote control device that images the dot pattern, decodes the dot code, and transmits the decoded dot code; and an interface device that performs processing of receiving the dot code, processing of specifying the control operation for the equipment to be controlled based on the dot code, and processing of transmitting the control operation as a control signal to the equipment to be controlled, where the table stored in the storage means includes a correspondence between the dot code and a location where the equipment is installed.

33 Claims, 43 Drawing Sheets

(51) Int. Cl.
G05B 15/02 (2006.01)
G06F 17/16 (2006.01)
G06F 3/03 (2006.01)
G06F 3/0488 (2013.01)
G06F 3/0354 (2013.01)
G08C 17/00 (2006.01)

(52) U.S. Cl.
CPC ...... *G06F 3/03545* (2013.01); *G06F 3/04883* (2013.01); *G06F 17/16* (2013.01); *G08C 17/00* (2013.01); *H05B 33/0854* (2013.01); *H05B 33/0872* (2013.01)

(56) References Cited

U.S. PATENT DOCUMENTS

| | | | |
|---|---|---|---|
| 2009/0091530 A1 | 4/2009 | Yoshida | |
| 2010/0116888 A1* | 5/2010 | Asami | G06K 7/10722 235/454 |
| 2010/0189367 A1* | 7/2010 | van der Merwe | G06K 9/183 382/217 |
| 2010/0321502 A1 | 12/2010 | Yoshida | |
| 2011/0006108 A1 | 1/2011 | Yoshida | |
| 2012/0208592 A1* | 8/2012 | Davis | H04W 4/001 455/556.1 |

FOREIGN PATENT DOCUMENTS

| | | |
|---|---|---|
| JP | 2003-324782 A | 11/2003 |
| JP | 2008-262856 A | 10/2008 |
| JP | 4203525 B1 | 1/2009 |
| JP | 4275726 B1 | 6/2009 |
| JP | 2012-086570 A | 5/2012 |

OTHER PUBLICATIONS

Supplementary European Search Report dated Jun. 24, 2016, issued in counterpart European Patent Application No. 13860976.3 (7 pages).

* cited by examiner

FIG. 14A

| CODE VALUE |
|---|

FIG. 14B

| X COORDINATE VALUE | Y COORDINATE VALUE |
|---|---|

FIG. 14C

| CODE VALUE | X COORDINATE VALUE | Y COORDINATE VALUE |
|---|---|---|

$$x_0 = \frac{\sum_{i=1}^{4} x_i}{4}, y_0 = \frac{\sum_{i=1}^{4} y_i}{4}$$

INFORMATION DOT

REFERENCE DOT

INFORMATION DOT

INFORMATION DOT

REFERENCE DOT

BLOCK TO BE ARBITRARILY READ

L-SHAPED REFERENCE DOT

BLOCK TO BE ARBITRARILY READ

FIG. 59

| FIRST (= SECOND) VERTICAL REFERENCE DOTS | FIRST (= SECOND) HORIZONTAL REFERENCE DOTS | FIRST, SECOND HORIZONTAL INFORMATION DOTS FIRST, SECOND VERTICAL INFORMATION DOTS |
|---|---|---|
| ①(8)→②(10)→③(12) 1 PATTERN | ①(9)→②(10)→③(11) | ①(9)→②(10)→③(11) |
| | ①(9)→③(11)→②(10) | ①(9)→③(11)→②(10) |
| | ②(10)→①(9)→③(11) | ②(10)→①(9)→③(11) |
| | ②(10)→③(11)→①(9) | ②(10)→③(11)→①(9) |
| | ③(11)→①(8)→②(9) | ③(11)→①(8)→②(9) |
| | ③(11)→②(10)→①(9) | ③(11)→②(10)→①(9) |
| | ①(9)→①(9)→②(12) | ①(9)→①(9)→②(12) |
| | ①(9)→②(12)→①(9) | ①(9)→②(12)→①(9) |
| | ②(12)→①(9)→①(9) | ②(12)→①(9)→①(9) |
| | ①(8)→②(11)→②(11) | ①(8)→②(11)→②(11) |
| | ②(11)→①(8)→②(11) | ②(11)→①(8)→②(11) |
| | ②(11)→②(11)→①(8) | ②(11)→②(11)→①(8) |
| | ①(10)→①(10)→①(10) | ①(10)→①(10)→①(10) |
| | 13 PATTERNS | $13^4$ PATTERNS |
| TOTAL | $13^5$ = 371,293 PATTERNS | |

FIG. 63A
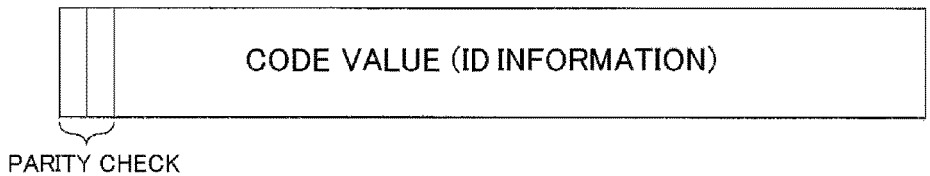
FIG. 63B
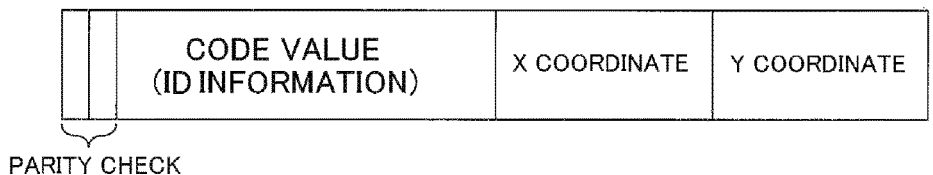
FIG. 63C
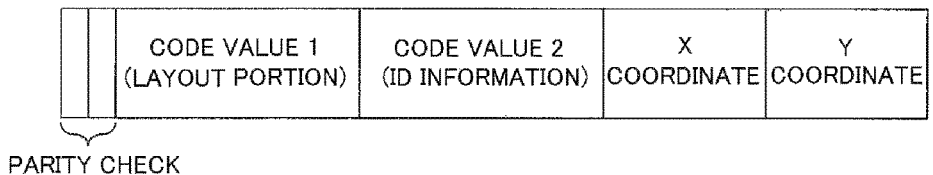
FIG. 64
| TIME | CONTROL INFORMATION |
|---|---|
| 7:00 | SET TEMPERATURE 29°C : OPERATE HALF |
| 9:00 | SET TEMPERATURE 29°C : OPERATE ALL |
| 12:00 | SET TEMPERATURE 28°C : OPERATE ALL |
| 17:00 | SET TEMPERATURE 29°C : OPERATE ALL |
| 19:00 | SET TEMPERATURE 29°C : OPERATE HALF |
| 22:00 | STOP ALL |

CONTROL INTERFACE FACILITY MANAGEMENT SYSTEM

FIELD OF THE INVENTION

The present invention relates to a remote control device, an interface device that controls various equipment, or the interface device and sensors. In particular, the present invention relates to a technique of controlling power distribution equipment, lighting equipment, air conditioning equipment, ventilating equipment, locking equipment, audio equipment and other equipment by a remote control device that uses a dot code technique or sensors.

BACKGROUND OF THE INVENTION

There have been known facility management systems that remotely operate equipment, such as power distribution equipment, lighting equipment, air conditioning equipment, ventilating equipment, locking equipment, audio equipment and other equipment inside a building. As one kind of such techniques, Non-Patent Literature 1 proposes an energy management system (EMS) that controls a device for visualizing power consumption and saving energy and controls renewable energy, such as a solar power generator, and a condenser thereof in response to demands for lower power and energy use.

EMS is called as HEMS (Home Energy Management System), BEMS (Building Energy Management System), FEMS (Factory Energy Management System), or CEMS (Cluster/Community Energy Management System) depending on the object, of which energy is controlled.

HEMS is for households; BEMS, for commercial buildings; FEMS, for factories; and CEMS, targeting a whole local area including all of these, while all of them share the basic system of controlling a monitor that shows power demand and power supply.

Non-Patent Literature 2 proposes a technique of controlling each lighting via a wireless communication, as a lighting control system that is a kind of energy management system. According to Non-Patent Literature 2, a tablet terminal and a smartphone are proposed to be used as a remote control device for controlling lighting.

Further, it is known to use a control panel and a personal computer as a remote control device of an energy management system, needless to present examples.

Further, as described in Patent Literature 1, the Inventor has previously proposed a remote controller that can specify and control one from a plurality of apparatuses to be controlled. The apparatuses to be controlled in Patent Literature 1 refers principally to television devices, video devices, and set-top boxes, not referring to a plurality of pieces of equipment installed at specific locations.

Non-Patent Literature 1:
"What is HEMS, BEMS, FEMS, CEMS?" TOCOS-WIRELESS.COM" (http://tocos-wireless.com/jp/tech/HEMS.html)

Non-Patent Literature 2:
"Smart Lighting Controller—Lighting control system" (http://www.nikkey.co.jp/contents/index_12.html)

Patent Literature 1: Publication of Japanese Patent No. 4275726

SUMMARY OF THE INVENTION

Problems that the Invention is to Solve

Meanwhile, a conventional remote control device, such as control panels, personal computers, and tablet terminals, provides a small amount of information to be browsed at a time due to the restriction of the size of the screen, inevitably leading to hierarchization of the display of information. For example, in lighting equipment, to control "54th lighting of room 5301 in the 53rd floor," it should be accessed in the order of "53th floor"→"room 5301"→"54th lighting."

As the scale of an object to be controlled increases, such operation becomes more complicated, causing erroneous operation. In that sense, the conventional control system seemingly still embodies problems in the remote control device. Further, if there is a change in the control method or an addition/a change in the arrangement of the equipment, there is a need of a change in the control software including screen display information, thereby requiring a great amount of labor, time and costs.

On the other hand, it is extremely difficult to control output of equipment so as to make each floor and each area optimal environment due to the sizes/shapes of the spaces, the number of pieces of equipment and the way they are arranged, and external factors that vary according to time and climates.

It should be noted that other equipment than the lighting equipment, such as, power distribution equipment, air conditioning equipment, ventilating equipment, lighting equipment, and audio equipment, also has similar problems to those described above.

Therefore, the present invention newly proposes a control system using sensors, for providing: a remote control device that is superior in browsing; and optimal environment.

Means for Solving the Problems

<1> A control system of the present invention for solving the above problem is a control system comprising: a paper controller, on which an image and/or a text that clearly indicates control operation of equipment to be controlled is printed superimposedly over or is printed near a dot pattern that in which a dot code that directly or indirectly corresponds to the control operation is encoded; a remote control device that, comprising storage means that stores a table that includes a direct or indirect correspondence between the dot code that is encoded in the dot pattern printed on the paper controller and control information that is obtained by coding the control operation of the equipment, images the dot pattern, decodes the dot code, and transmits the control information corresponding to the dot code from the storage means; and an interface device that performs processing of receiving the control information from the remote control device and controls the equipment to be controlled based on the control information.

<2> A control system of the present invention for solving the above problem is a control system comprising: an interface device that controls a plurality of pieces of equipment to be controlled based on control information; a remote control device that transmits the control information based on control operation to the interface device; and one or a plurality of sensors that transmit sensor information to the remote control device, wherein the remote control device includes processing, in the control information, that sets a sensor information target value and a sensor information target range for one of or a plurality of the sensors by at least a predetermined method and controls an output value of the equipment to be controlled by adjusting as necessary the control operation in accordance with a predetermined algorithm so that the sensor information belongs within the sensor information target range.

<3> A control system of the present invention for solving the above problem is a control system comprising: an interface device that controls a plurality of pieces of equipment to be controlled based on control information; a remote control device that transmits the control information based on control operation to the interface device; and one or a plurality of sensors that transmit sensor information to the interface device, wherein the remote control device sets a sensor information target value and a sensor information target range by at least a predetermined method, the interface device includes processing, in the control information, that controls an output value of the equipment to be controlled by adjusting as necessary the control operation in accordance with a predetermined algorithm so that the sensor information belongs within the sensor information target range.

<4> The predetermined algorithm, preferably, acquires an influence coefficient calculation function or an influence coefficient table for each equipment to be controlled for the sensor information of the one or a plurality of sensors, at predetermined positions, that is measured by causing each of the equipment to be controlled to output a predetermined reference output value, outputs again an output value that was calculated using the influence coefficient calculation function or the influence coefficient table for the sensor information target value, and adjusts as necessary the control operation.

<5> Preferably, in the predetermined algorithm, when
equipment to be controlled is $L_1$ to $L_m$;
an output value of the equipment, $Lb_1$ to $Lb_m$;
a reference output value of the equipment, $_0Lb_1$ to $_0Lb_m$;
an equipment output calculation value for a sensor target value, $_1Lb_1$ to $_1Lb_m$;
a sensor, $S_1$ to $S_n$;
a sensor information value for the output value of the equipment, $Sb_1$ to $Sb_m$;
a sensor target value, $_tSb_1$ to $_tSb_n$;
a sensor target range, $_{tmin}Sb_1$ to $_{tmax}Sb_1$, $_{tmin}Sb_n$ to $_{tmax}Sb_n$;
a sensor information value for a reference output, $_0Sb_1$ to $_0Sb_m$;
a sensor information value for the equipment output calculation value, $_1Sb_1$ to $_1Sb_m$; and
a sensor information value upon calculating an influence coefficient, $Sb_{11}$ to $Sb_{nm}$,
the sensor information value $Sb_1$ to $Sb_m$ for the output value of the equipment $Lb_1$ to $Lb_m$ is expressed by a formula (1), $$\begin{Bmatrix} Sb_1 \\ \vdots \\ Sb_n \end{Bmatrix} = \begin{bmatrix} _1\alpha_1 & \sim & _1\alpha_m \\ \vdots & \vdots & \vdots \\ _n\alpha_1 & \sim & _n\alpha_m \end{bmatrix} \begin{Bmatrix} Lb_1 \\ \vdots \\ Lb_m \end{Bmatrix} \quad (1)$$

an influence coefficient $\alpha$ is calculated by a formula (2) that is obtained by substituting the influence coefficient calculation sensor information value $_0Sb_{11}$ to $_0Sb_{nm}$, when the equipment $L_1$ to $L_m$ sequentially outputs piece by piece the reference output value $_0Lb_1$ to $_0Lb_m$ of the equipment for the control operation, in the formula (1), $$\begin{bmatrix} _1\alpha_1 & \sim & _1\alpha_m \\ \vdots & \vdots & \vdots \\ _n\alpha_1 & \sim & _n\alpha_m \end{bmatrix} = \begin{bmatrix} _0Sb_{11}/_0Lb_1 & \sim & _0Sb_{1m}/_0Lb_m \\ \vdots & \vdots & \vdots \\ _0Sb_{n1}/_0Lb_1 & \sim & _0Sb_{nm}/_0Lb_m \end{bmatrix} \quad (2)$$

from the sensor target value $_tSb_1$ to $_tSb_n$, the output value $_1Lb_1$ to $_1Lb_m$ of the equipment is calculated by a formula (3), and $$\begin{Bmatrix} _1Lb_1 \\ \vdots \\ _1Lb_m \end{Bmatrix} = \begin{bmatrix} _0Sb_{11}/_0Lb_1 & \sim & _0Sb_{1m}/_0Lb_m \\ \vdots & \vdots & \vdots \\ _0Sb_{n1}/_0Lb_1 & \sim & _0Sb_{nm}/_0Lb_m \end{bmatrix} \begin{Bmatrix} _tSb_1 \\ \vdots \\ _tSb_n \end{Bmatrix} \quad (3)$$

the output value $_1Lb_1$ to $_1Lb_m$ is output, thereby controlling the equipment so that the output value becomes within the sensor target range.

<6> The predetermined algorithm, preferably, determines whether sensor information acquired by the one or plurality of sensors belongs within the sensor information target range, and, if any of the sensor information does not belong within the sensor information target range, outputs again an output value that was calculated by predetermined calibration calculation, which is repeated until the sensor information that the one or plurality of sensors acquired belongs within the sensor information target range, whereby the control operation is adjusted as necessary.

<7> The calibration calculation, preferably, calculates, based on a difference value between the sensor information and the predetermined sensor information target value, a difference value of an output value of the equipment to be controlled using the influence coefficient calculation function or the influence coefficient table and outputs an output value again by adding the difference value to the previously output output value.

<8> The calibration calculation, preferably, acquires an influence coefficient calculation function or an influence coefficient table for each of the equipment to be controlled using the previously output output value as a predetermined reference output value and outputs again an output value that was calculated using the influence coefficient calculation function or the influence coefficient table for the predetermined sensor information target value.

<9> The calibration calculation, preferably, outputs an output value by adding a predetermined difference reference output value to the previously output output value for each of the equipment to be controlled, measures sensor information at predetermined positions of the one or plurality of sensors, calculates sensor difference information with reference to the previously measured sensor information, acquires a difference influence coefficient calculation function or a difference influence coefficient table for each of the equipment to be controlled corresponding to the sensor difference information at the predetermined positions of the one or plurality of sensors, calculates a difference value of the output value of the equipment to be controlled using the difference influence coefficient calculation function or the difference influence coefficient table corresponding to a difference value between the previously measured sensor information and the predetermined sensor information target value, and outputs again an output value by adding the difference value to the previously output output value.

<10> The influence coefficient table, preferably, comprises a coefficient that is used to calculate the output value of the equipment to be controlled by the influence coefficient calculation function corresponding to the sensor information of a predetermined range from the predetermined positions of the one or plurality of sensors.

<11> The difference influence coefficient table, preferably, comprises a coefficient that is used to calculate the difference output value of the equipment to be controlled by the difference influence coefficient calculation function corresponding to the sensor difference information of a predetermined range from predetermined positions of the one or plurality of sensors.

<12> The remote control device is, preferably, a smartphone, a tablet PC, or a portable telephone.

<13> Preferably, the remote control device comprises a remote controller body and a paper controller, on which an image and/or a text that clearly indicates control operation of the equipment to be controlled is printed superimposedly over or is printed near a dot pattern in which a dot code that directly or indirectly corresponds to the control operation is encoded, wherein the remote controller body, comprising storage means that stores a table that includes a direct or indirect correspondence between a dot code that is encoded in the dot pattern printed on the paper controller and control information that coded the control operation of the equipment, images the dot pattern, decodes the dot code, and transmits the control information corresponding to the dot code from the storage means, and, on the paper controller, at least an icon that specifies the one or plurality of sensors and an icon that indicates a numerical value are superimposedly printed over the dot pattern, the icon is imaged by predetermined operation by the remote controller body, and a sensor information target value and/or a sensor information target range is set by the decoded dot code.

<14> Preferably, the paper controller further includes a layout portion, on which is printed, if there are a plurality of pieces of the equipment to be controlled and the equipment is grouped, a layout drawing that indicates the arrangement of the grouped equipment and/or the arrangement of each of the equipment is superimposedly printed over or is printed near a dot pattern that encodes a dot code that uniquely corresponds to ID information of the grouped equipment and/or the each equipment, and the table stored in the storage means includes processing of setting the equipment to be controlled that is directly or indirectly associated with a dot code that is encoded in the dot pattern of the layout portion and control information that includes ID information of the grouped equipment and/or each of the equipment.

<15> Preferably, the dot code printed on the layout portion includes a direct or indirect correspondence with coordinate information, the remote control device includes processing of imaging a plurality of pieces of dot patterns by operation of tracing the printed matter, decoding coordinate information or the coordinate information and code information that is encoded in the plurality of dot patterns, and setting the equipment to be controlled that is associated with coordinate information or code information on a movement locus by the operation of tracing by the remote control device or within a region enclosed by the movement locus.

<16> Preferably, on the printed matter, is printed, if there are a plurality of pieces of the equipment to be controlled and the equipment is grouped, an icon that indicates the arrangement of the grouped equipment and/or the arrangement of each of the equipment is superimposedly printed over or is printed near a dot pattern in which a dot code that uniquely corresponds to ID information of the grouped equipment and/or the each equipment is encoded, the table stored in the storage means includes a direct or indirect correspondence between a dot code that is encoded in the dot pattern of the icon and control information that includes ID information of the grouped equipment and/or each of the equipment.

<17> Preferably, the dot code defines a code value or the code value and coordinate information, the code value is uniquely associated with ID information, and the coordinate information is associated with the arrangement of the icon.

<18> Preferably, there are a plurality of the layout portions, and the dot code defines a code value and coordinate information, the coordinate information is associated with the arrangement of the icon, the code value specifies at least the layout portion, and the icon is uniquely associated with the coordinate value and ID information.

<19> The interface device preferably includes processing of specifying the control operation for the equipment to be controlled based on the control information and transmitting the control operation as a control signal to the equipment to be controlled.

<20> The equipment to be controlled and/or the interface device preferably has ID information for specifying the equipment.

<21> Preferably, the remote control device further comprises a clock function, the storage means stores a table that includes a direct or indirect correspondence between time and the control information based on the time, and the remote control device includes processing of referencing the table and transmitting the control information based on the elapsed time of the clock function.

<22> Preferably, the interface device further comprises a clock function and storage means, the storage means stores a table that includes direct or indirect correspondences of the control information based on the time of the interface device, and the interface device references the table and controls the equipment to be controlled based on the elapsed time of the clock function.

<23> Preferably, the dot code encoded in the dot pattern includes a direct or indirect correspondence for setting the time, and the remote control device images one or a plurality of dot patterns by operation of touching or tracing the printed matter and sets or updates the table.

<24> Preferably, the remote control device further comprises audio output means and/or audio recognition means, and an instruction relating to operation of the remote controller or the processing is made by an audio guide and/or an audio input relating to the operation of the remote controller or the processing.

<25> Preferably, the predetermined method images an icon that specifies the one or plurality of sensors that are superimposedly printed over the dot pattern of the layout portion and an icon that indicates a numerical value that is superimposedly printed over the dot pattern and sets a sensor information target range based on the decoded dot code.

<26> The one or plurality of sensors preferably comprise a position sensor and transmit sensor information that includes position information of the sensors to the remote control device or the interface device.

<27> Preferably, the equipment is lighting equipment, the sensor is an illuminometer, color-illuminometer, or a luminance meter, color-luminance meter, and the sensor information is illuminance, color-illuminance, or luminance, color-luminance.

<28> Preferably, the lighting equipment is LED lighting equipment and the interface device repeats tuning on and off at a predetermined frequency with high speed and controls an LED lighting device that configures the LED lighting equipment at a time interval of lighting.

Advantageous Effect of the Invention

According to the present invention, there can be constructed a control system that is superior in browsing and allows intuitive control of equipment without erroneous operation using a paper controller, on which dot codes are superimposedly printed over images, and a remote control device that is configured by a remote controller that reads the dot codes and transmits the control information of the equipment. Further, if there is a change in the control method, the control method can be easily changed by dot code reading operation of the remote controller body against the layout portion of the paper controller where the arrangement of the equipment is described. Further, even if there is an addition in the equipment or a change in the arrangement thereof, a paper controller can be created only by allocating previously prepared dot codes to the added piece of equipment to create the layout drawing of the equipment and printing it as a layout portion.

Whereas, the output value of equipment can be automatically controlled by arranging sensors and calculating the output value based on the sensor information using an algorithm for suggesting optimal environment for each floor and area.

In this way, an optimal environment can be easily realized for each floor and area regardless of the sizes/shapes of the spaces, the number of pieces of equipment and the way they are arranged, and external factors that vary according to time and climates.

BRIEF DESCRIPTION OF THE DRAWINGS

FIGS. 13A to 13 E are for illustrating an embodiment of an information dot; FIG. 13A shows a first example.

FIGS. 14A to 14C are for illustrating an embodiment of a dot code allocation format; FIG. 14A shows a first example; FIG. 14B, a second example; FIG. 14C, a third example, respectively;

FIG. 15A shows a first general example; FIG. 15B, a second general example;

FIG. 15C, a third general example, respectively;

FIG. 16A shows a first variant; FIG. 16B, a second variant; FIG. 16C, a third variant, respectively;

FIG. 17A shows a fourth variant, at the same time, illustrating an embodiment of a second example of the dot pattern ("GRID1"); FIG. 17B, a fifth variant; FIG. 17C, a sixth variant, respectively;

FIG. 18A shows a coupling example of the dot pattern (GRID0, GRID1); FIG. 18B, a first concatenating example of the dot pattern (GRID0), respectively;

FIG. 21A shows a first general example; FIG. 21B, a second general example; FIG. 21C, a third general example, respectively;

FIG. 22A shows a first variant; FIG. 22B, a second variant, respectively;

FIG. 23A shows a fourth variant; FIG. 23B, a fifth variant, respectively;

FIG. 24A shows a sixth variant; FIG. 24B, a seventh variant, respectively;

FIG. 25A shows an eighth variant; FIG. 25B, a ninth variant; FIG. 25C, a tenth variant, respectively;

FIG. 26A shows a first reading example; FIG. 26B, a second reading example, respectively;

FIG. 27 shows a third reading example;

FIG. 59 is an explanatory diagram of the dot pattern (GRID6);

FIGS. 63A to 63C are explanatory diagrams for illustrating a dot code format of the paper controller of the present invention;

FIG. 64 is a diagram for illustrating a table that includes a correspondence between time (clock time) and control information;

DETAILED DESCRIPTION OF THE EMBODIMENTS

Summary of the Invention

Figure 1:
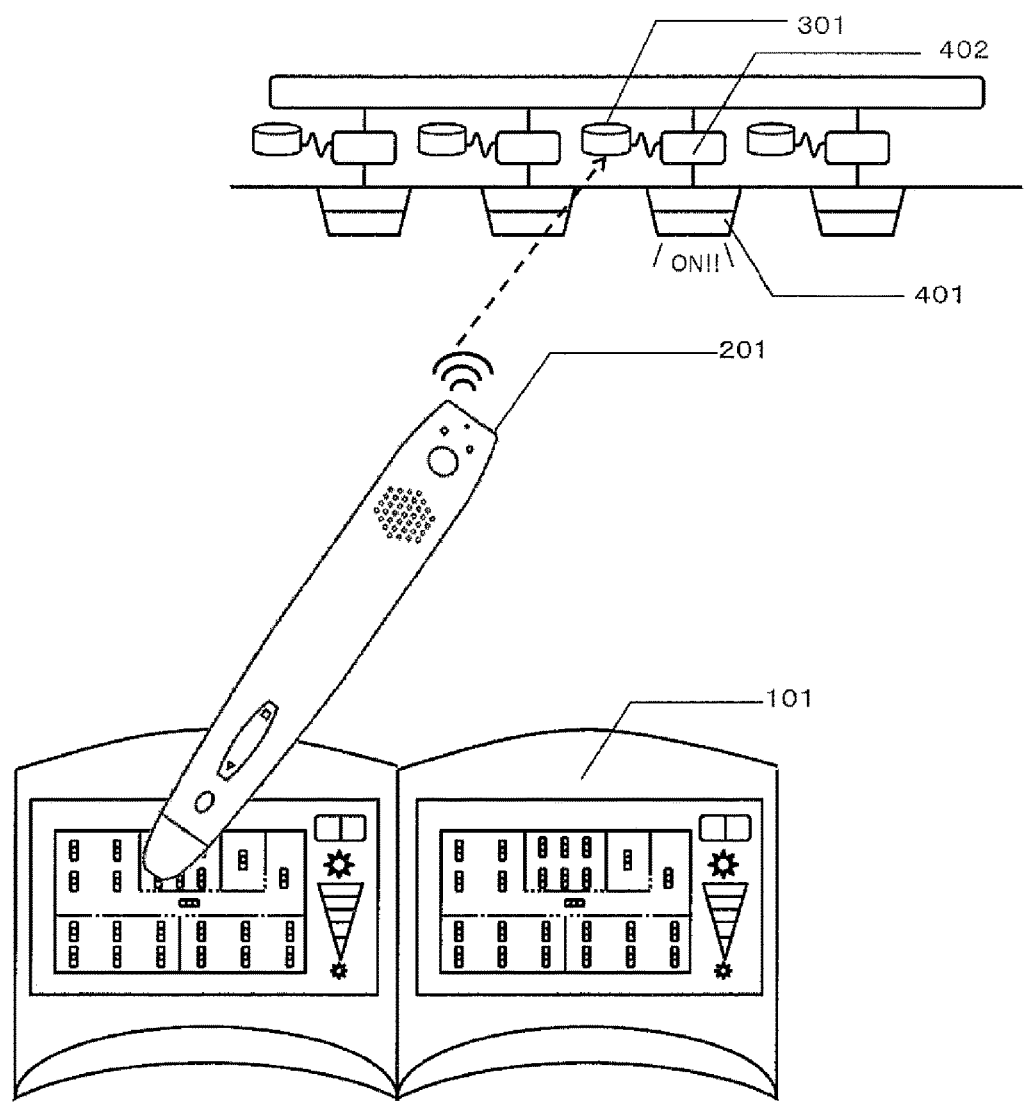
FIG. 1 is a diagram showing an overview of the present invention.

FIG. 1 shows the overview of the present invention.

The control system of the present invention comprises a paper controller 101 (a printed matter), a remote control device configured by the remote controller body 201, and an interface device 301.

Figure 2:
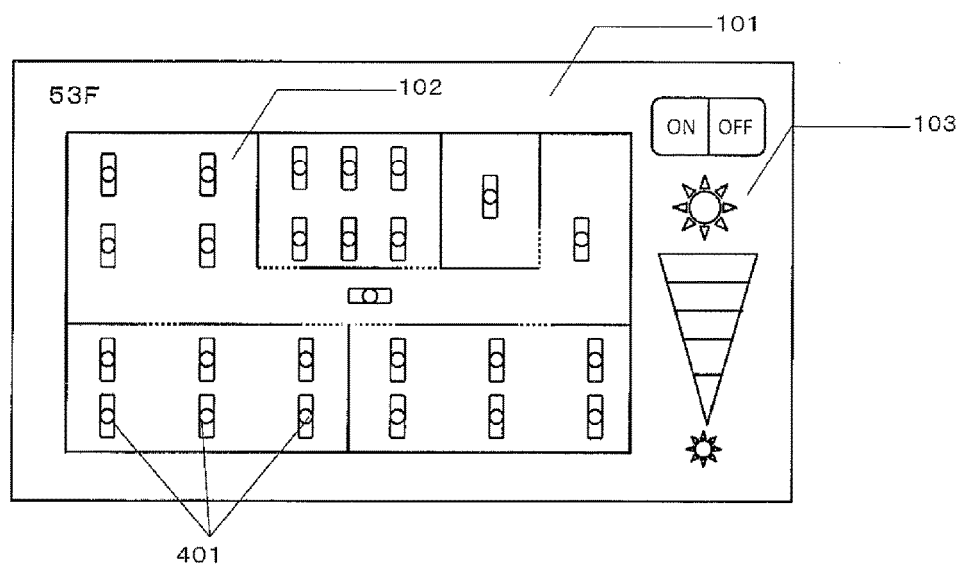
FIG. 2 is a diagram showing a paper controller.

As shown in FIG. 2, the paper controller 101 is printed with a dot pattern superimposedly over a layout portion 102 that indicates the arrangement of lighting devices 401, and the remote controller body 201 can image the dot pattern. In a different portion than the layout portion 102, a controller portion 103 that indicates operation for the lighting devices 401 is printed superimposedly over a dot pattern.

However, the layout portion 102 is not necessarily provided, and the positions of the lighting devices 401 may be displayed by an image or a text, instead of the layout portion.

The dot code is decoded from the dot pattern imaged by the remote controller body 201, and the decoded dot code is transmitted to the interface device 301. The communication between the remote controller body 201 and the interface device 301 is preferably a wireless communication. As a wireless communication, electromagnetic waves including Bluetooth (registered trademark), ZigBee (registered trademark), Radio Frequency (RF), infrared light, and radio waves for portable telephones, or sound waves can be used for communications. Further, a wireless communication method and wired communication method of any standard that can be devised in the present or will be devised in the future may also be used as a communication method other than the methods mentioned above.

The remote controller body 201 is an embodiment of a device (a dot pattern decoding device) for decoding the dot code of the present invention. While the remote controller body 201 is preferably an electronic pen form that is a form that can be held as a pen, the remote controller body 201 may be a device of other forms, for example, one equipped with buttons for basic operation.

The lighting device 401 installed on the ceiling comprises a control device 402 that receives signals from the interface device 301; the control device 402 turns the power on and off and adjusts the brightness of the lighting device 401 according to control signals transmitted from the interface device 301. The communication between the interface device 301 and the control device 402 is generally a wired communication, yet, may be a wireless communication.

Further, while an interface device 301 is preferably provided for each control device 402, an interface device may communicate with a plurality of control devices 402.

Figure 3:
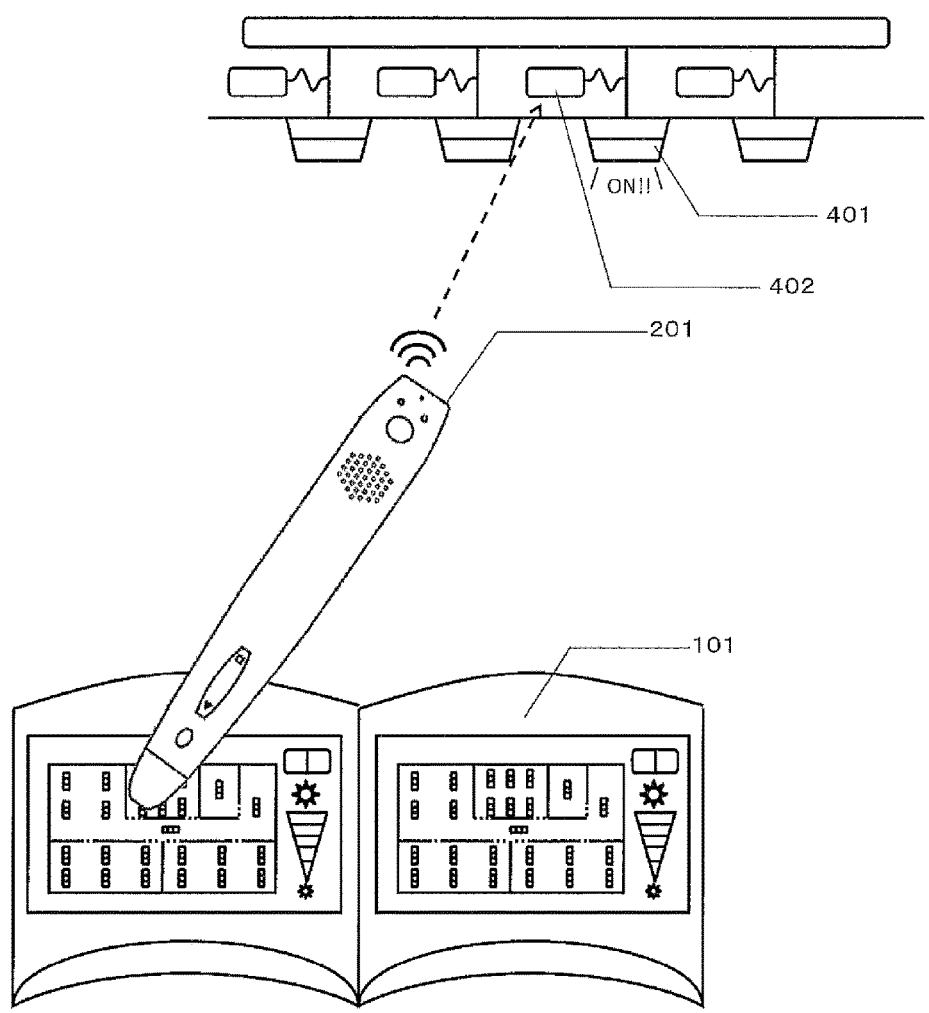
FIG. 3 is a diagram showing an embodiment of a remote control device that incorporates a function of an interface device.

Further, as shown in FIG. 3, the function of the interface device 301 may be incorporated in the remote controller body 201, and the remote control device 201 may transmit signals to the control device 402. It should be noted that the interface device 301 or the interface device 301 and control device 402 may be incorporated in the lighting device 401. It should be noted that the control device 402 may be incorporated in the interface device 301.

As such, a "device" in the present invention is only a conceptual expression in order to achieve the objective of the invention. As long as the objective of the invention can be achieved, functions of a plurality of devices may be incorporated in a single device as a circuit or software, or a function may be achieved jointly by a plurality of devices, all of which are within the scope of the present invention.

It should be noted that a wireless communication method and a wired communication method of any standard that can be devised in the present or will be devised in the future may be used as a communication method.

It should be noted that, if the lighting device 401 is LED lighting, the brightness of the LED lighting apparatus can be controlled by controlling pulse width modulation (PWM) signals or the current amount. Further, the color tone of the lighting can be controlled using an RGB-adjustable LED.

The power required for operation of the interface device 301 is preferably supplied from a wire to the lighting device 401.

Figure 4:
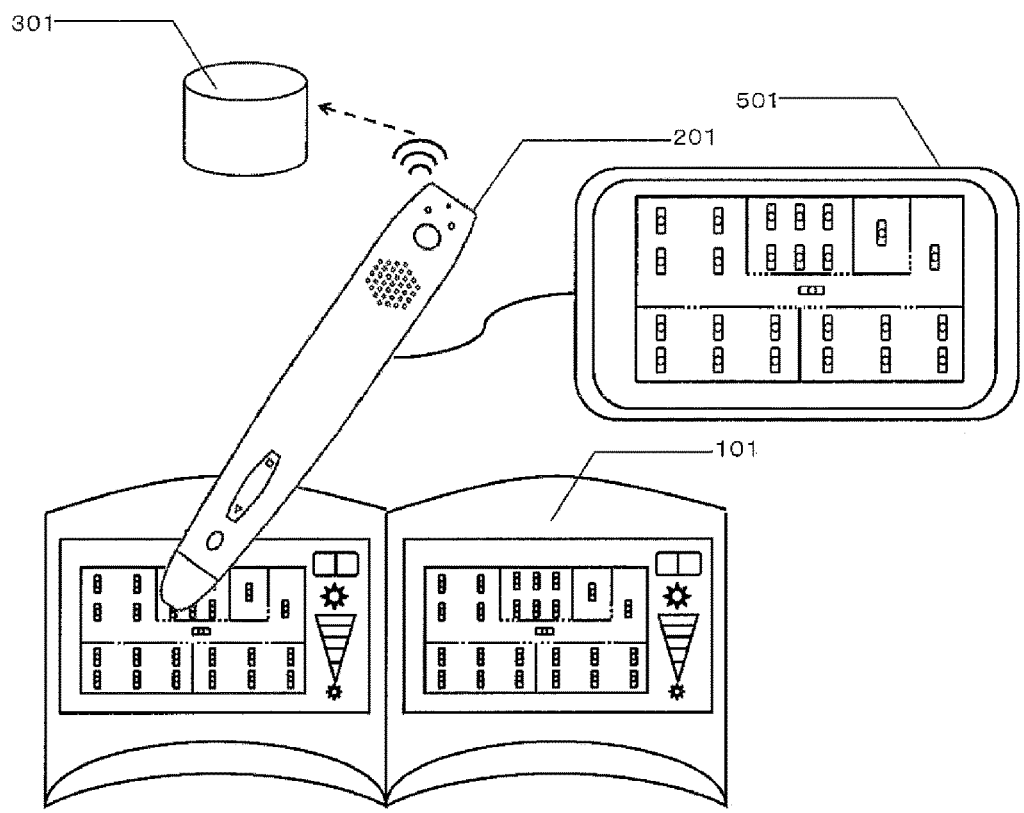
FIG. 4 is a diagram showing an embodiment of a remote control device that is connected with a display device.

Further, as shown in FIG. 4, the remote controller 201 may be connected with a display device 501, or the display device may be provided on the remote controller body 201.

The positions of the lighting devices 401 and the like are displayed on the display means 501 so as to enhance browsing efficiency. It should be noted that, while not shown, the display device may be incorporated in the remote controller body.

<Dot Pattern>

A "dot pattern" in the present invention is an encoded dot code that has been coded in accordance with a plurality of dot arrangement algorithms.

As for the information encoding algorithm using a dot pattern and the dot code decoding algorithm by the remote controller body 201, known algorithms, including Grid Onput (registered trademark) of Gridmark Inc. and Anoto pattern of Anoto K.K, can be used.

The Inventor of the invention of the present application has previously invented dot patterns of Japanese Patent No. 3706385, Japanese Patent No. 3766678, Japanese Patent No. 3771252, Japanese Patent No. 3858051, Japanese Patent No. 3858052, Japanese Patent No. 4142683, Japanese Patent No. 4336837, Japanese Patent No. 4834872, Japanese Patent No. 4392521, Japanese Patent No. 4899199, and the like. The dot patterns disclosed in the publications of these patents can also be used as the dot pattern in the present invention, and the dot-code encoding algorithm by the dot pattern and the dot-code decoding algorithm by the remote controller body 201 are already described in detail in these published publications.

For the dot pattern, other dot pattern of any standards that can be devised at the present or will be devised in the future may also be used.

Further, the dot pattern is preferably an invisible pattern that cannot be seen (or hardly seen) so that it can be superimposed over normal designs. However, if an invisible ink (what is called a stealth ink) is used for printing, other variety of two-dimensional codes may also be used.

Further, the dot pattern can preferably encode different information depending on the positions to be read by defining coordinate values. The dot pattern can more preferably put coordinate values and other code values into a pattern of one format.

Here, the following will describe an example of the above-described dot pattern in detail using FIGS. 13A to 62.

The embodiments of the dot pattern include the following examples.

It should be noted that the embodiments of the dot pattern are not limited to the following (1) to (4).

(1) First example ("GRID0," FIGS. 15A to 19B)
(2) Second example ("GRID1," FIGS. 19A and 20A, and FIGS. 21A to 21C)
(3) Third example ("GRID5," FIGS. 22A to 25C)
(4) Fourth example ("GRID6," FIGS. 28 to 62)

The information dots in the above first to fourth examples will be described using the following examples.

It should be noted that examples of the information dots are not limited to the following (5) and (6).

Figure 26A:
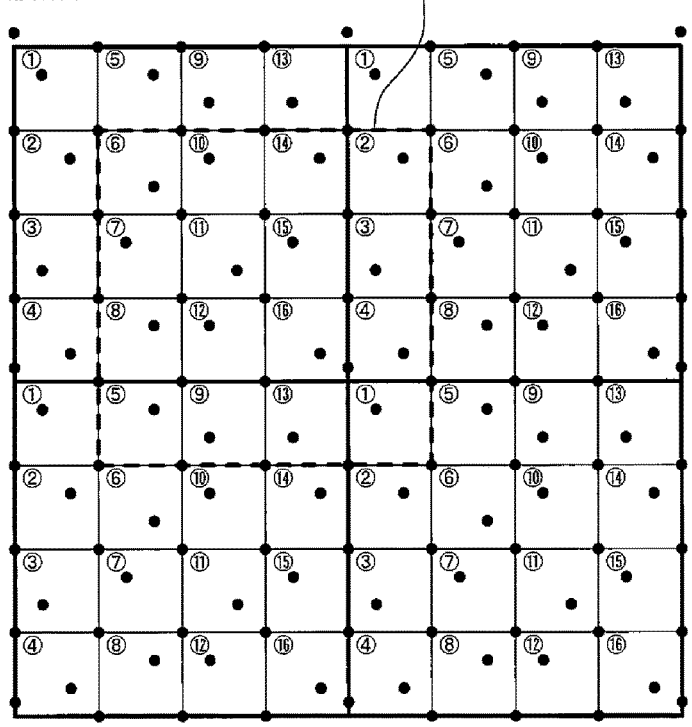
FIGS. 26A and 26B are for illustrating reading of the dot pattern.
Figure 26B:
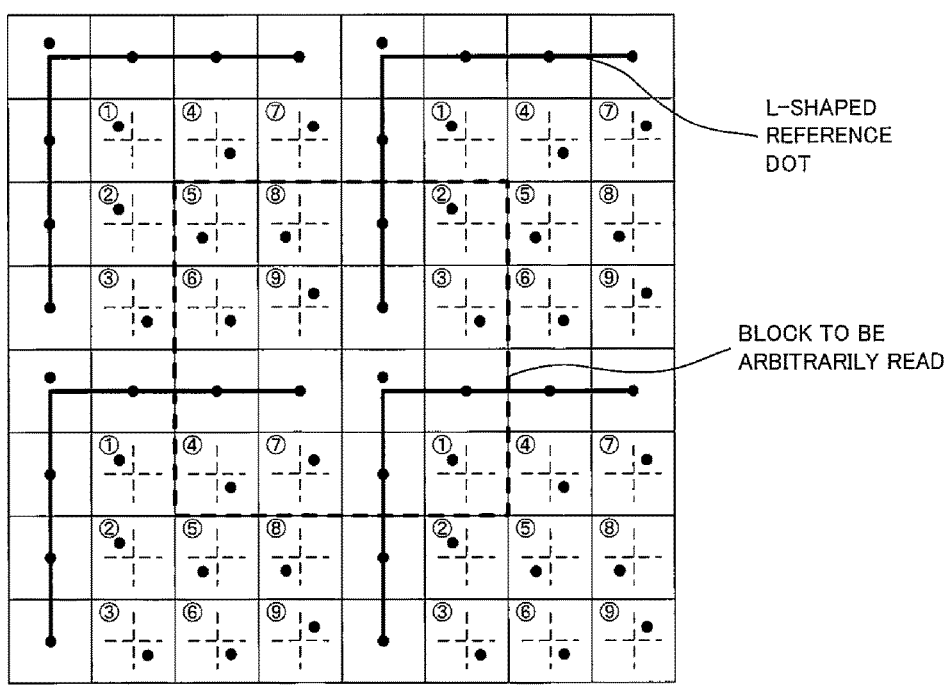
Figure 27:
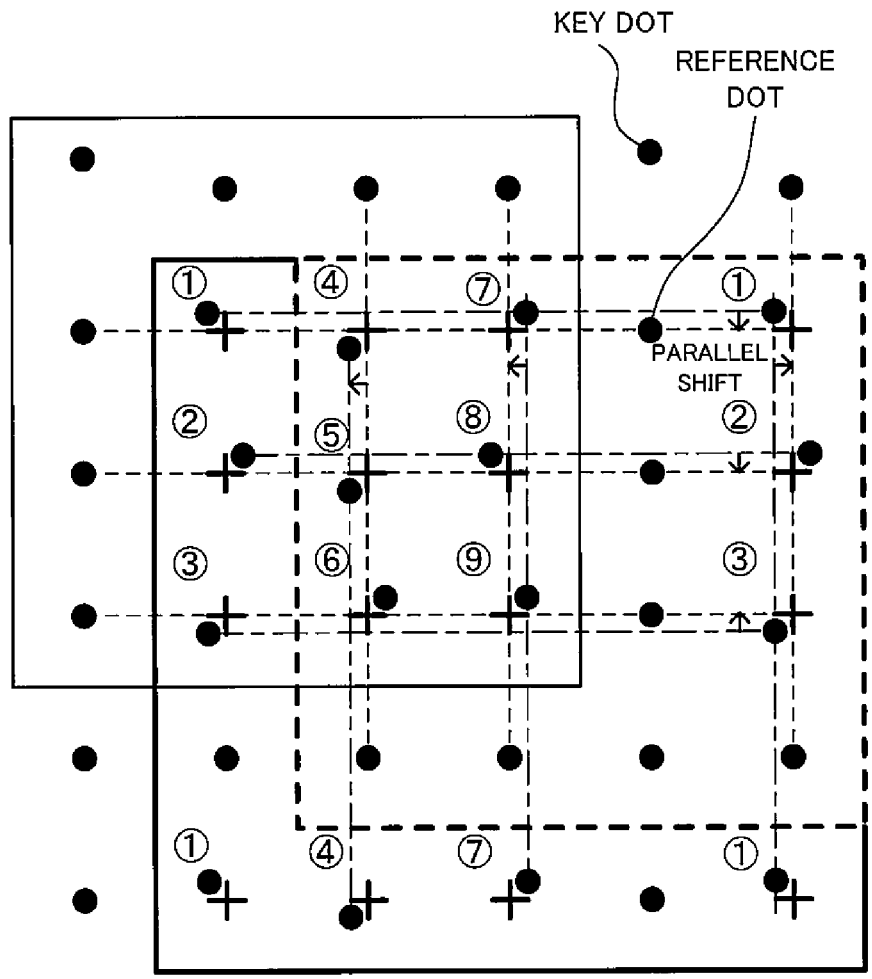
FIG. 27 is for illustrating reading of the dot pattern, continuing from FIGS. 26A and 26B.

(5) How information dots are arranged (FIGS. 13A to 13E)
(6) Code allocation of information dots (FIG. 14)
(7) Reading a dot pattern (FIGS. 26A to 27)

<How Information Dots in FIGS. 13A to 13E are Arranged>

Information dots are arranged as shown in FIGS. 13A to 13E.

It should be noted that the arrangement of information dots is not limited to the examples of FIGS. 13A to 13E.

Figure 13A:
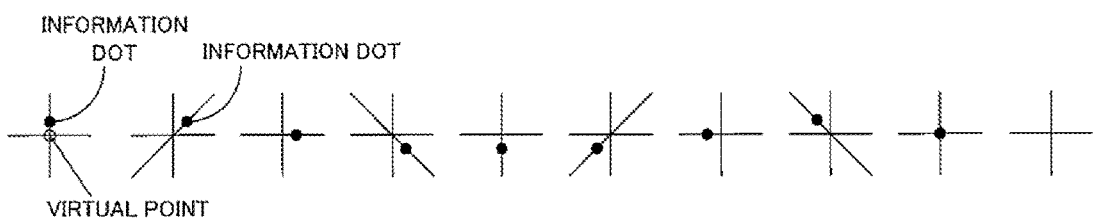
Figure 13B:
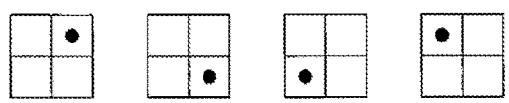
FIG. 13B, a second example.
Figure 13C:
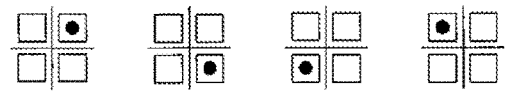
FIG. 13C, a third example.

That is, as shown in FIG. 13A, an information amount can be increased by including, in addition to arranging an information dot above, below, left, right, or diagonal to the virtual point, a case of arranging no information dot, and cases of arranging and not arranging an information dot on a virtual point. In FIG. 13B, an information dot is arranged in a total of four virtual regions of two rows×two columns. However, in consideration of misrecognition that might possibly occur when the information dot is arranged near the boundary, FIG. 13C is an example where virtual regions are arranged with certain intervals in-between. It should be noted that the information amount can be further increased by arranging a plurality of information dots within the four virtual regions or by arranging no information dot therewithin.

Figure 13D:
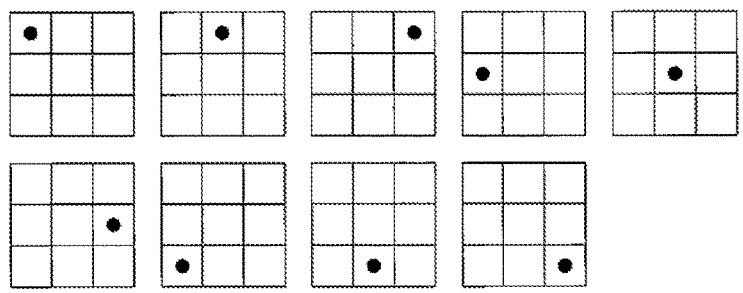
FIG. 13D, a fourth example.

In FIG. 13D, an information dot is arranged within a total of nine virtual regions of three rows×three columns. It should be noted that the information amount can be further increased by arranging a plurality of information dots within the nine virtual regions or by arranging no information dot therewithin.

Figure 13E:
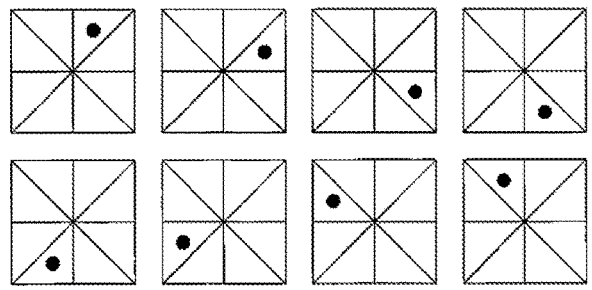
FIG. 13E, a fifth example, respectively.

In FIG. 13E, an information dot is arranged within a total of eight virtual regions that are made by connecting the middle point of a square and diagonal lines by straight lines or virtual lines. It should be noted that the information amount can be further increased by arranging a plurality of information dots within the eight virtual regions or by arranging no information dot therewithin.

While the virtual regions of FIGS. 13B to 13E are rectangles or triangles, the virtual regions do not have to be in contact with one another as in the case of FIG. 13C and the virtual regions may be any shapes, such as circles or other polygons. Furthermore, by increasing the number of virtual regions, the information amount can be increased. It should be noted that the arrangement of an information dot in virtual regions is made in the same way as the arrangement method of an information dot that is arranged by being displaced in a predetermined direction by a predetermined distance from a virtual point as shown in 13A. This is because, in creating print data, an arrangement position should be determined with coordinate data that indicates a certain position no matter what kind of virtual regions might be used for arranging, which is nearly the same as calculating coordinate data for arranging an information dot by displacing it from a virtual point. Also, in reading dots, since dots are recognized, with any arrangement method, in an image that captured a dot pattern by setting a dot recognition determination region of a circle, a rectangle, or the like mainly around a plurality of arrangement positions where information dots are likely arranged and determining whether there are dots within the dot recognition determination region, it can be said that the same information dot reading method is used.

<Code Allocation of Information Dots of FIGS. 14A to 14C>

The code allocation of an information dot is as shown in FIGS. 14A to 14C.

That is, an information dot may be allocated only for a "code value" such as a company code as shown in FIG. 14A; an information dot may be allocated for two data regions of a "X coordinate value" and a "Y coordinate value" in a code format as shown in FIG. 14B; or an information dot may be allocated to three data regions of a "code value," a "X coordinate value" and a "Y coordinate value" as shown in FIG. 14C. If coordinate values are allocated in a rectangular region, the data regions of "X coordinate values" and "Y coordinate values" may be different in order to decrease the data amount. Further, a "Z coordinate value" may also be allocated, while not shown, in order to define a height in the position coordinate. If a "X coordinate value" and a "Y coordinate value" are allocated, the coordinate values of X, Y coordinates increase by predetermined amounts in positive directions as the values are position information, thus, all dot patterns are not the same. Further, as clearly indicated in FIGS. 14A to 14C, as the types of codes to be allocated increase, the dot recognition determination region becomes smaller, making the arrangement positions of information dots hard to be recognized accurately.

First Example ("GRID0"), FIGS. 15A to 19B

The first example of the dot pattern is called by an alias of "GRID0" by the Applicant.

The feature of "GRID0" is using a key dot for recognizing at least one of the range and direction of the dot pattern.

"GRID0" comprises the following components as shown in FIGS. 15A to 19B.

(1) Information Dot

An information dot is for storing information.

It should be noted that how an information dot is arranged is shown in FIGS. 13A to 13E, and the code allocation of the information dot is as shown in FIGS. 14A to 14C.

It should be noted that the information amount can be increased by including a case of arranging no information dot and cases of arranging or not arranging an information dot at a virtual point.

(2) Reference Dot

Reference dots are arranged at a plurality of positions that have been set in advance.

The reference dots are for specifying positions of virtual points or virtual regions, as will be described later.

(3) Key Dot

Figure 16A:
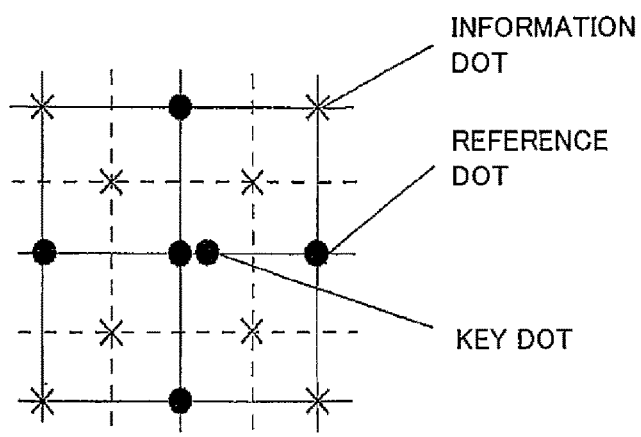
FIGS. 16A to 16C correspond to FIGS. 15A to 15C and are for illustrating a variant of the dot pattern ("GRID0")
Figure 16B:
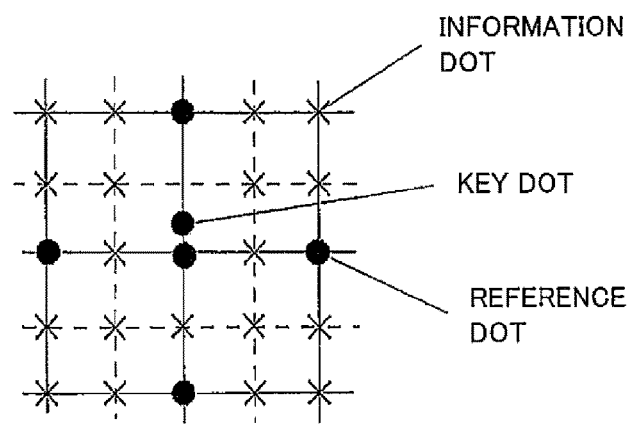
Figure 16C:
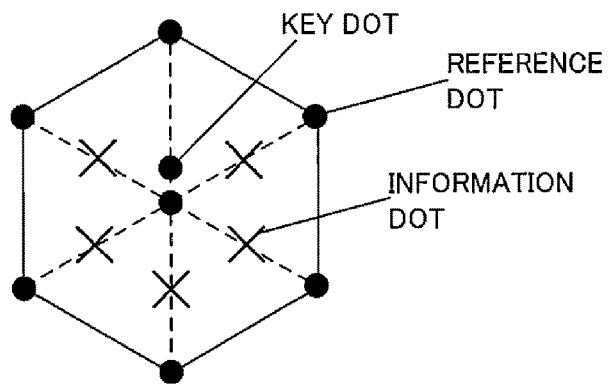

A key dot is arranged by displacing a reference dot, or, as shown in FIG. 16A to 16C, arranged by adding a dot at a position that is displaced from the arrangement position of the reference dot. That is, if a key dot is arranged by displacing a reference dot, no reference dot is arranged at the original arrangement position of the reference dot as the reference dot is displaced. Thus, the key dot also plays a role of the original reference dot. The original position of the reference dot is preferably able to be anticipated from the positions of other reference dots. If a key dot is arranged additionally at a position displaced from the arrangement position of the reference dot, both reference dot and key dot are arranged in the vicinity of each other.

The key dot is for specifying a reference direction of an information dot with reference to reference dots and a virtual point or a reference direction of an information dot that is arranged within reference dots and virtual regions. By defining this reference direction, information can be given and read in the direction of the information dot with reference to the virtual point. Further, the range of a dot pattern that defines a piece of data with a plurality of information dots can be specified. As such, even if dot patterns are arranged up, down, left and right to one another, the range of the dot patterns can be read and the data can be decoded.

(4) Virtual Point or Virtual Region

Figure 17A:
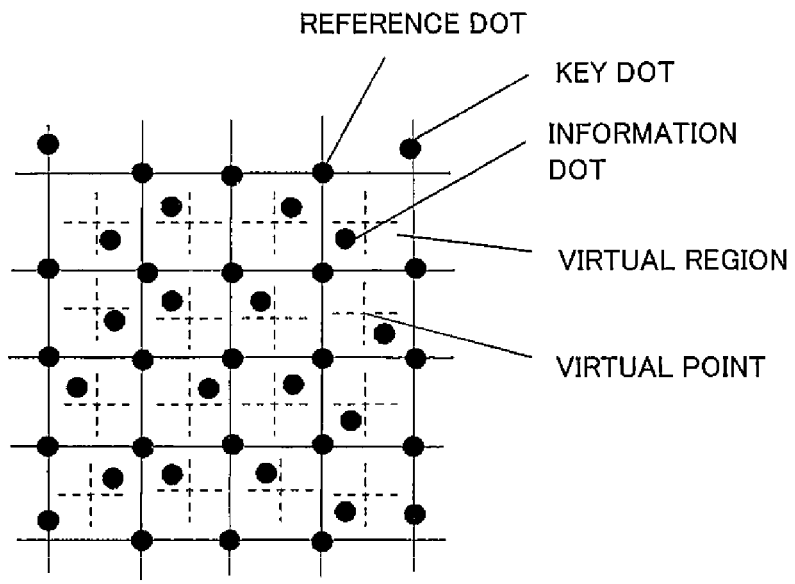
FIGS. 17A to 17C are for illustrating a variant of the dot pattern ("GRID0")
Figure 17B:
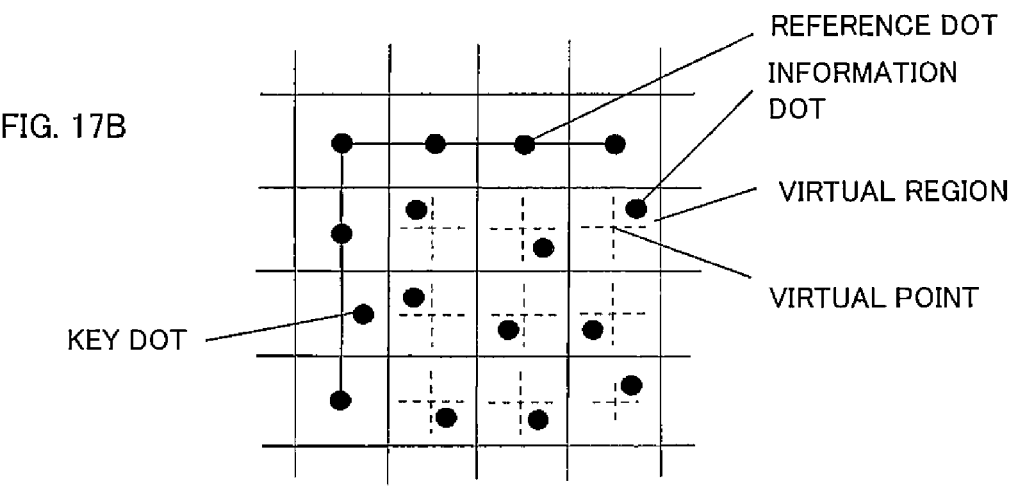
Figure 17C:
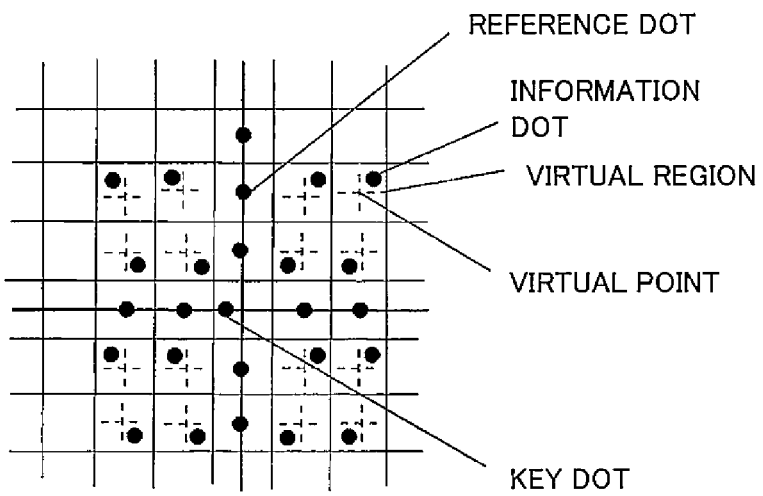

A virtual point or a virtual region is specified by the arrangement of reference dots. As shown in FIGS. 17A to 17C, if information is defined by at least any one of a distance and a direction from a virtual point, information may be defined using the direction of the dot pattern based on the above-described key dot as a reference. For the distance, a distance between predetermined reference dots may be used as a reference. If information is defined by arranging virtual regions, by defining the center or a representative point of a plurality of virtual regions for assigning a piece of information as a virtual point, the position of the virtual point is specified by the arrangement of the reference points as described above, and the virtual regions may be defined by a distance and a direction from the virtual point. Further, the arrangement positions of all virtual regions may be directly specified from the arrangement of the reference dots. It should be noted that, while the adjacent virtual regions may be coupled, virtual regions are preferably arranged with certain intervals in-between as an information dot that is arranged near the boundary may possibly transmit misrecognition.

Figure 15A:
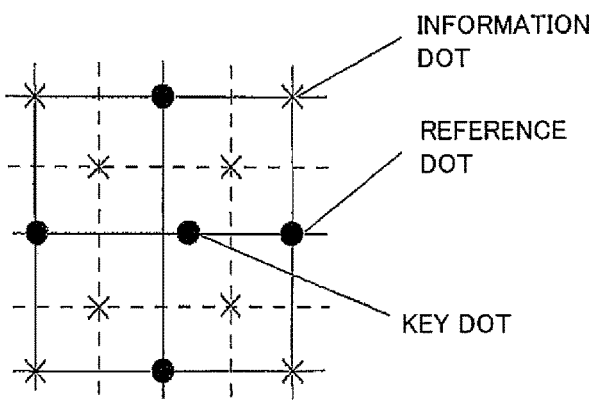
FIGS. 15A to 15C are for illustrating an embodiment of a first example of a dot pattern ("GRID0")
Figure 15B:
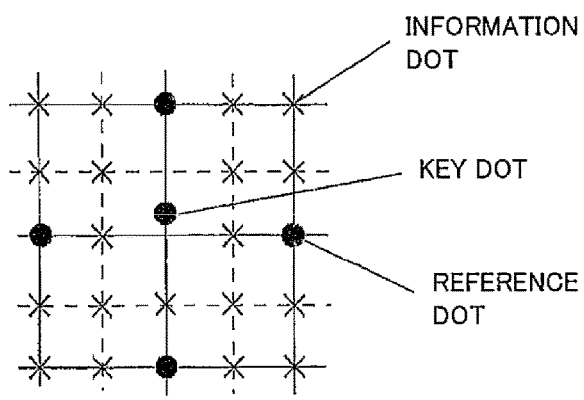
Figure 15C:
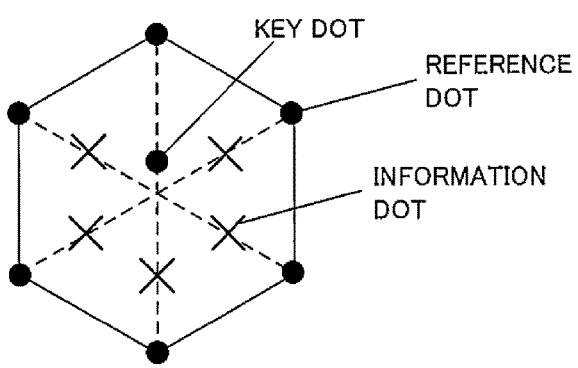

FIGS. 15A to 15C show general examples of the dot pattern of "GRID0;" FIG. 15A is an example of arranging reference dots in a generally plus sign shape; FIG. 15B, an example of increasing the number of arranged information dots; and FIG. 15C, an example of arranging reference dots in a hexagon shape.

It should be noted that the general examples of the dot pattern are not limited to the generally plus sign shape or generally hexagon shape as exemplified in FIGS. 15A to 15C.

FIGS. 16A to 16C show variants of FIGS. 15A to 15C, where a key dot is arranged additionally at a position displaced from the arrangement position of a reference dot. As the result, both reference dot and key dot are arranged adjacent to each other.

FIGS. 17A to 17C show variants of the dot pattern of "GRID0;" FIG. 17A is an example of arranging reference dots in generally square shapes; FIG. 17B, an example of arranging reference dots in a generally L shape; and FIG. 17C, an example of arranging reference dots in a generally cross shape, or a generally plus shape.

It should be noted that the variants of the dot pattern are not limited to the generally square shapes, generally L shape, generally cross shape, or generally plus shape, as exemplified in FIGS. 17A to 17C.

Figure 18A:
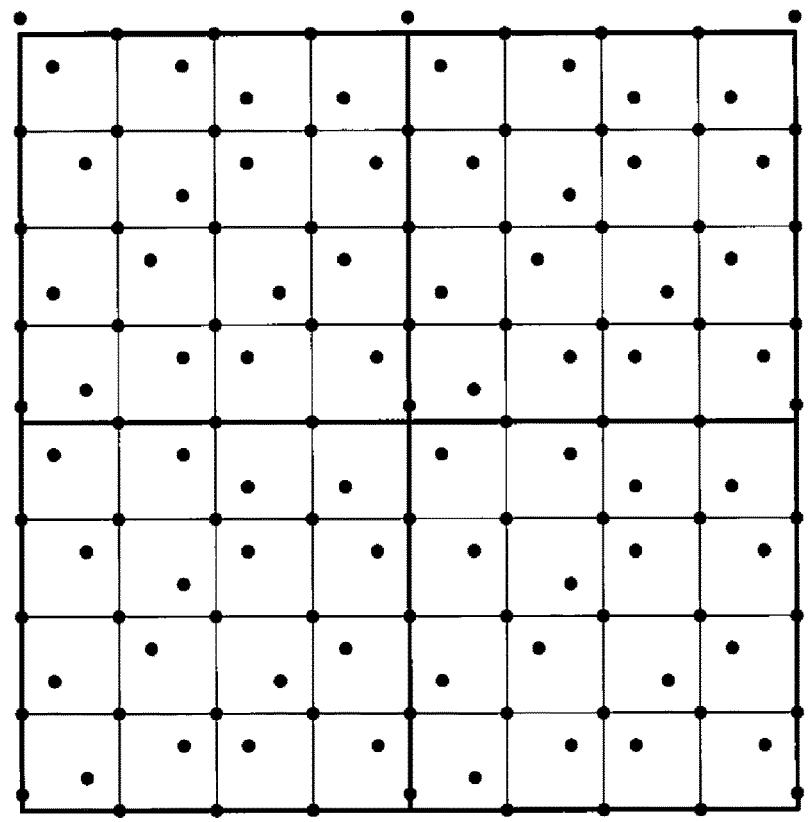
FIGS. 18A and 18B are for illustrating a coupling example and a concatenating example of the dot pattern (GRID0, GRID1)
Figure 18B:
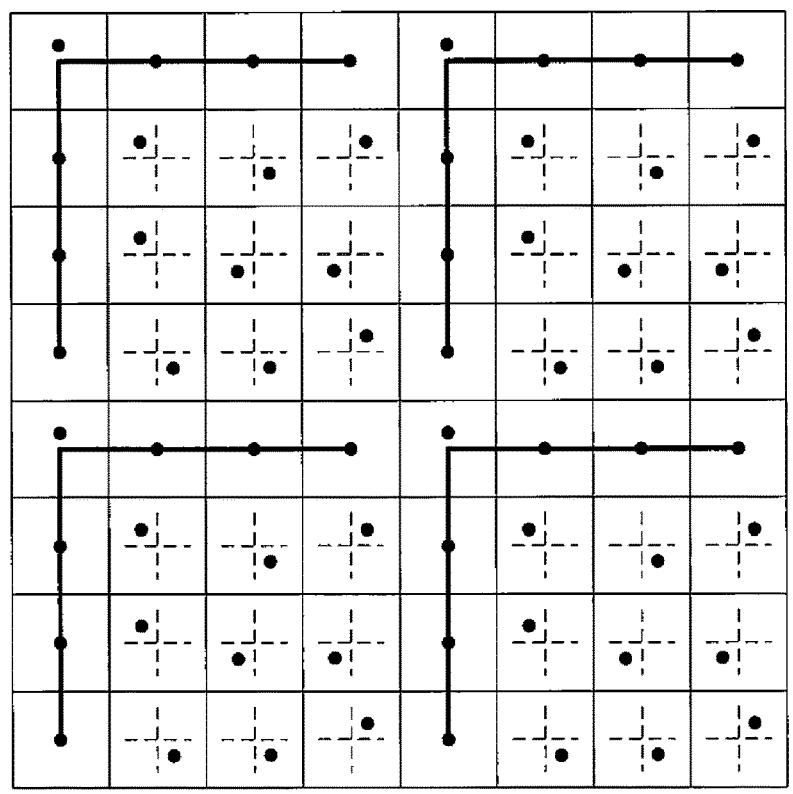
Figure 19A:
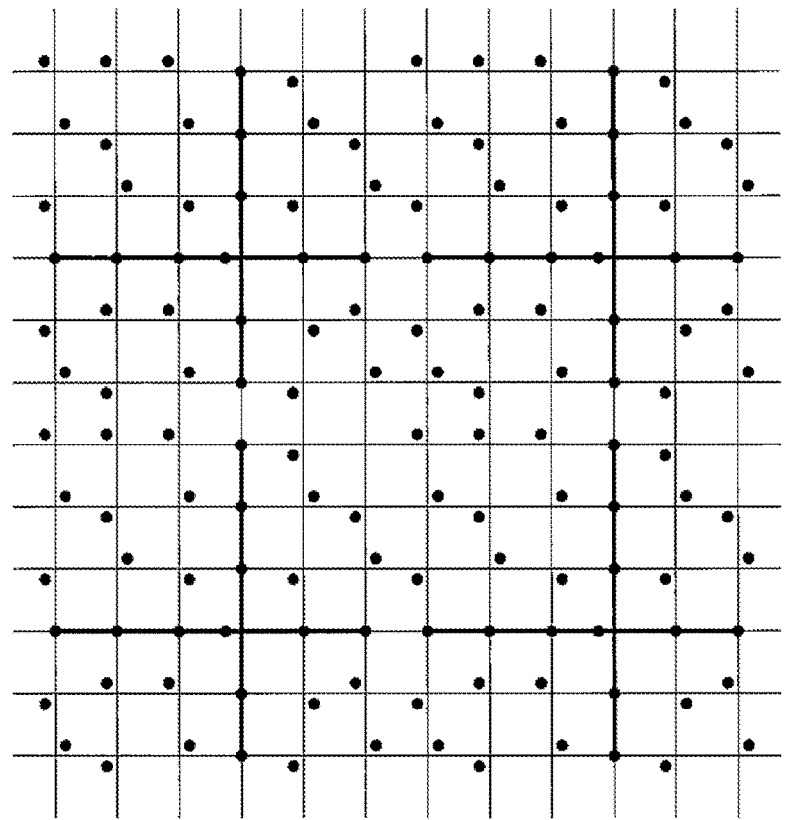
FIGS. 19A and 19B show a second concatenating example of the dot pattern (GRID0), continuing from FIGS. 18A and 18B.
Figure 19B:
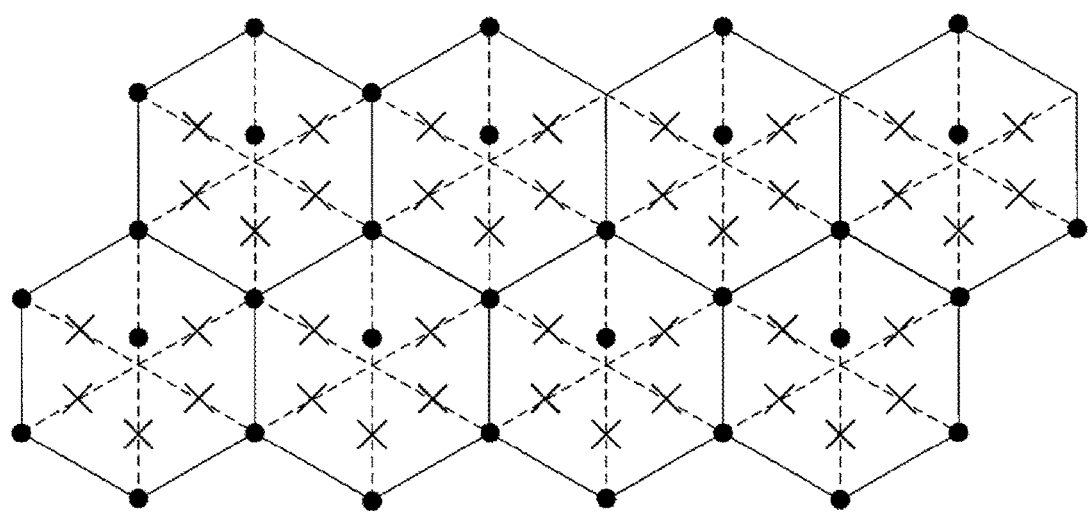

FIGS. 18A to 19B show coupling examples and concatenating examples of the dot pattern of "GRID0;" FIG. 18A shows a coupling example where a plurality of pieces of dot patterns, in each of which reference dots are arranged in generally square shapes, are arranged in contact to one another such that parts of the reference dots are shared by the dot patterns. The condition of coupling is that the positions of dots on the both sides of top and bottom and/or left and right in a piece of dot pattern should be the same positions. It should be noted that only the top and bottom or left and right may be coupled. FIG. 18B shows a first concatenating example in which a plurality of pieces of dot patterns, in each of which reference dots are arranged in a generally L shape, are arranged independently from one another. FIG. 19A shows a second concatenating example in which a plurality of pieces of dot patterns, in each of which reference dots are arranged in a generally plus shape, are arranged independently from one another. It should be noted that concatenating refers to a method of arranging dot patterns on top, bottom, left, and right to one another with predetermined intervals on between. FIG. 19B is a coupling example where a plurality of dot patterns, in each of which reference dots are arranged in a hexagon shape, are arranged in contact to one another such that parts of the reference dots are shared among the dot patterns.

Further, the coupling examples and the concatenating examples of the dot pattern are not limited to the arrangements exemplified in FIGS. 18A and 18B and FIGS. 19A and 19B.

Second Example ("GRID1")

The second example of the dot pattern is called by an alias of "GRID1" by the Applicant.

Figure 20:
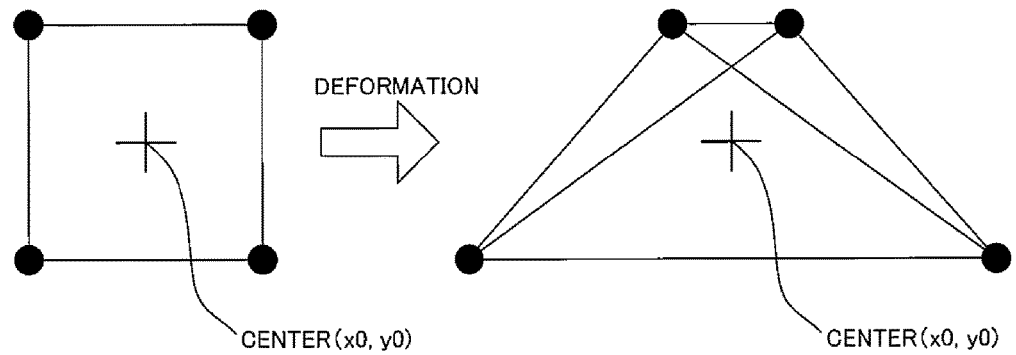
FIG. 20 is an explanatory diagram for illustrating the way of calculating the center when the arrangement of the dot pattern (GRID1) has changed.

"GRID1" is made by limiting the arrangement of the reference dots of "GRID0" as shown in FIG. 17A, which features that the reference dots are arranged in rectangular shapes, such as, squares and rectangles, and that a virtual point is defined as the center of surrounding four reference points. The center is, as shown in FIG. 20, calculated by the coordinate value that is obtained by dividing the coordinate values of the surrounding four reference points by four. In this way, even if the arrangement of the dot pattern is distorted in a captured image due to reading of the dot pattern by an inclined optical reading device, lens distortion, or deformity of a print medium on which is formed the dot pattern, as the arrangement of an information dot shifts in the same way as adjacent four reference dots, the arrangement of the information dot is accurately calculated in relation to the shifted arrangement of the four reference dots, thus, causing little decrease in the recognition rate. Needless to say, if an information dot is arranged apart from reference dots as in FIGS. 17B and 17C, the arrangement position of the information dot may not be accurately read, with possible misrecognition.

In the drawings, there are a variant of FIG. 17A where reference dots are arranged in square shapes and a coupling example of the dot pattern of FIG. 18A where dot patterns are repeatedly arranged on top, bottom, left, and right to one another and peripheral reference dots are overlapped.

It should be noted that, while reference dots are arranged in square shapes as shown in FIG. 17A, the reference dots may be arranged in rectangle shapes without limitation. Further, while reference dots are coupled as shown in FIG. 18A, adjacent dot patterns may be arranged independently from one another with predetermined intervals in-between without limitation.

Third Example ("GRID5")

The third example of the dot pattern is called by an alias of "GRID5" by the Applicant.

"GRID5" uses "the way reference dots are arranged" instead of the key dot of "GRID0" for recognition of the range and direction of a dot pattern. To recognize the direction of a dot pattern by "the way reference dots are arranged," the dot pattern should be axially asymmetric so that the arrangement of reference dots does not become the same as the arrangement before rotation no matter how much the reference dots are rotated with any point as a center (excluding 360 degrees). Further, even if a plurality of pieces of dot patterns are coupled or concatenated by repeatedly arranging the dot patterns on top, bottom and/or left and right to one another, the ranges and orientations of the dot patterns should necessarily be recognized.

Further, even if a key dot is included as "GRID0," the range and direction of the dot pattern can be recognized as a dot pattern of "GRID5" that has no key dot by "the way reference dots are arranged" by having the key dot be recognized as a reference dot.

Further, as shown in FIGS. 22A to 23B, as a special example of "GRID5," "the way reference dots are arranged" can be used to specify only the range of a dot pattern, and the orientation of the dot pattern can be specified by the arrangement position of an information dot, that is, "the way a virtual point is arranged," the orientation of a predetermined information dot, or the arrangement rule thereof. In such a case, the dot pattern may be axially symmetrical where the arrangement of reference dots becomes the same as the arrangement thereof before rotation when the reference dots are rotated with an arbitrary point as a center (excluding 360 degrees). Further, even if a plurality of pieces of dot patterns are coupled or concatenated by repeatedly arranging the dot patterns on top, bottom and/or left and right to one another, only the ranges of the dot patterns should be recognized. It should be noted that the Applicant calls this case by an alias of a "direction dot."

Figure 21A:
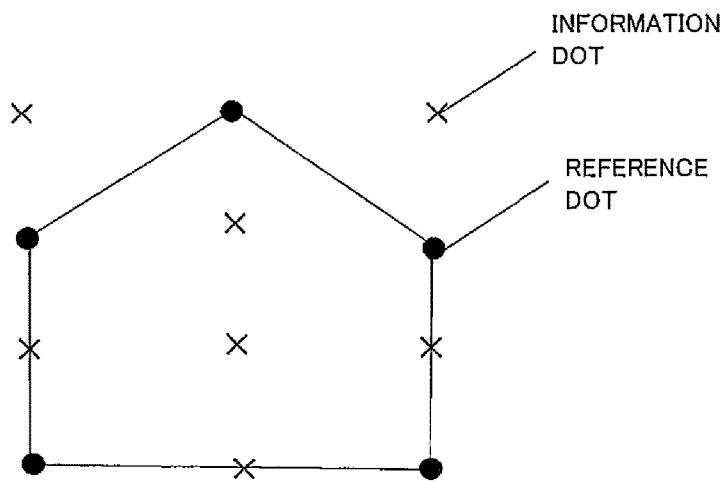
FIGS. 21A to 21C are for illustrating an embodiment of a third example of the dot pattern ("GRID5")
Figure 21B:
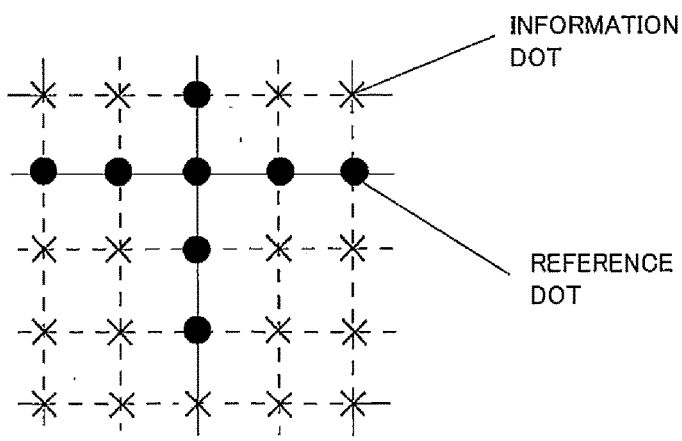
Figure 21C:
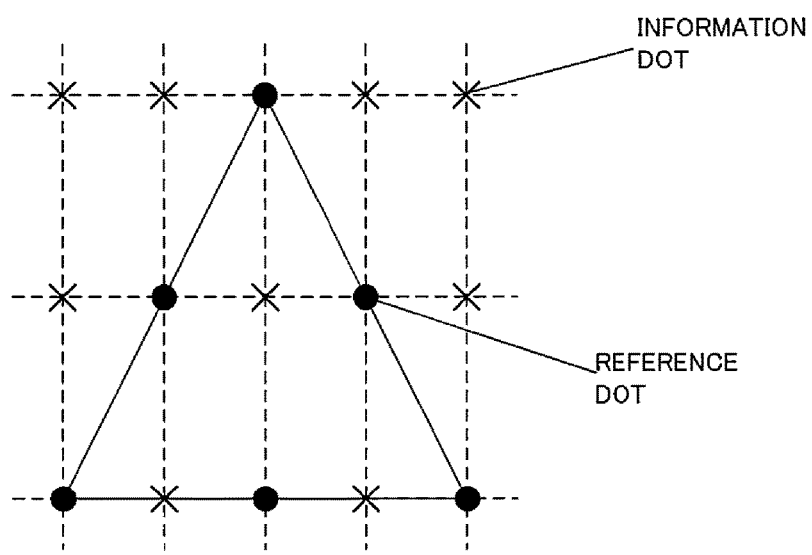

FIGS. 21A to 21C show general examples of the dot pattern of "GRID5." FIG. 21A shows an example where reference dots are arranged in a generally house shape that is asymmetric in a vertical direction; FIG. 21B, an example where reference dots are arranged in a generally cross shape that is asymmetric in a vertical direction; and FIG. 21C, an example where reference dots are arranged in a generally isosceles triangle shape that is asymmetric in a vertical direction, respectively.

It should be noted that the general examples of the dot pattern are not limited to the generally house shape, generally cross shape, or generally triangle shape as exemplified in FIGS. 21A to 21C.

Figure 22A:
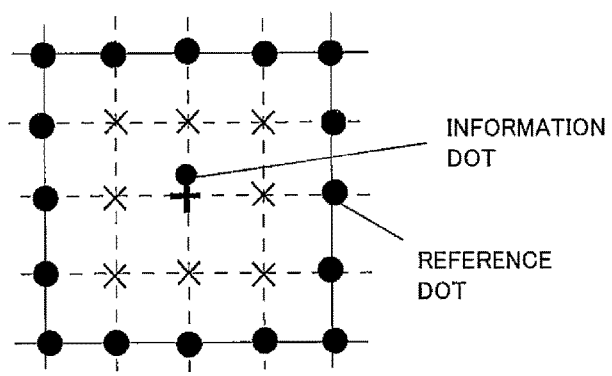
FIGS. 22A and 22B are for illustrating a variant of the dot pattern (a special example of GRID5, "direction dot")
Figure 22B:
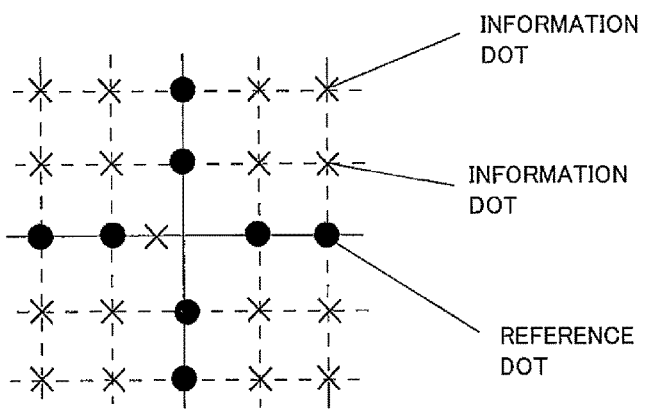

FIGS. 22A and 22B show general examples of a "direction dot" that defines the direction of a dot pattern. FIG. 22A arranges reference dots in a square shape so as to surround information dots, and the information dot at the center thereof defines the orientation of the dot pattern as a "direction dot" by the displaced direction of the "direction dot." It should be noted that the other information dots are arranged in + and × directions. In FIG. 22B, reference dots are arranged in a generally plus shape, and the "direction dot" at the center is arranged by being displaced in a certain direction, where the orientation of the dot pattern is defined by the displaced direction of the "direction dot." The arrangement of the "direction dot" that defines the orientation of the dot pattern, as shown in FIGS. 22A and 22B, may be arranged by displacing in any direction as long as the direction is predefined. Also, the other information dots may be defined in any manner with a distance and a direction from a virtual point.

Figure 23A:
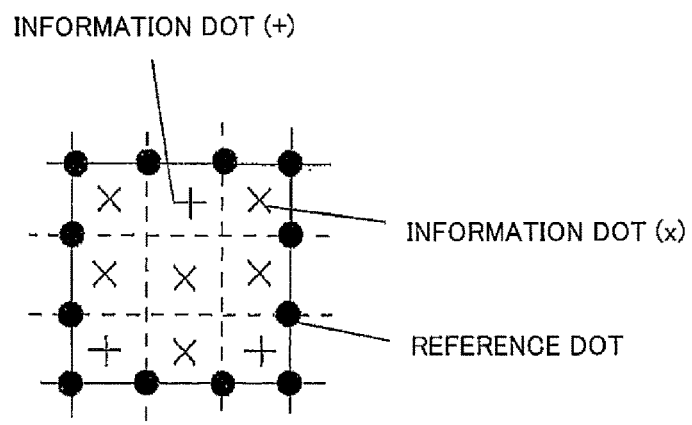
FIGS. 23A and 23B are for illustrating a variant of the dot pattern (direction dot)
Figure 23B:
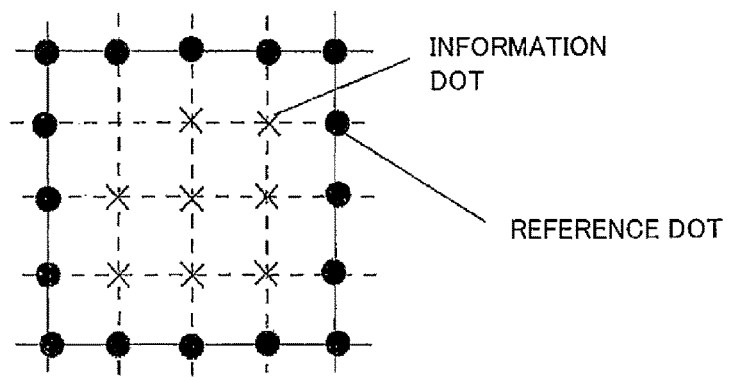

FIGS. 23A and 23B show variants of the "direction dot." FIG. 23A arranges reference dots in a square shape so as to surround information dots, and the orientation of the dot pattern is defined by arranging information dots of + directions at three positions. It should be noted that the other information dots are of × directions. That is, the orientation of the dot pattern is defined by the way "direction dots" are arranged, for which the arrangement rule of information dots is differentiated from other information dots.

FIG. 23B is an example in which the orientation of the dot pattern is defined by not arranging an information dot, that is, "the way a virtual point is arranged." In other words, as the reference dots are arranged in a square shape, the "orientation" of the dot pattern cannot be specified by the arrangement of the reference dots. As such, the "orientation" of the dot pattern is determined by not arranging a "reference dot" at one position of "virtual point" that is arranged within the region of the reference dots that are arranged in a square shape, that is, "the way a virtual point is arranged." It should be noted that the "virtual point" where a "reference dot" is not arranged may be any one of the three positions in the upper row or any one of the three positions in the lower row.

Figure 24A:
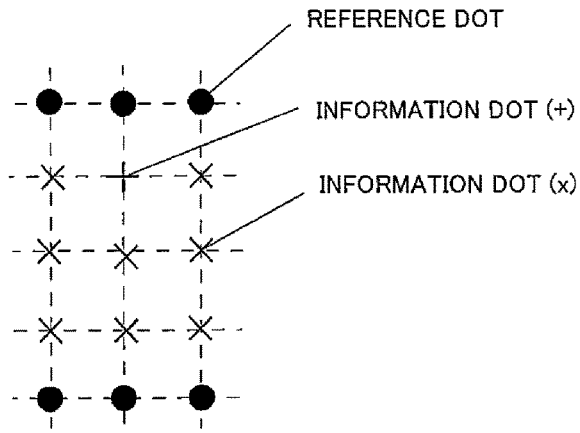
FIGS. 24A to 24C are for illustrating a variant of the dot pattern (direction dot)
Figure 24B:
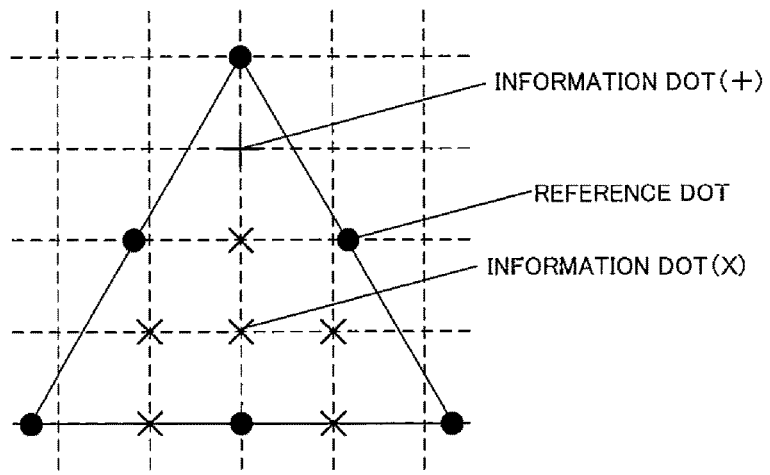
Figure 24C:
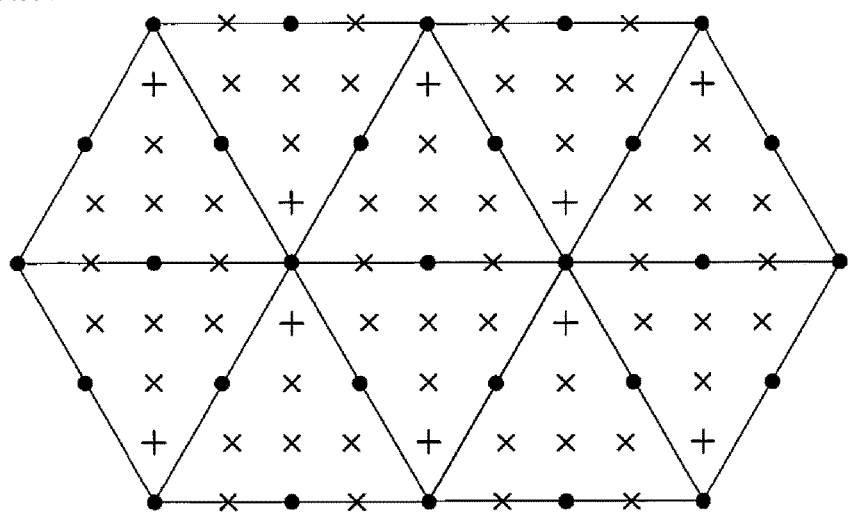

FIGS. 24A to 24C show variants of the "direction dot." In FIG. 24A, reference dots are arranged in a top row and a bottom row and information dots are arranged therebetween, and the orientation of the dot pattern is defined by the arrangement of the information dot of + direction at a position in the upper and lower positions other than the middle positions. It should be noted that other information dots are arranged in × directions. That is, the orientation of the dot pattern is defined by the way the "direction dot" is arranged where the arrangement rule of an information is differentiated from the other information dots. FIG. 24B determines the orientation of the dot pattern by arranging reference dots in an equilateral triangle shape and arranging information dots in a rectangle shape inside and outside of the triangle. FIG. 24C shows a coupling example of the dot patterns of FIG. 24B. FIG. 24C is a coupling example where a plurality of pieces of dot patterns, in each of which reference dots are arranged in an equilateral triangle shape, are arranged adjacently to one another such that parts of the reference dots are shared by the dot patterns. The condition of coupling is that the positions of dots on the both sides of top and bottom and/or left and right are the same positions in a piece of dot pattern. It should be noted that only the top and bottom or left and right may be coupled. It should be noted that, in this example, information dots on the bottom side of the equilateral triangle are shared. As such, when dot patterns are coupled, information dots as well as reference dots can be shared. However, information dots cannot be shared in cases where values vary for each dot pattern, such as coordinate values.

Figure 25A:
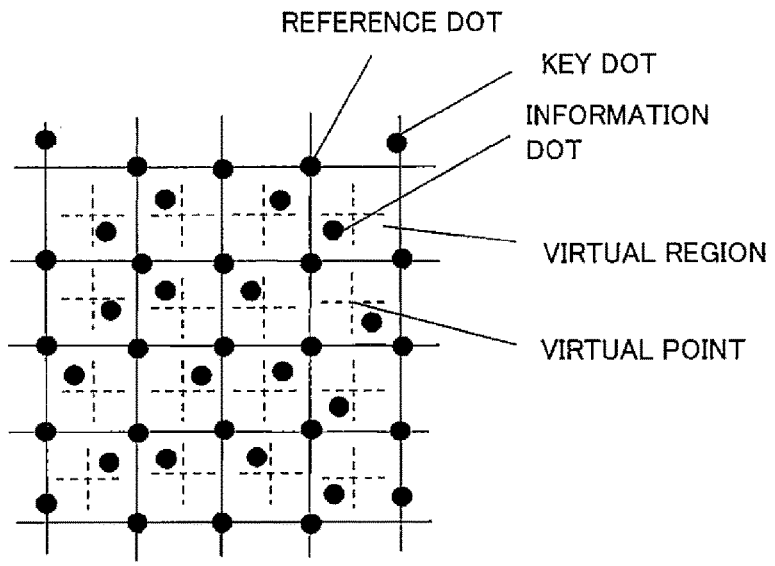
FIGS. 25A to 25C are for illustrating a variant of the dot pattern (GRID5)
Figure 25B:
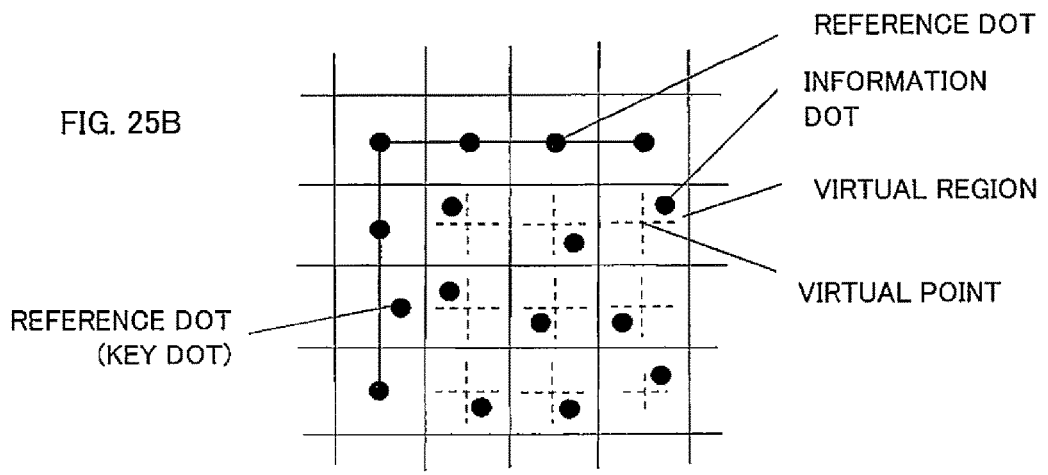
Figure 25C:
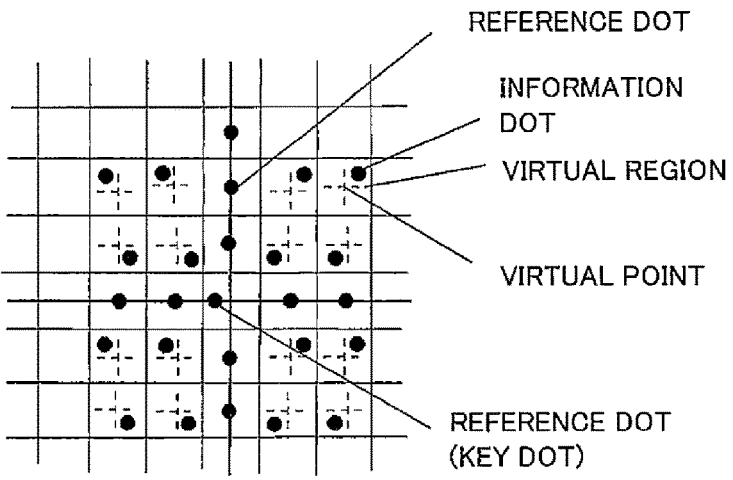

FIGS. 25A to 25C show variants of the dot pattern of "GRID5." FIG. 25A shows an example where reference dots are arranged in a generally square shape that is asymmetric in a vertical direction; FIG. 25B, an example where a key dot is also used and reference dots are arranged in a generally L shape that is asymmetric in a vertical direction; FIG. 25C, an example where a key dot is also used and reference dots are arranged in a generally cross shape that is asymmetric in a vertical direction, respectively.

It should be noted that the general examples of the dot pattern are not limited to the generally square shape, generally L shape or generally cross shape that are asymmetric in a vertical direction as exemplified in FIGS. 25A to 25C.

<Reading a Dot Pattern>

When the above dot patterns "GRID0," "GRID1," "GRID5" define the same code values within a predetermined region and are arranged repeatedly on top, down, left and right to one another, if an arbitrary region of a range of the same size of the range of the dot pattern is read, as shown in FIGS. 26A and 26B, information dots (1) to (16) that configure the original dot pattern ("circle 1 to circle 16" in FIG. 26A) or (1) to (9) ("circle 1 to circle 9" in FIG. 26B) are all included, whereby all defined code values can be read. As such, as the arrangement of information dots can be determined based on the orientation and range of the dot pattern, the arrangement rule of information dots that are configured as code values can also be specified. Further, as shown in FIG. 27, in the range of the dot pattern to be read in an arbitrary region, if either left or right information dot outside the range is read, the information dot and an information dot that is located at the other end have the same defined numerical value and are arranged at positions that are displaced by the same distance in the same direction from virtual points. The line segment that connects these two information dots forms a horizontal line. By moving this horizontal line in parallel, the horizontal line that passes through the virtual points can be accurately recognized. This parallel movement is, if there is a corresponding reference dot, equivalent to a distance of the movement of the reference dot from the current position until it reaches the horizontal line. Further, if a vertical line is recognized in a top to down direction by a like procedure, by calculating the position of an intersection of the horizontal line and the vertical line, the virtual point can be accurately calculated. According to this method, even if a dot pattern is imaged by an inclined optical reading device and the arrangement of the dots is largely deformed, the virtual point can be accurately calculated and the numerical value indicated by the information dot can be accurately recognized.

Next, the following will describe an embodiment of "GRID6" using FIGS. 28 to 60. The dot pattern of this embodiment is a dot pattern configured by a plurality of rows and a plurality of columns.

Figure 28:
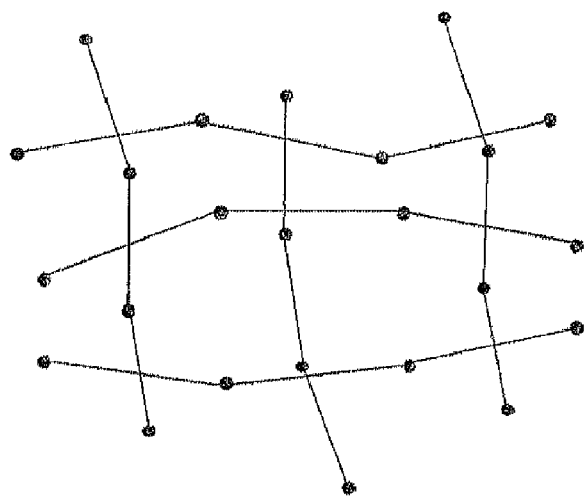
FIG. 28 is an explanatory diagram for illustrating an embodiment of a fourth example of the dot pattern ("GRID6")

FIG. 28 is a diagram showing a dot pattern of the present invention. The dot pattern comprises a plurality of information dots that are arranged over a plurality of rows and a plurality of columns.

The dot pattern is configured by encoded codes. In each piece of dot pattern that contains a different encoded code, the arrangement of information dots is determined so that there is a distance between adjacently arranged information dots.

Specifically, a code is encoded by at least any one of a permutation of the order of lengths of distance values between information dots that are adjacently arranged in each row and each column, a combination of the order of lengths, a permutation of ratios, a combination of the ratios, absolute values, a permutation of the absolute values, and a combination of the absolute values.

However, not all rows and columns are necessarily used for encoding of codes, only parts of rows and parts of columns may be used for encoding codes.

Preferably, a code is encoded on the basis of only any one of a permutation of the order of lengths of distance values between information dots that are adjacently arranged in each row and each column, a combination of the order of lengths, a permutation of ratios, a combination of the ratios, absolute values, a permutation of the absolute values, and a combination of the absolute values. As such, the number of codes that can be encoded can be dramatically increased by two-dimensionally arranging linear dot patterns and combining rows and columns of the numbers of codes that can be defined by the respective linear dot patterns.

The superiority of the invention lies in that information is encoded only based on relative evaluation of distances between adjacent dots without depending on encoding information based on the arrangement direction of a dot from a predetermined position (a virtual point) and whether or not a dot is arranged at a predetermined position, as in the prior techniques. Thus, the present invention contributes to achieve objectives where: (1) calculation of reading of dot patterns can be simplified and performed with high speed; (2) the security can be improved as the codes are hard to be decoded on visual basis; and (3) the information amount can be increased with a small number of dots.

Further, pieces of the dot patterns are normally concatenated with certain intervals in a top to bottom or left to right direction.

The dot pattern is printed on a paper surface (or displayed on display means), and the codes can be decoded by imaging the dot pattern by a camera device and analyzing the image data by a processor.

Analysis of the image data is done by extracting information dots from the image data, calculating distance values between adjacently arranged information dots, and decoding a code that corresponds to a permutation of the order of the length values between the information dots, a combination of the order of the length values thereof, a permutation of ratios, a combination of the ratios, absolute values, a permutation of the absolute values, or a combination of the absolute values.

Figure 29:
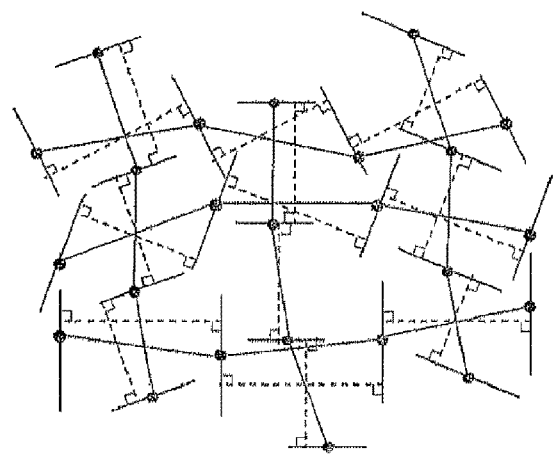
FIG. 29 is an explanatory diagram of the dot pattern (GRID6)

FIG. 29 is a diagram illustrating a case where codes are encoded based on distances that information dots have in predetermined directions in the dot pattern of FIG. 28.

For each row and each column used in encoding codes, a distance in a predetermined direction is calculated based on the predetermined direction that each start point information dot has for each row and each column.

Figure 30:
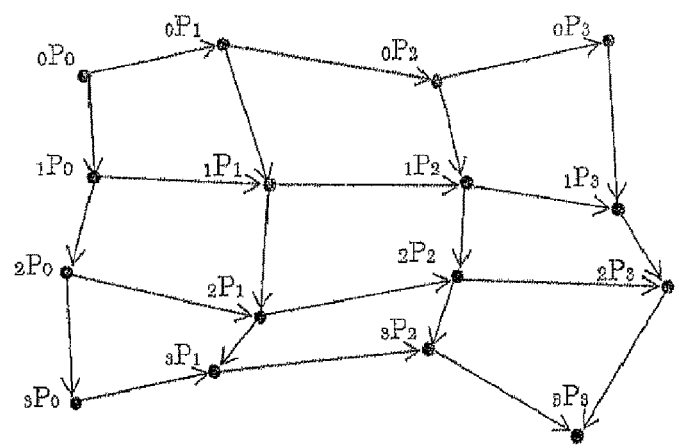
FIG. 30 is an explanatory diagram of the dot pattern (GRID6)

In the dot pattern shown in FIG. 30, a plurality of pieces of dot patterns, each of which is configured by a single row (or a column) and has a plurality of dots in the row (or the column), are arranged over a plurality of rows and a plurality of columns and share information dots that are adjacently arranged in each row and each column, thereby forming both rows and columns of the dot pattern. The number of information dots can be decreased by sharing the information dots of rows and columns. In this way, the dot density can be decreased, while further increasing the information amount per unit area. It should be noted, while not shown, parts of information dots may configure either rows or columns in the dot pattern.

Figure 31:
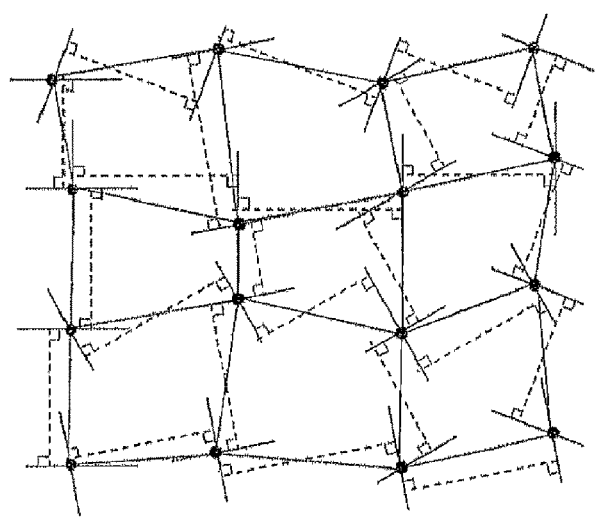
FIG. 31 is an explanatory diagram of the dot pattern (GRID6)

FIG. 31 is a dot pattern where codes are encoded based on distances in predetermined directions that information dots have.

Figure 32:
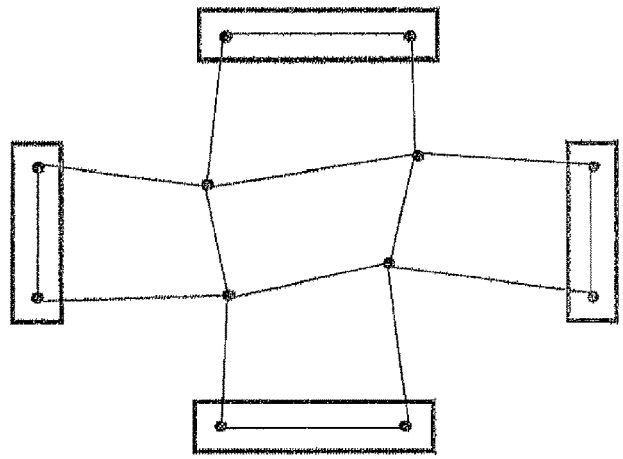
FIG. 32 is an explanatory diagram of the dot pattern (GRID6)

For each row and each column, distances in predetermined directions are calculated based on the predetermined direction that each start point information has. FIGS. 32 to 37 are diagrams, each for illustrating a dot pattern, where pieces of dot patterns are arranged over a plurality of rows and a plurality of columns and share information dots that are arranged adjacently in the rows and columns of the pieces of dot patterns to configure both rows and columns and reference dots are arranged at the ends thereof. FIG. 32 is a diagram for illustrating a dot pattern where reference dots are arranged with predetermined intervals on virtual reference lines that are drawn from start point information dots and end point information dots that are arranged in the top and bottom end rows and left and right end columns and orthogonally intersect the rows or columns.

Figure 33:
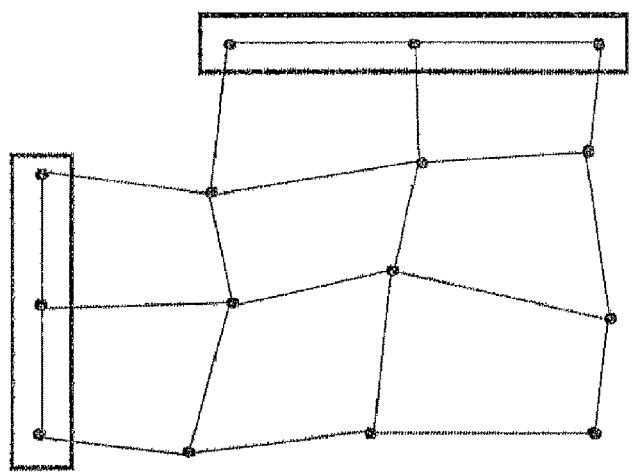
FIG. 33 is an explanatory diagram of the dot pattern (GRID6)
Figure 34:
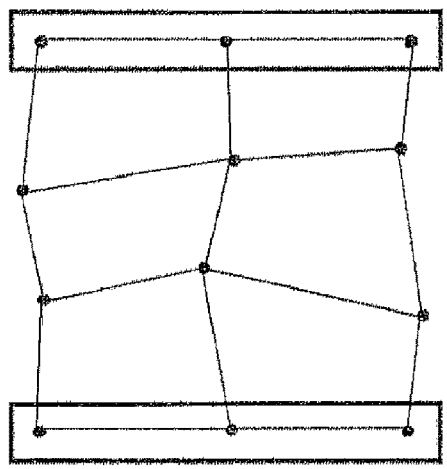
FIG. 34 is an explanatory diagram of the dot pattern (GRID6)
Figure 35:
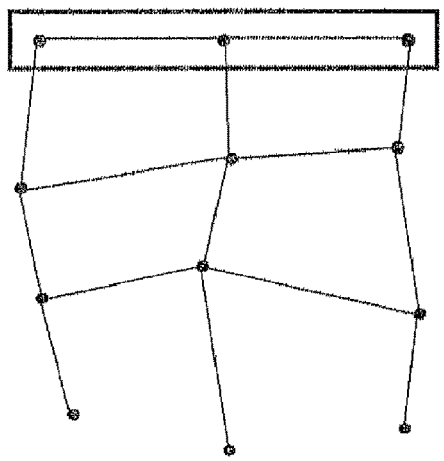
FIG. 35 is an explanatory diagram of the dot pattern (GRID6)

FIG. 33 is a diagram for illustrating a dot pattern where reference dots are arranged with predetermined intervals on virtual reference lines that are drawn from start point information dots (or the end point information dots) that are arranged in the top end row and the left end column and orthogonally intersect the rows or columns. It should be noted that reference dots may be arranged in the bottom end row and the right end column. That is, either row of the top and bottom ends and either column of the left and right ends may be the row and the column where reference dots are arranged. Information dots except for the reference dots encode codes based on the values of distances between the information dots that are adjacently arranged in row directions and column directions. Further, as shown in FIG. 34, start point information dots and end point information dots in top and bottom end rows may be rows where reference dots are arranged. Further, as shown in FIG. 35, start point information dots (or end point information dots) in a top end row may be a row where reference dots are arranged.

Figure 36:
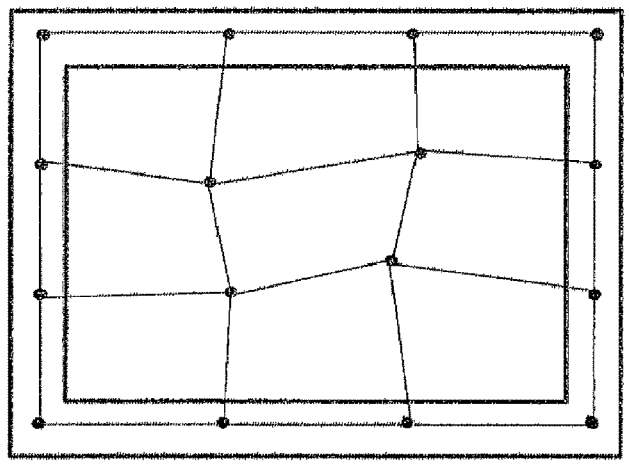
FIG. 36 is an explanatory diagram of the dot pattern (GRID6)
Figure 37:
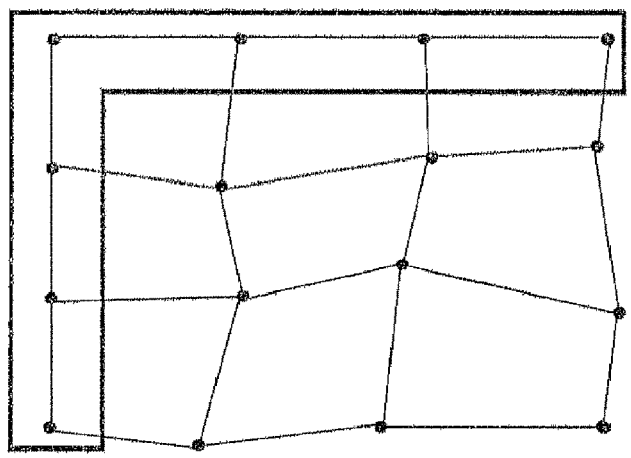
FIG. 37 is an explanatory diagram of the dot pattern (GRID6)

FIG. 36 is a diagram for illustrating a dot pattern where reference dots are further arranged at positions of intersections of virtual reference lines that orthogonally intersect the rows and columns in the dot pattern of FIG. 32. FIG. 37 is a diagram for illustrating a dot pattern where a reference dot is further arranged at a position of an intersection of virtual reference lines that orthogonally intersect the rows and columns in the dot pattern of FIG. 33. It should be noted that, while the above reference dots are not directly necessary for decoding codes, if a plurality of pieces of dot patterns are arranged by coupling or concatenating, reference dots are preferably arranged at the intersecting positions as a visual effect is reduced by not arranging reference dots at positions of intersections of the virtual reference lines and, thus, generating a pattern with absence of dots at the positions. Further, the reference dots can also be used for determining the direction of the dot pattern.

Figure 38:
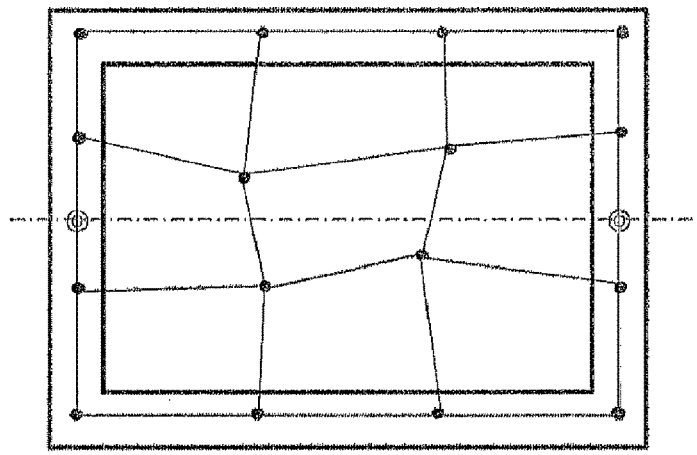
FIG. 38 is an explanatory diagram of the dot pattern (GRID6)
Figure 39:
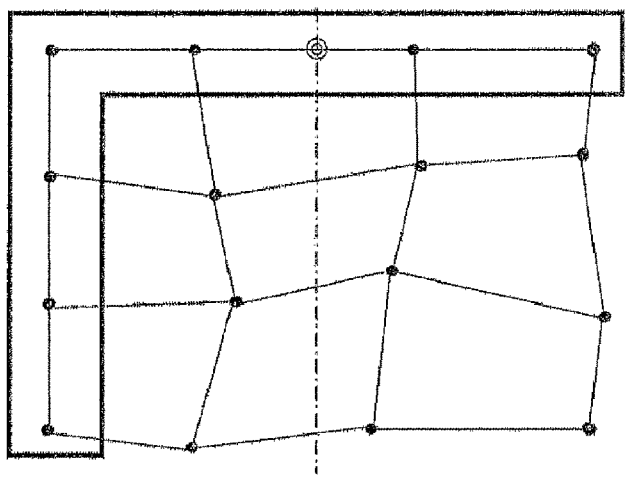
FIG. 39 is an explanatory diagram of the dot pattern (GRID6)

FIGS. 38 and 39 are diagrams for illustrating definitions of the orientation of a dot pattern.

The same dot pattern makes different analysis results and different processing results performed by a processor depending on which direction is determined as a correct position, that is, a basis for recognition of the dot pattern. Therefore, it is preferable to define the orientation of a dot pattern so that the direction on the basis of which the dot pattern is formed is recognized. While it will be described later, recognition of the orientation of a dot pattern is significantly important, particularly, when a plurality of pieces of dot patterns are arranged by coupling or concatenating.

FIG. 38 is a diagram of an example where the arrangement of reference dots in the dot pattern of FIG. 36 is changed and for illustrating a dot pattern where the orientation of the dot pattern is defined by determining the predetermined intervals so that the reference dots on the virtual reference lines become vertically asymmetric with reference to an alternate long and short dash line that orthogonally intersects the vertical virtual reference lines at the middle of the reference dots that are arranged at the both ends of the vertical virtual reference lines.

If the reference dots are vertically and horizontally symmetrical, recognition of the orientation of the dot pattern becomes difficult. Therefore, making the dot pattern vertically (or horizontally) asymmetric enables to determine the orientation of the dot pattern.

FIG. 39 is a diagram of an example where the arrangement of reference dots in the dot pattern of FIG. 37 is changed and for illustrating a dot pattern where the orientation of the dot pattern is defined by determining the predetermined intervals so that the reference dots on the virtual reference lines become horizontally asymmetric with reference to an alternate long and short dash line that orthogonally intersects the horizontal virtual reference lines at the middle of the reference dots that are arranged at the both ends of the horizontal virtual reference lines.

While reference dots are arranged only on one side in the dot pattern, if a plurality of pieces of dot patterns are arranged with certain intervals, the reference dots are arranged in vertical and horizontal directions. In such a case, if the reference dots become apparently symmetrical in vertical and horizontal directions, the orientation of the dot pattern becomes hard to be recognized. Therefore, the orientation of the dot pattern is enabled to be determined by making the dot pattern horizontally (or vertically) asymmetric.

Figure 40:
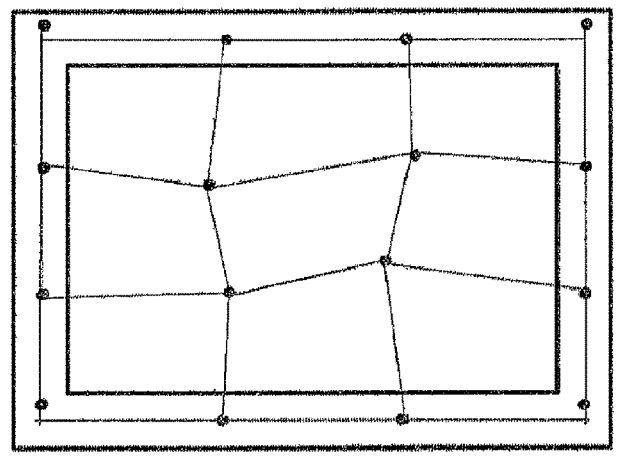
FIG. 40 is an explanatory diagram of the dot pattern (GRID6)

FIG. 40 is a diagram of an example where the arrangement of reference dots of the dot pattern of FIG. 36 is changed and for illustrating a dot pattern where the orientation of the dot pattern is defined by displacing the reference dots that are arranged on virtual reference lines in a predetermined direction.

The orientation of a dot pattern can be defined by the displacement of reference dots. In FIG. 40, the orientation of the dot pattern can be recognized since the reference dots that are supposed to be arranged on the four corners of the dot pattern are displaced upward. It should be noted that whether to decide the orientation of the dot pattern as top, bottom, left, or right when reference dots are displaced upward, is a matter of design.

Figure 41:
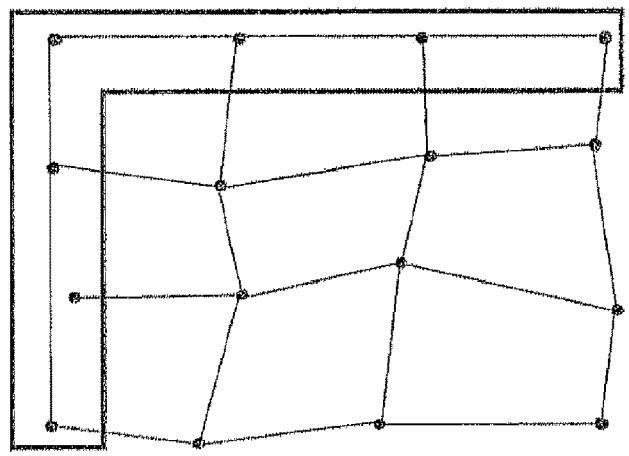
FIG. 41 is an explanatory diagram of the dot pattern (GRID6)

FIG. 41 is a diagram of an example where the arrangement of reference dots of the dot pattern of FIG. 37 is changed and for illustrating a dot pattern where the orientation of the dot pattern is defined by displacing a reference dot that is supposed to be arranged on a virtual reference line in a predetermined direction.

While reference dots are arranged only on one side in the dot pattern, if a plurality of pieces of the dot patterns are arranged with certain intervals, the reference dots are arranged in vertical and horizontal directions. In such a case, if the reference dots become apparently symmetrical in vertical and horizontal directions, the orientation of the dot pattern becomes hard to be recognized. Thus, the orientation of the dot pattern can be defined by displacement of a reference dot. In FIG. 41, the dot pattern can be recognized as being oriented in the right direction as the reference dot that is arranged third from the top on the left end is displaced rightward. It should be noted that whether to decide the orientation of the dot pattern as top, bottom, left, or right when a reference dot is shifted to rightward, is a matter of design.

Figure 42:
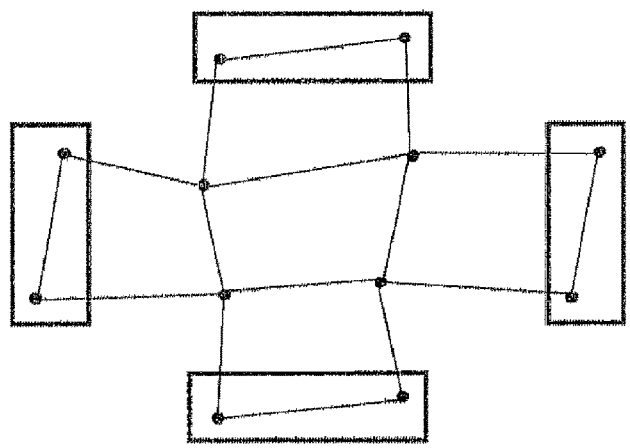
FIG. 42 is an explanatory diagram of the dot pattern (GRID6)

FIG. 42 is a diagram for illustrating a dot pattern where reference dots are arranged in a predetermined shape in a direction in which start point information dots and end point information dots that are arranged in the top and bottom end rows and left and right end columns orthogonally intersect the rows or columns. It should be noted that information dots except for the reference dots encode codes based on the values of distances between the information dots that are adjacently arranged in row directions and column directions, and the orientation of the dot pattern is defined by the arrangement shape of the reference dots.

Here, the orientation of the dot pattern is preferably defined by a predetermined shape that is expressed by the whole or a part of reference dots. This shape may be any shape that has been designed as a pattern in advance, provided that the orientation of the dot pattern can be defined from the shape when the shape is axially asymmetric where the shape does not become the shape before rotation after rotating 180 degrees with reference to the both ends of reference dots as the center. However, when a plurality of pieces of dot patterns are arranged by coupling, the arrangement is preferably such that the arrangement shape of reference dots can be distinguished from the linear arrangement shape of information dots.

Figure 43:
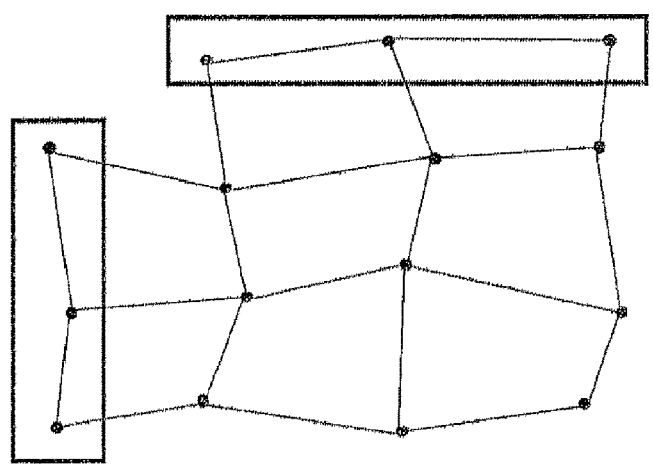
FIG. 43 is an explanatory diagram of the dot pattern (GRID6)

FIG. 43 is a diagram for illustrating a dot pattern where reference dots are start point information dots and end point information dots that are arranged in the top end row and the left end column that are arranged in a predetermined shape in a direction in which the row and column orthogonally intersect. It should be noted that reference dots may otherwise be arranged in the bottom end row and right end column. That is, either row of the top and bottom ends and either column of the left and right ends may be the row and the column where reference dots are arranged. Information dots except for the reference dots encode codes based on the values of distances between the information dots that are adjacently arranged in row directions and column directions, and the orientation of the dot pattern is defined by the arrangement shape of the reference dots.

While reference dots are arranged only on one side in the dot pattern, if a plurality of pieces of dot patterns are arranged with certain intervals, the reference dots are arranged in vertical and horizontal directions. In such a case, as the reference dots become apparently symmetric in vertical and horizontal directions, the orientation of the dot pattern becomes hard to be recognized. Thus, the orientation of the dot pattern is preferably defined by a predetermined shape that is expressed by the arrangement of the whole or a part of reference dots. This shape may be any shape that has been designed as a pattern in advance, provided that the orientation of the dot pattern can be defined when the shape is axially asymmetric where the shape does not become the shape before rotation after rotating 180 degrees with reference to the both ends of reference dots as the center. However, when a plurality of pieces of dot patterns are arranged by concatenation, the arrangement is preferably such that the arrangement shape of reference dots can be distinguished from the linear arrangement shape of information dots.

Figure 44:
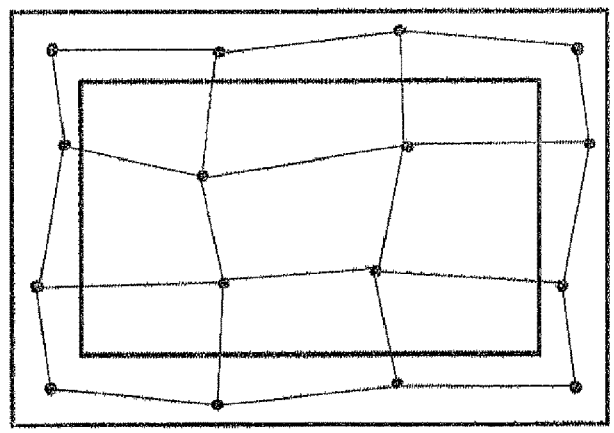
FIG. 44 is an explanatory diagram of the dot pattern (GRID6)

FIG. 44 is a diagram for illustrating a dot pattern where reference dots are further arranged at positions of orthogonal intersections of, and shared outside by, rows and columns where reference dots are arranged in predetermined shapes in the dot pattern of FIG. 42.

As such, even if reference dots are arranged in a predetermined shape, instead of being arranged in a straight line, reference dots can be further arranged at intersecting positions of directions of rows and columns in which the reference dots are arranged. In this way, when a plurality of pieces of dot patterns are arranged by coupling or concatenating, the dots are evenly arranged without absence of dots, enhancing a visual effect.

Figure 45:
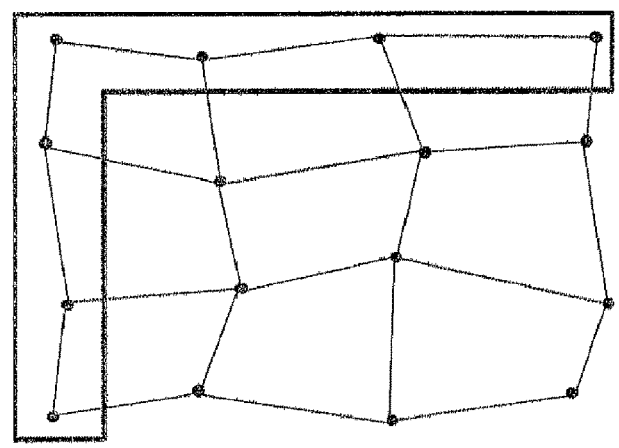
FIG. 45 is an explanatory diagram of the dot pattern (GRID6)
Figure 46:
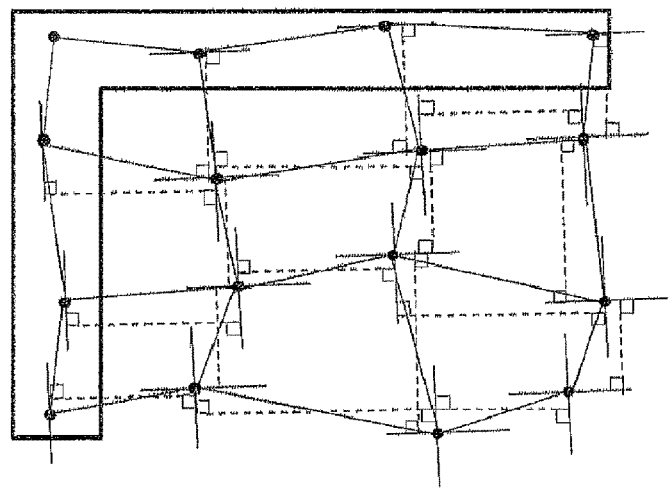
FIG. 46 is an explanatory diagram of the dot pattern (GRID6)

FIGS. 45 and 46 are diagrams for illustrating a dot pattern where a reference dot is arranged at a position of an orthogonal intersection of, and shared outside by, a row and a column where reference dots are arranged in predetermined shapes in the dot pattern of FIG. 43.

As such, even if reference dots are arranged in a predetermined shape, instead of being arranged in a straight line, reference dots can be further arranged at intersecting positions of directions of rows and columns in which the reference dots are arranged. In this way, when a plurality of pieces of dot patterns are arranged by concatenation, the dots are evenly arranged without absence of dots, enhancing a visual effect.

It should be noted that FIG. 46 is a diagram for illustrating a case where codes are encoded based on distances that information dots have in predetermined directions.

For each row and each column used in encoding codes, distances in predetermined directions are calculated based on the predetermined direction that each start point information dot has for each row and each column, while the predetermined directions in row directions and column directions are fixed in FIG. 46.

FIGS. 47, 48, 49, 50 are diagrams for illustrating the way of defining a predetermined direction that a start point information dot has. In FIGS. 47, 48, 49, 50, the predetermined direction that the information dots that are arranged adjacently in a row direction have is a perpendicular direction, and the predetermined direction that the information dots that are arranged adjacently in a column direction have is a vertical direction. Then, for a row direction, a distance between perpendicular lines of adjacent information dots is calculated. For a column direction, a distance between horizontal lines of adjacent information dots is calculated.

The perpendicular lines and horizontal lines can be easily set and these lines can be easily analyzed by a processor. Therefore, by defining a perpendicular direction as the predetermined direction for the information dots that are arranged adjacently in a row direction and defining a horizontal direction as the predetermined direction for the information dots that are arranged adjacently in a column direction, the processor can easily calculate distances in the predetermined directions.

Figure 47:
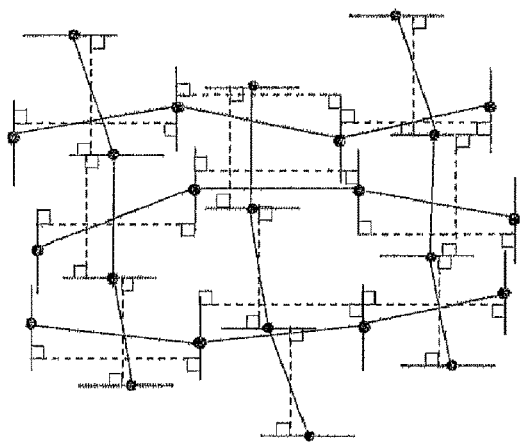
FIG. 47 is an explanatory diagram of the dot pattern (GRID6)

The dot pattern shown in FIG. 47 is the dot pattern of FIG. 28.

Figure 48:
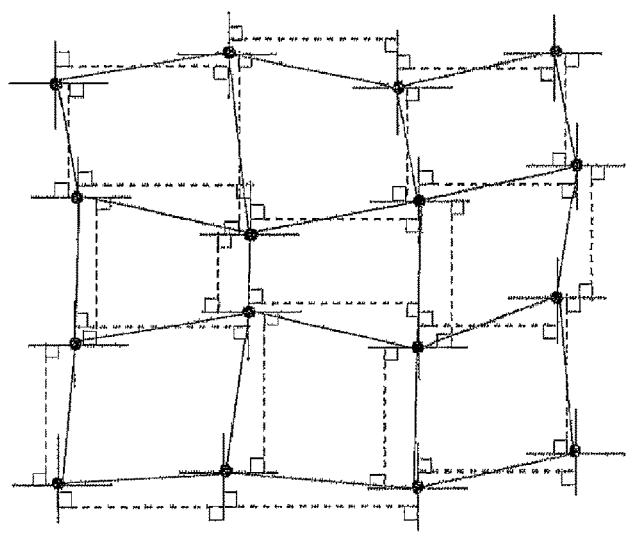
FIG. 48 is an explanatory diagram of the dot pattern (GRID6)

The dot pattern shown in FIG. 48 is the dot pattern of FIG. 30.

Figure 49:
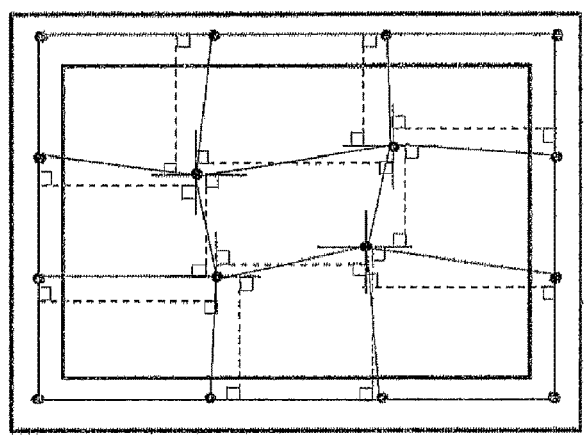
FIG. 49 is an explanatory diagram of the dot pattern (GRID6)

The dot pattern shown in FIG. 49 is the dot pattern of FIG. 36.

Figure 50:
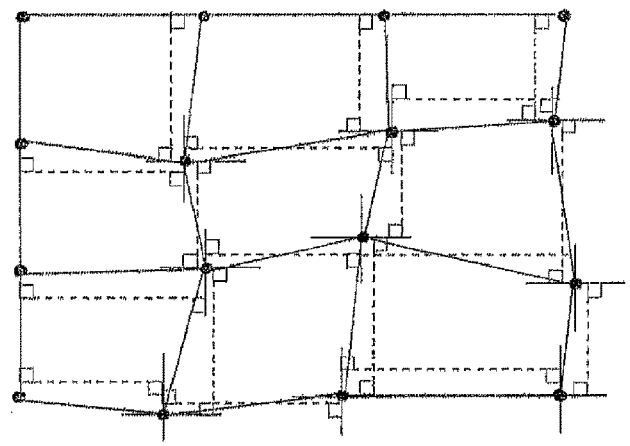
FIG. 50 is an explanatory diagram of the dot pattern (GRID6)

The dot pattern shown in FIG. 50 is the dot pattern of FIG. 37.

Figure 51:
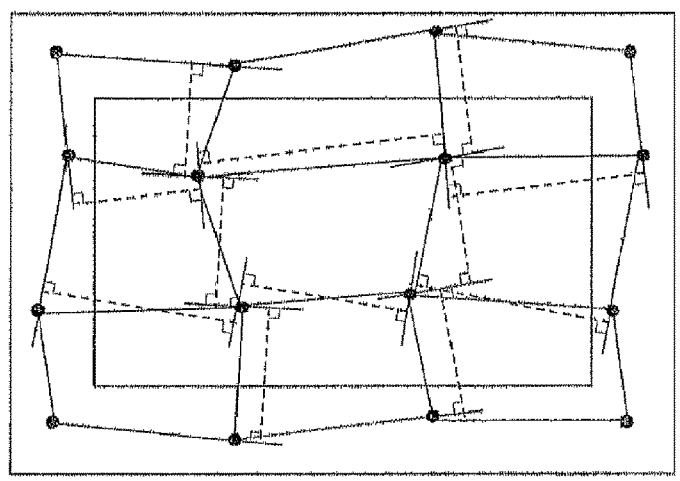
FIG. 51 is an explanatory diagram of the dot pattern (GRID6)
Figure 52:
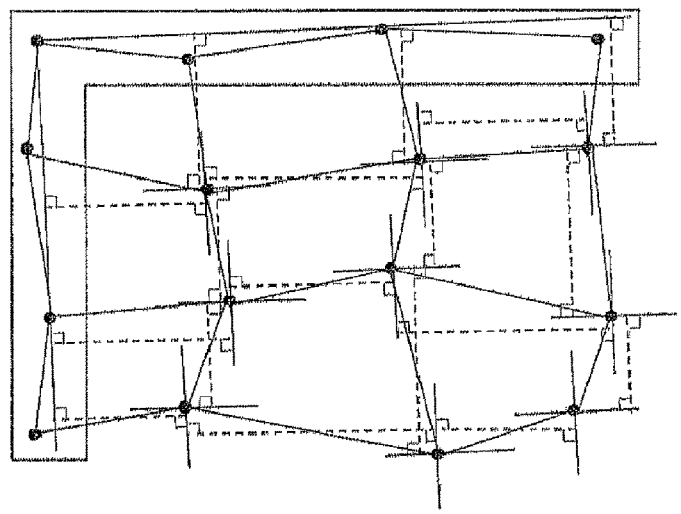
FIG. 52 is an explanatory diagram of the dot pattern (GRID6)

FIGS. 51 and 52 are diagrams for illustrating the way of defining a predetermined direction that information dots have.

In this example, the predetermined direction that information dots that are arranged adjacently in a row direction or in a column direction have is a direction of a line segment that connects two reference dots.

The dot pattern shown in FIG. 51 is the dot pattern of FIG. 44 configured by four rows×four columns. The predetermined direction that the information dots that are arranged adjacently in a row direction in the second row have is provided in a direction that is perpendicular to line segments that respectively connect the first and second reference dots from the top on the right end and the left end. The predetermined direction that the information dots that are arranged adjacently in a row direction in the third row have is provided in a direction that is perpendicular to line segments that respectively connect the second and third reference dots from the top on the right end and the left end. The predetermined direction that the information dots that are arranged adjacently in a column direction in the second column have is provided in a direction that is perpendicular to line segments that respectively connect the first and second reference dots from left respectively on the top end and the bottom end. The predetermined direction that the information dots that are arranged adjacently in a column direction in the third column have is provided in a direction that is perpendicular to line segments that respectively connect the second and third reference dots from left respectively on the top end and the bottom end.

The dot pattern shown in FIG. 52 is the dot pattern of FIG. 45, which is configured by four rows×four columns. The predetermined direction that the information dots that are arranged adjacently in a row direction have is provided in a direction that is perpendicular to a line segment that connects the first and third reference dots from the top on the left end. The predetermined direction that the information dots that are arranged adjacently in a column direction have is provided in a direction that is perpendicular to a line segment that connects the first and third reference dots from left on the top end.

As such, the reference dots to be connected do not have to be adjacent reference dots.

It should be noted that, in the above example, reference dots may also define information. That is, a numerical value is also defined by at least any one of a permutation of the order of lengths of distances between adjacently arranged reference dots or distance values thereof in a predetermined direction, a combination of the order of the lengths, a permutation of ratios, a combination of the ratios, absolute values, a permutation of the absolute values, and a combination of the absolute values. In this way, a great deal of information can be encoded in a dot pattern while clearly specifying the boundary portion of concatenated pieces of dot patterns.

Figure 58:
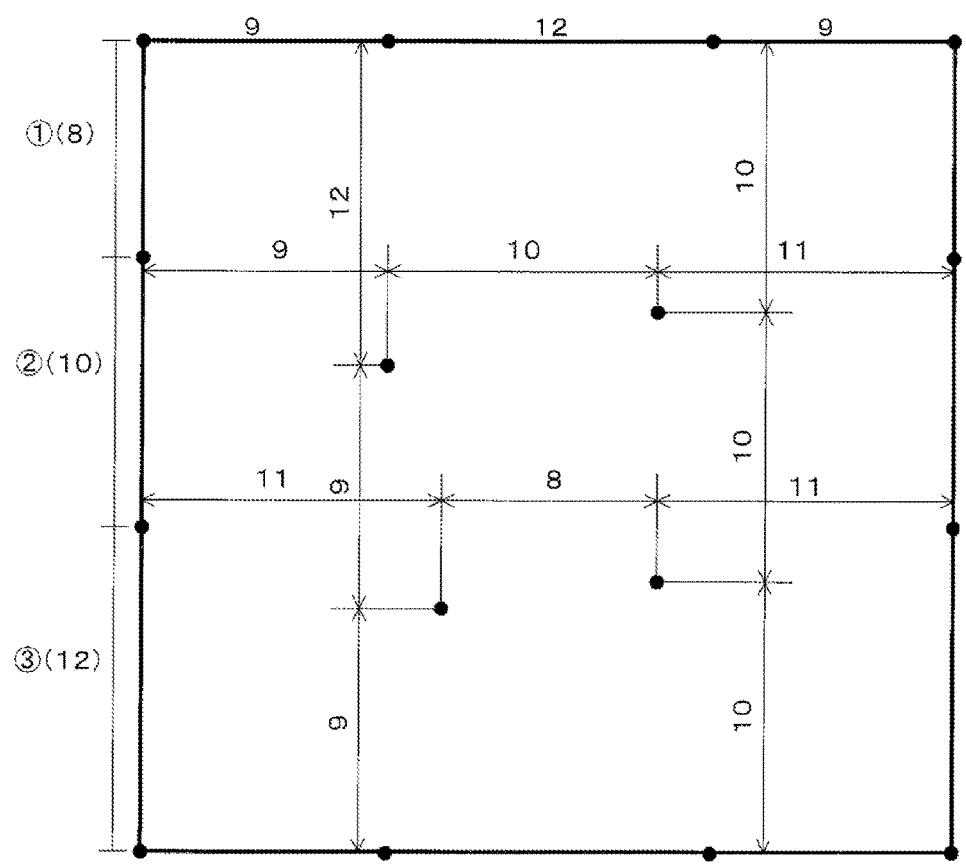
FIG. 58 is an explanatory diagram of the dot pattern (GRID6)

Further, according to the dot pattern of FIG. 58, the reference dots on the left end have a permutation of distance values (8), (10), (12) from the top. By not using this permutation for a permutation of distances between other dots, the orientation of the dot pattern and the boundary thereof can be defined by the reference dots on the left end.

Figure 53:
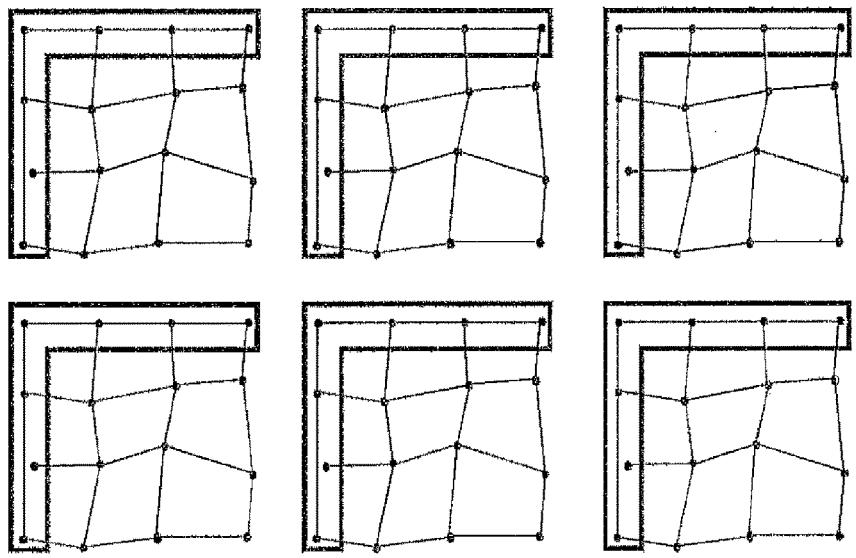
FIG. 53 is an explanatory diagram of the dot pattern (GRID6)

The following will describe a case in which a plurality of the above dot patterns are arranged. A plurality of pieces of the dot patterns shown in FIG. 41 may be arranged by concatenation with predetermined intervals in horizontal and vertical directions as shown in FIG. 53.

Figure 54:
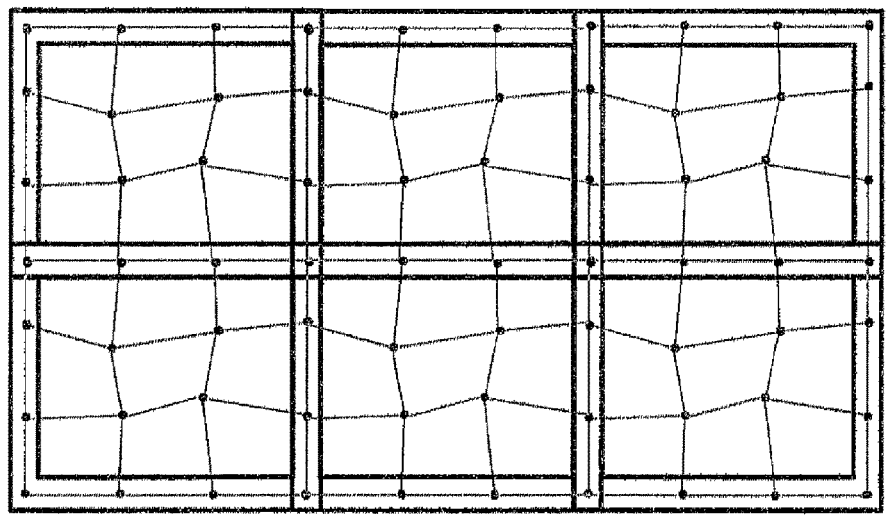
FIG. 54 is an explanatory diagram of the dot pattern (GRID6)
Figure 55:
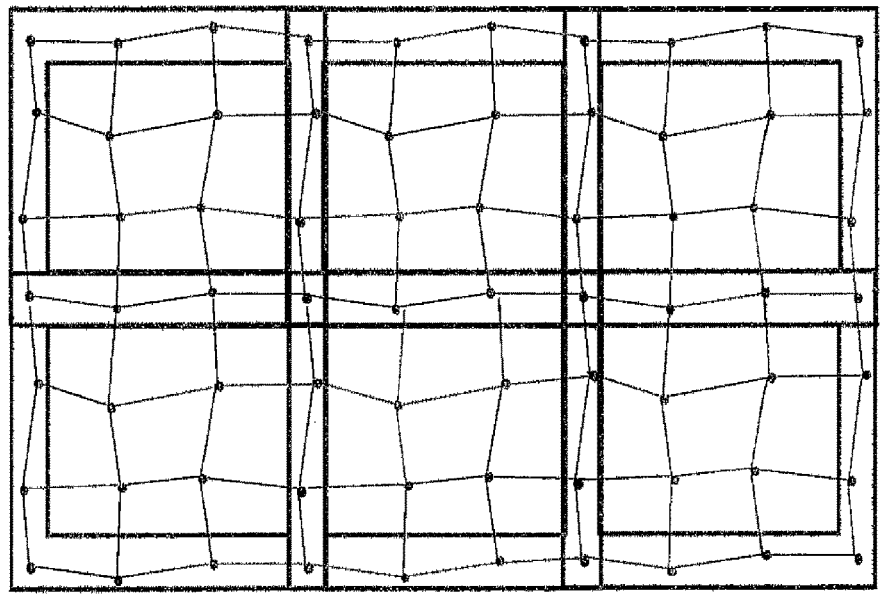
FIG. 55 is an explanatory diagram of the dot pattern (GRID6)

Further, the dot patterns shown in FIGS. 38 and 44 are dot patterns that have reference dots on both ends, where reference dots that are arranged on both ends of a plurality of rows and/or both ends of a plurality of columns are arranged in the same shape and the reference dots that are arranged in the same shape are superimposedly coupled on left, right, top, and bottom to one another as shown in FIGS. 54 and 55.

Figure 56:
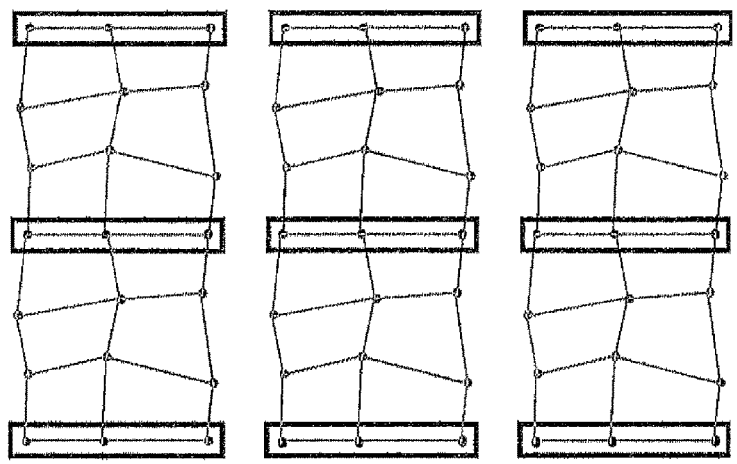
FIG. 56 is an explanatory diagram of the dot pattern (GRID6)

Further, a plurality of pieces of the dot patterns shown in FIG. 34 may be arranged, as shown in FIG. 56, such that the reference dots that are arranged on both ends of a plurality of rows and/or both ends of a plurality of columns are arranged in the same shape, the plurality of the reference dots that are arranged in the same shape are superimposedly coupled in a left-to-right or top-to-bottom direction, and, for the other direction, the dot patterns may be arranged by concatenation with certain intervals.

Figure 57A:
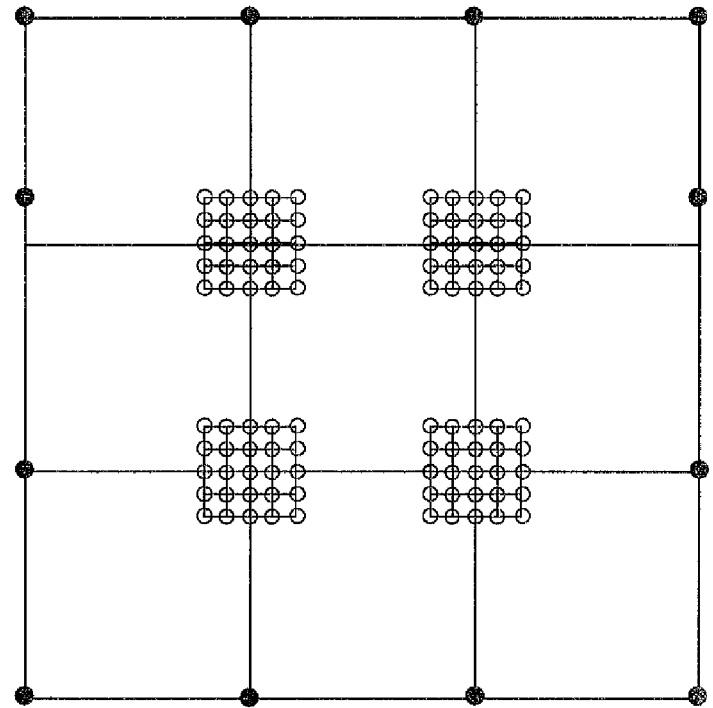
FIG. 57 is an explanatory diagram of the dot pattern (GRID6)
Figure 57B:
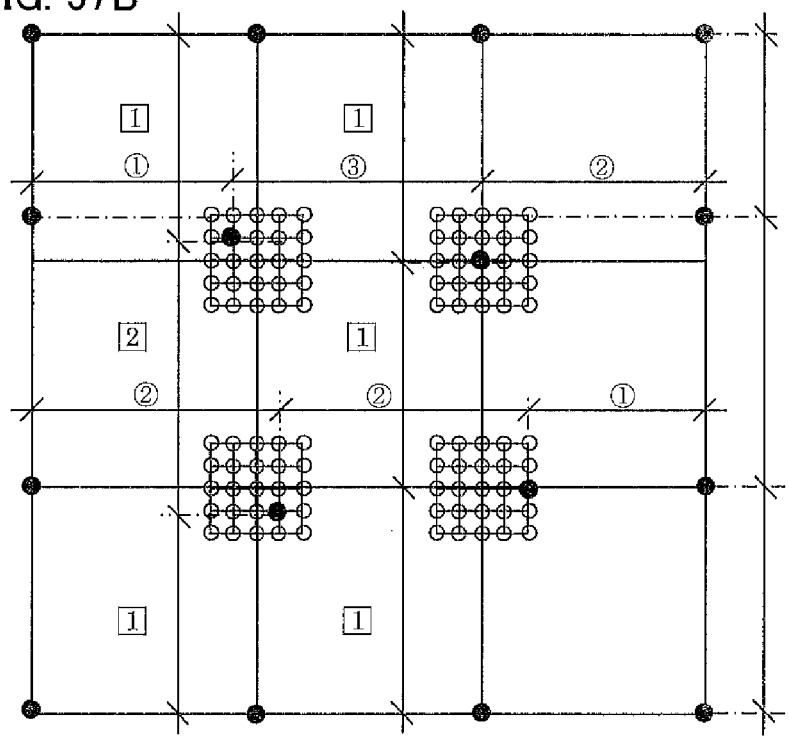

Here, the following will describe: a dot pattern generation method for arranging reference dots on both ends of rows and columns; and encoding of codes based on a distance in a predetermined direction between information dots, with reference to FIGS. 57A and 57B. The dot pattern as an object is configured by four rows×four columns, and the orientation of the dot pattern is defined by displacing upward the reference dots in the second row among vertical reference dots that are arranged with even intervals in the left and right columns. The horizontal reference dots that are arranged in the top and bottom rows are arranged with even intervals. The reference dots of the second column and third column are connected from top to bottom to form the first and second virtual vertical lines, and the reference dot in the second row and the reference dot in the third row on the left and right rows before being displaced are connected from left to right to form the first and second virtual horizontal lines.

If the interval of the reference dots is ten, with four points where the first and second virtual vertical lines and the first and second virtual horizontal lines intersect as centers, 5×5 virtual points are arranged for arranging information dots by defining the arrangement interval of the virtual points in vertical and horizontal directions as one as shown in FIG. 57A.

The combinations of distances between three information dots in predetermined directions are four patterns of lengths (9, 10, 11), (9, 9, 12), (8, 11, 11), (10, 10, 10), where the distances are set to make a total of 30. That is, in the order of lengths from the shortest one, the combinations will be ((1)st, (2)nd, (3)rd), ((1)st, (1)st, (2)nd), ((1)st, (2)nd, (2)nd), ((1)st, (1)st, (1)st). In an actual arrangement, the order of the arrangement of distances in predetermined directions will be based on codes that are encoded by a permutation combination. Therefore, as 13 patterns of codes can be encoded by each row or column, all rows and columns can define $13^4=28,561$ patterns of codes. Here, the increments of distances in different predetermined directions are set with 10% or more differences in the order from the shortest distance. This is set so as to be able to accurately determine the order of distances between information dots on the premise that an error of the distance value between information dots is approximately 5% in consideration of the displacement of printing, distortion of a print medium, and inclination of a camera when reading the dot pattern (30 to 40 degrees). As such, if a difference is less than approximately 7.5%, the distances are determined as the same distances, thus, they are recognized as the same order. However, the error needs to be set after thorough substantive experiments based on use conditions, as the error is different depending on the resolutions of the camera and the performance of the lens in the inclination of the camera that most largely affects the deformation of the arrangement positions of the dots.

Here, for the arrangement of vertical reference dots for specifying the orientation of the dot pattern, the reference dot in the second row is shifted upward by two. As the result, the distances become (8, 12, 10) from the top, and this column (8, 12, 10) can be specified as the vertical reference dots since there is no other arrangement that has the same values of the distances between information dots in a predetermined direction. As such, as the region and orientation of the dot pattern is specified, the horizontal reference dots can also set the same amount of codes as the permutation combinations of distances between the other three information dots in a predetermined direction. As the result, all rows, columns, and horizontal reference dots can define $13^5=371,293$ patterns of codes.

FIG. 57B is an example of actually arranging information dots. First, by defining distances in predetermined directions between information dots in row directions, it is determined that an information dot is arranged at one of each five virtual points in a vertical direction among 5×5 virtual points. Next, by defining distances in predetermined directions between information dots in column directions, as an information dot is arranged at one of the above-described five virtual points, the arrangement of all information dots is uniquely determined upon encoding of codes.

It should be noted that, while the distance between reference dots is defined as ten, the distance may be any numerical value as long as the displacement of reference dots and the arrangement of information dots may be set in similar ratios with reference to the numerical values between reference dots. In consideration of current printing technologies, precision and performance of cameras, and imaging area thereof, the distance between reference dots may be 10 pixels in the printing precision of 600 DPI. It should be noted that the size of dots may be 1 pixel to 2×2 pixels. While 1 pixel is preferred taking into account the visual effect for printing dots, if there is large dispersion in printing, the recognition rate can be maintained using 2×2 pixels.

<First Example of Dot Pattern Generation Method and Code Encoding>

FIGS. 58 and 59 show the number of code allocation that can be expressed by the invention.

The reference dots on the left end have a permutation of distance values (8), (10), (12) from the top. By not using this permutation for a permutation of distances between the other dots, the orientation of the dot pattern and the boundary thereof can be defined by the reference dots on the left end.

As shown in FIG. 59, if codes are expressed only by information dots, the fourth power of 13, 18,561 patterns of the number of codes can be expressed, while, if information is also defined by reference dots, the fifth power of 13, 371,293 patterns of the number of codes can be expressed.

If the number of codes that can be expressed by the dot patterns of the prior techniques are explained in the same conditions as FIG. 58, when there are four information dots, if codes are expressed by displacement in eight directions from respective reference points, the number of codes is the fourth power of 8, 4096 patterns; if codes are expressed by displacement in eight directions as well as by long and short two patterns of distances, the number of codes is the fourth power of 16, 65536 patterns. Therefore, the number of codes that can be expressed by the same number of dots has been significantly improved by the present invention.

<Second Example of Dot Pattern Generation Method and Code Encoding>

While the above dot pattern generation method, which encodes codes by combinations of permutations of the lengths of distances based on the distances in predetermined directions between reference dots, has been described as a method of uniquely encoding codes by arranging dots at predetermined positions, if the following conditions can be satisfied, there is at least one candidate for the positions where dots are arranged, thus, the dots may be arranged in any algorithm. This means that the same codes can be encoded by different dot arrangements, making decryption of codes harder and making the codes superior in security.

(1) The distances in predetermined directions between information dots are $L_1$, $L_2$, $L_3$ from the shortest one (if any two are the same distances, the distances are $L_1$, $L_2$; if three of them are the same distances, only $L_1$).

(2) With reference to the distances, the next longest distance is elongated $\alpha$ ($\alpha>1$) times or more. It should be noted that $\alpha$ does not have to be the same between all information dots and may vary for each distance therebetween.

$$\alpha L_1 < L_2, \alpha L_2 < L_3$$

(3) If a camera images the dot pattern in a state where the camera is inclined by 30 to 40 degrees, the intervals between four information dots that are arranged with equal intervals in a straight line are distorted, making shorter intervals for some positions. Further, taking into account the influence of displacement of printing and distortion of a print medium, with reference to the maximum value of intervals of the information dots that are arranged in the straight line, the minimum value caused by an error reduces a distance in a predetermined direction approximately $\beta$ ($1/\beta<\alpha, \beta<1$) times as much at most.

$$L_1 < \beta L_2, L_2 < \beta L_3$$

That is, $L_1$, $L_2$, $L_3$ need to be set so that $L_1<\beta L_2$, $L_2<\beta L_3$ are determined, even in consideration of distortion.

Further, if distances between the information dots are the same, the distances should be set so that they are determined as the same even in consideration of distortion.

For example, if three distances are respectively $L_1$, $L_1$, $L_2$, $L_1$, $L_1$, $L_2$ are set so that $$L_1 = \beta L_1, L_1 < \beta L_2$$

are determined.

In the case where all three distances are the same $L_1$, $L_1$ is set so that $$L_1 = \beta L_1$$

is determined.

(4) From the shorter distances in predetermined directions between the information dots, a threshold $\gamma$ ($1/\beta<\gamma<\alpha$, $\gamma>1$) for determining the next shortest distance between the information dots is set. It should be noted that this threshold $\gamma$ is used when decoding codes.

$$\gamma L_1 < L_2 < \gamma \alpha L_1, \gamma L_2 < L_3 < \gamma \alpha L_2$$

Determination that the shortest distance $L_1$ in a predetermined direction between the information dots and the distance $L_1'$ that is made as the same distance as $L_1$ are the same distances or that the second shortest distance $L_2$ and the distance $L_2'$ that is made as the same distance as $L_2$ are the same distances, is made as follows:
if $L_1$ and $L_1'$ are the same distance: $\gamma L_1 > L_1'$
if $L_2$ and $L_2'$ are the same distance: $\gamma L_1 < L_2 < \gamma\alpha L_1$ and $\gamma L_1 < L_2' < \gamma\alpha L_1$ (5) Here, with reference to the scale factor β caused by an error due to distortion of the arrangement of the information dots in the image taken with an inclined camera, displacement of printing, and distortion of a print medium, in determination of the scale factor α for determining distances in predetermined directions between the information dots from the shorter ones, the safety rate (an increment ratio in design with reference to the increment ratio caused by an error) is preferably determined as approximately twice as much allowing sufficient leeway.
Therefore,
$2(1/\beta-1)=\alpha-1$, which can be converted to $\alpha=2/\beta-1$.

The above safety rate is defined based on the extent to which the misrecognition rate is suppressed, taking into account how much the camera is inclined, the amount of displacement of printing, and how much distortion of a print medium occurs, thus, in a thorough consideration of which, the safety rate may be arbitrary defined.

(6) The threshold γ of (5) preferably takes around the middle value between $1/\beta$ and α. That is, γ may be $\gamma=1.5/\beta-0.5$. It should be noted that this threshold γ is used when encoding codes.

It should be noted that, while, only comparison of distances is used in this description, as the order of lengths is determined based on the distances in predetermined directions between information dots and codes are encoded by combinations of permutations, instead, codes may be encoded using the numerical values of distances by setting a threshold for identifying numerical values of predetermined distances between the read information dots to calculate the numerical values of predetermined distances.

In such a case, if the numerical value of a distance that is set when generating a dot pattern is defined as D, D can be specified from $\gamma_1 \leq D \leq \gamma_2$ as a threshold, where γ1, γ2 are set as absolute values, in consideration of errors caused by distortion of the arrangement of information dots when an image is taken with an inclined camera, displacement of printing, and distortion of a print medium. It should be noted that this method may be used to search reference dots that have distances between the reference dots that are different from distances between information dots in predetermined directions. Further, numerical values of predetermined distances between read information dots and orders of the distances can be used in combination. This means that the same codes can be encoded by different dot arrangements, making decryption of codes harder and making the codes superior in security. Further, by allocating variable information, such as production date and shipping date, to the numerical values of distances and assigning a serial number to the order of the distances, advanced traceability can be realized. It will be appreciated that the information to be allocated to the numerical values of distances and to the combination of the orders of the distances may be the other way around.

While the above description explained a dot pattern generation method and encoding of codes, in which codes are encoded by combinations of permutations of lengths of distances between information dots in predetermined directions, the above encoding conditions (1) to (6) can also be applied to a dot pattern in which codes are encoded by combinations of permutations of lengths of distances between information dots.

<Method of Reading a Dot Pattern that was Generated Based on Distances Between Information Dots in Predetermined Directions and Encoding of Codes>

As described above, reading the dot pattern by the optical reading device includes:

(1) binarizing a captured dot pattern image and specifying pixels that configure dots.

(2) calculating a representative point of dots from coordinate values of pixels that configure dots. The coordinate value of the center of the dots (an average coordinate value) may be calculated as the coordinate value of a representative point by simply adding X and Y coordinate values of pixels and dividing the sum by the number of pixels that constitute the dots. Further, in order to more accurately calculate the coordinate value of the representative point, in binarization of (1), the coordinate value of the representative point of the dots may be calculated by the above method by weighting for the level of darkness for each pixel.

(3) from the coordinate values of the dots, searching first lined-up dots that line up in a straight line and searching second lined-up dots that line up in a straight line and intersect the first lined-up dots. It should be noted that, while the above-described intersecting is normally orthogonal intersecting, the orthogonal intersecting is not maintained if the dot pattern is imaged by inclining the optical reading device with reference to the paper surface, thus, the second lined-up dots should be searched in consideration of intersecting with an angle of a predetermined range.

(4) searching lined-up reference dots that specify the orientation of the dot pattern based on the first lined-up dots and second lined-up dots. The search method searches the lined-up reference dots by defining the distance between reference dots as $D_n$ (n is a number that indicates a certain one of the intervals of the reference dots), setting the thresholds $_n\gamma_1$, $_n\gamma_2$ as absolute values, and specifying $D_n$ from $_n\gamma_1 \leq D \leq _n\gamma_2$.

(5) if the lined-up reference dots that specify the orientation of the dot pattern can be identified either by the first or second lined-up dots, and the other lined-up reference dots also satisfy the conditions, performing the next processing; otherwise, performing the processing from (3) again to search other first and second lined-up dots.

Figure 60:
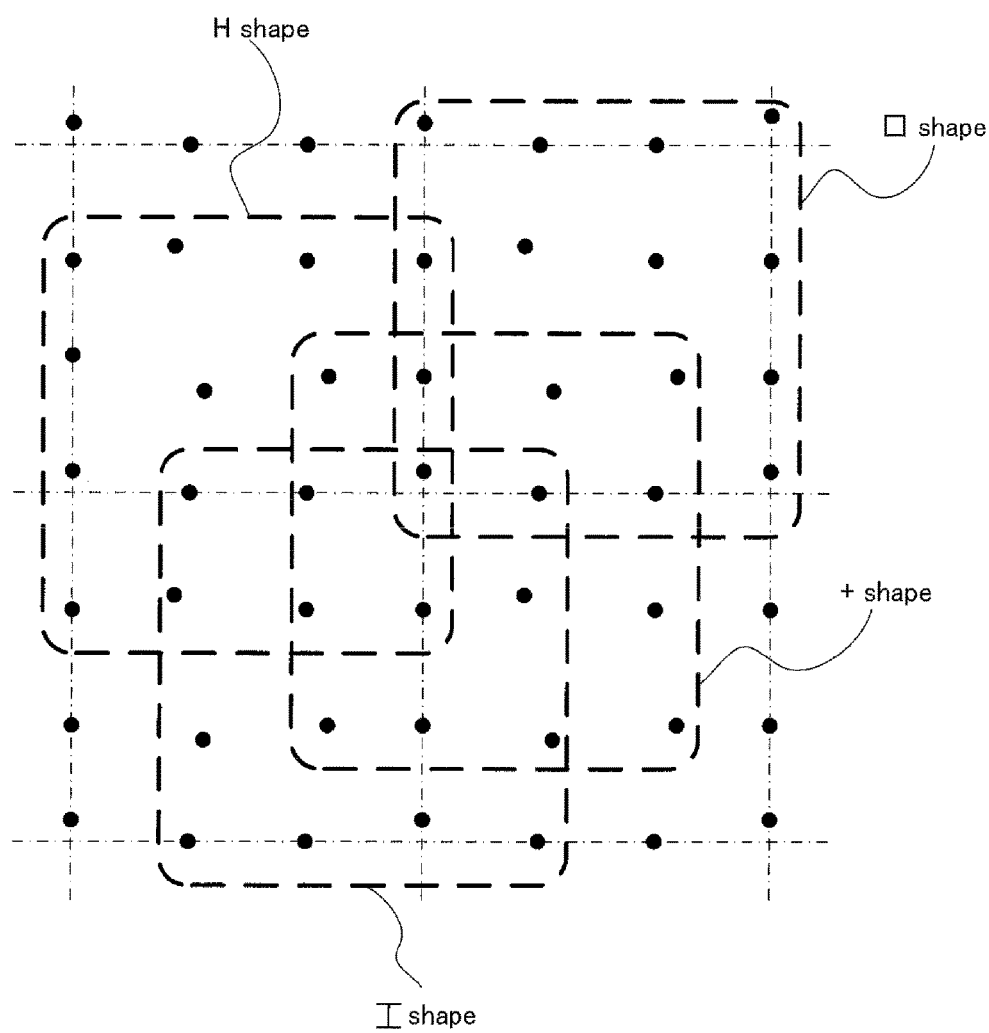
FIG. 60 is an explanatory diagram of the dot pattern (GRID6)

(6) as the arrangements of information dots in row directions and column directions are recognized by identifying the orientation of the dot pattern, calculating, in row directions and column directions, the order of distances in predetermined directions from the reference dots as start point information dots to the respective information dots by the above-described comparison operator. Here, the region surrounded by reference dots that are arranged in a rectangle shape is not necessarily required for calculation, and, as shown by the dashed line frame of FIG. 60, the vertical and horizontal lined-up reference dots may be arranged in a + shape, H shape, and 45 degree-rotated H shape, in addition to □ shape. This is because, as long as the necessary intervals between the information dots in row directions and column directions are included in the calculation region, the order of the distances in predetermined directions between the information dots can be similarly calculated. That is, information dots may be arranged in the calculation region such that the information dots in the top and bottom rows and the information dots in the left and right columns are respectively the same. It will be appreciated that the dot pattern may be generated in such an arrangement. It should be noted that, while FIG. 60 is an example of a dot pattern that is generated in consideration of the distances between the information dots, the same goes to a dot pattern that is generated in consideration of distances between information dots in predetermined directions.

(7) decoding codes using a decode table as shown in FIG. 59 and functions based on the order of the lengths of distances in predetermined directions between the information dots in row directions and column directions. The code may indicate at least a code value or a coordinate value. It should be noted that the code may include both code value and coordinate value. The coordinate value may be a coordinate value based on a variety of coordinate systems, such as X and Y coordinate values or X, Y and Z coordinate values.

Figure 61:
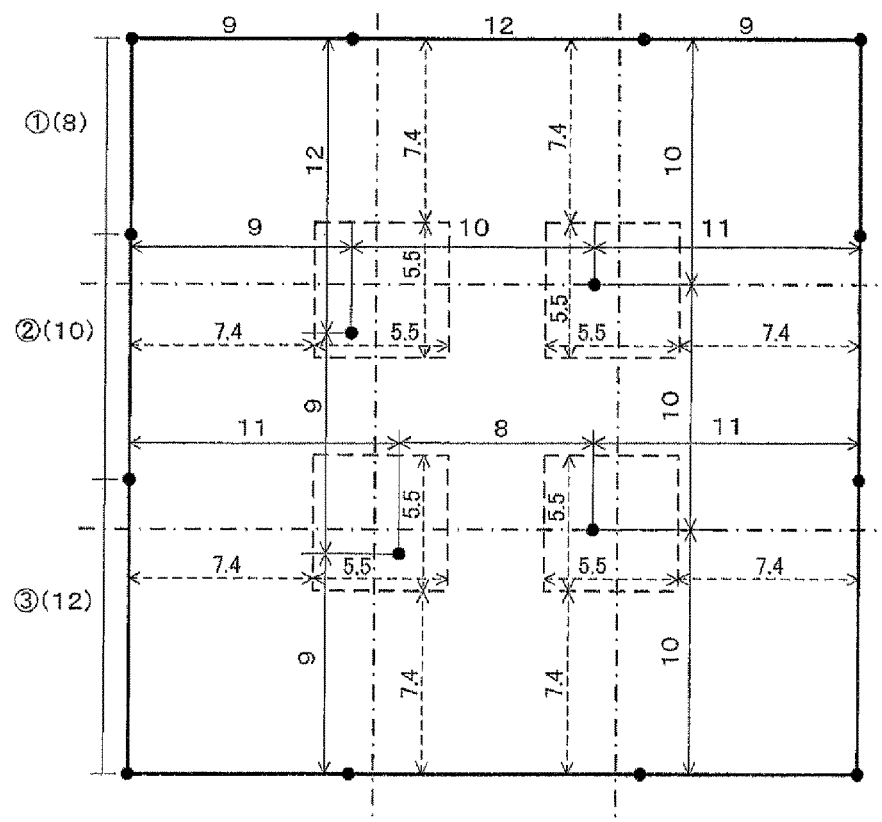
FIG. 61 is an explanatory diagram of the dot pattern (GRID6)
Figure 62:
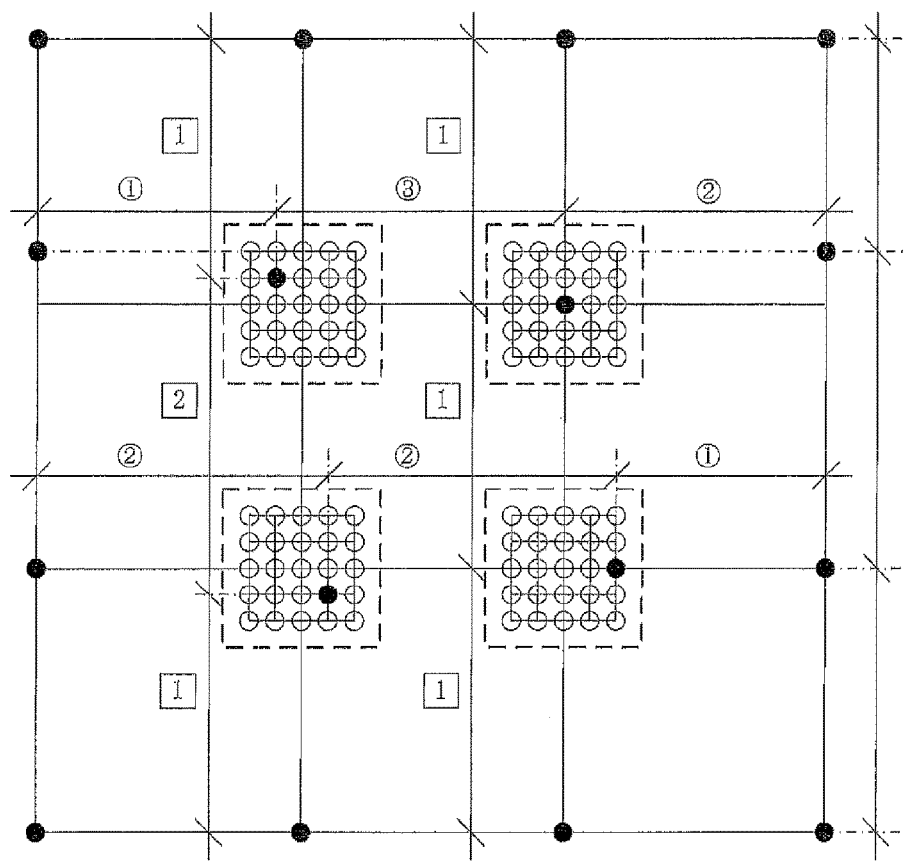
FIG. 62 is an explanatory diagram of the dot pattern (GRID6)

It should be noted that the regions indicated by dash lines in FIGS. 61 and 62 are the maximum regions where information dots are positioned in the dot pattern to be read, and the regions are made in consideration of deformation of the arrangement of dots due to displacement of printing, distortion of a print medium, and inclination of the camera upon reading the dot pattern (30 to 40 degrees). In these regions, the distance L in a predetermined direction from respective reference dot to an information dot is $L/\gamma \le L \le \gamma L$, if the error of (3) in <Second example of dot pattern generation method and code encoding> is $\beta=0.95$, a threshold becomes $\gamma=1.079$ by (6) of the <Second example>, L becomes in the range of $8/1.079 \div 7.4$ to $1.079 \times 12 = 12.9$ from each reference dot, thus the information dots are positioned within the region of $5.5 \times 5.5$ as $12.9 - 7.4 = 5.5$. Therefore, only dots positioned in this region become objects as information dots, eliminating to a substantial extent misrecognition of dots due to dusts and scattered ink.

While the above description explained a dot pattern reading method and decoding of codes in which codes are decoded by combinations of permutations of lengths of distances in predetermined directions between information dots, the reading method and decoding of codes of the above (1) to (7) can also be applied to a dot pattern of which codes are decoded by combinations of permutations of lengths of distances between information dots.

First Embodiment

The first embodiment of the present invention will be described.

In the first embodiment, a paper controller, on which a dot pattern that allocates a unique code value for each symbol of a lighting device 401 is superimposedly printed, and an interface device that specifies the lighting device 401 by the code value, will be particularly described. On the paper controller, an image and/or a text that clearly indicates the control operation of equipment to be controlled is superimposedly printed on a dot pattern. The above image and/or text may otherwise be printed around the dot pattern. It should be noted that the remote control device comprises a remote controller body 21 and a paper controller 101.

A link table that associates each lighting device 401 and a code value is stored in storage means, not shown, inside or outside of the remote controller body 201.

Further, including code values that specify a building, a room, a floor, or an area where the equipment is installed in the format of a dot pattern, facilitates the management of the link table. If the remote control device is used to specify a building or a floor, that is preferably indicated by flushing of an LED or by sound output means that is equipped in the remote controller body 201. Alternatively, that is preferably indicated by a display of the display means 501.

Figure 5:
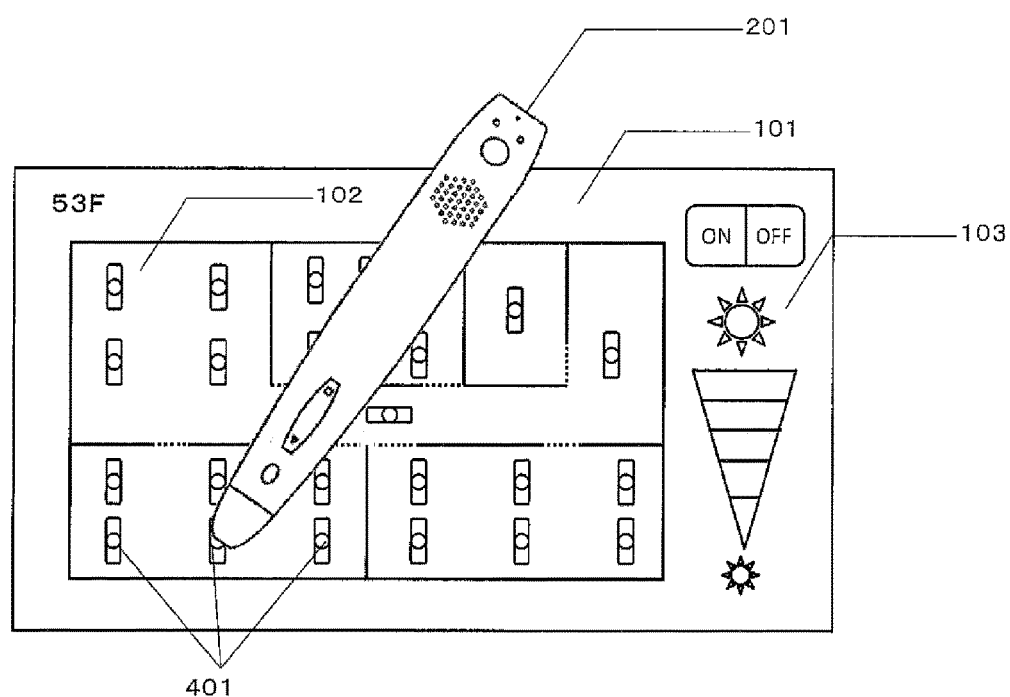
FIG. 5 is a diagram showing a first embodiment (1)
Figure 6:
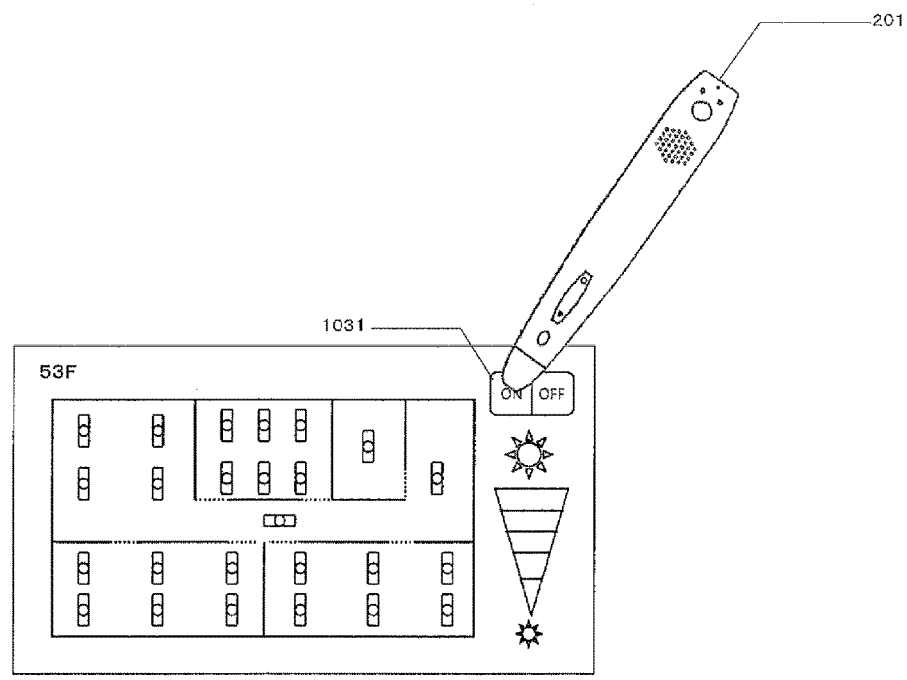
FIG. 6 is a diagram showing the first embodiment (2)

The operation of the remote control device in the first embodiment comprises the steps of (1) specifying a lighting device 401 by selecting and touching (reading), by the remote controller body 201, a symbol of the lighting device 401 that is desired to be operated from the layout portion 102 of the paper controller 101 (FIG. 5), (2) selecting the control operation for the specified lighting device 401 from the controller portion 103 of the paper controller (touching with the remote controller body 201) (FIG. 6), and (3) transmitting the control operation that was specified at the step (2) as control information to the control device 402 of the lighting device 401 that was specified at the step (1). It should be noted that the step (1) and step (2) may be performed in an inverted order.

In the step (1), the remote controller body 201 decodes code values from the dot pattern and transmits the control object corresponding to the decoded code values as control information to the interface device 301. The interface device 301 specifies the lighting device 401 to be controlled from the control information that was received from the remote controller body 201. At this time, the remote controller body 201 transmits information of the specified lighting device 401 to all the interface devices 301, verifies whether the lighting devices that are respectively controlled by all the interface devices 301 that received the information are the specified lighting device, and controls only the specified lighting device. It should be noted that only the specified interface device 301 may receive signals by uniquely allocating characteristics, such as frequencies of signals, transmitted from the remote controller body 201 to all the interface devices 301. The characteristics of signals may be frequencies, amplitude, or any other characteristics as long as the characteristics can be distinguished.

Figure 7:
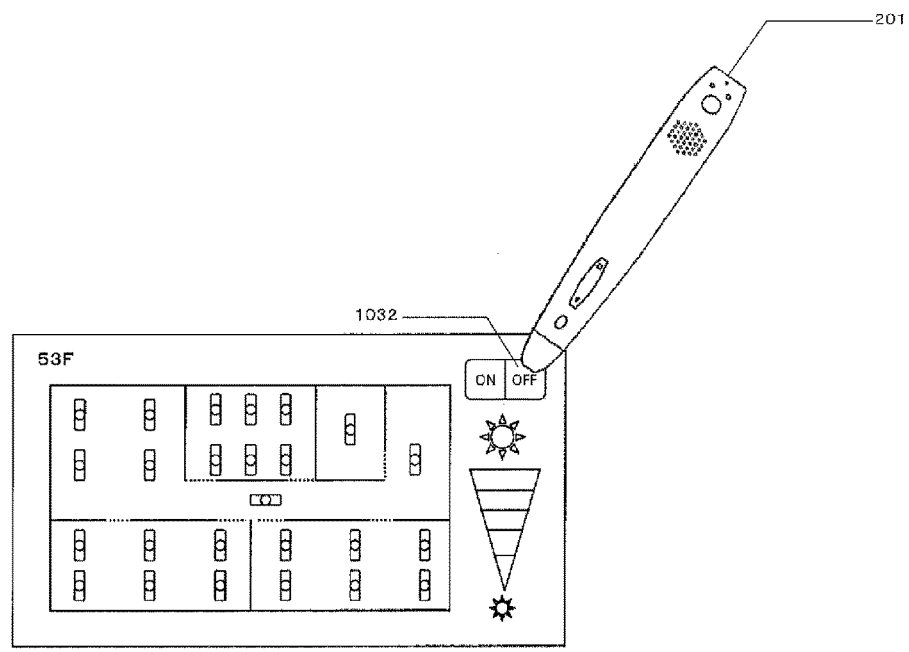
FIG. 7 is a diagram showing the first embodiment (3)
Figure 8:
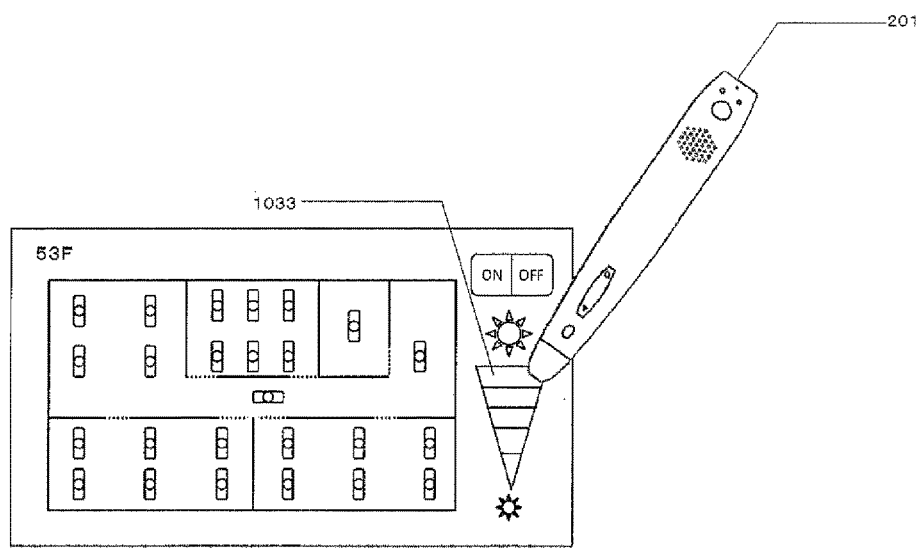
FIG. 8 is a diagram showing the first embodiment (4)

In the step (2), the remote controller body 201 decodes code values from the dot pattern and transmits the control operation corresponding to the decoded code values as control information to the interface device 301. The interface device 301 identifies control for the lighting device 401 based on the control information received from the remote controller device 201 (Power on 1031 in the example of FIG. 6. FIG. 7 is an example of power off 1032; FIG. 8 is an example of adjusting light 1033.) The control operation includes power ON/OFF, strength of light, color tone, timer setting, and saving of these setting information and specified lighting devices, without restriction to the kinds of control included.

In the step (3), the interface device 301 transmits the control signal based on the control specified by the step (2) to the control device 402.

Further, single operation can control a plurality of lighting devices 401. In the step (1), by selecting a plurality of symbols of lighting devices 401 that are desired to be operated from the layout portion 102 of the paper controller and touching (reading) them with the remote controller body 201, a plurality of lighting devices 401 can be controlled by the operation of the step (2).

Figure 9:
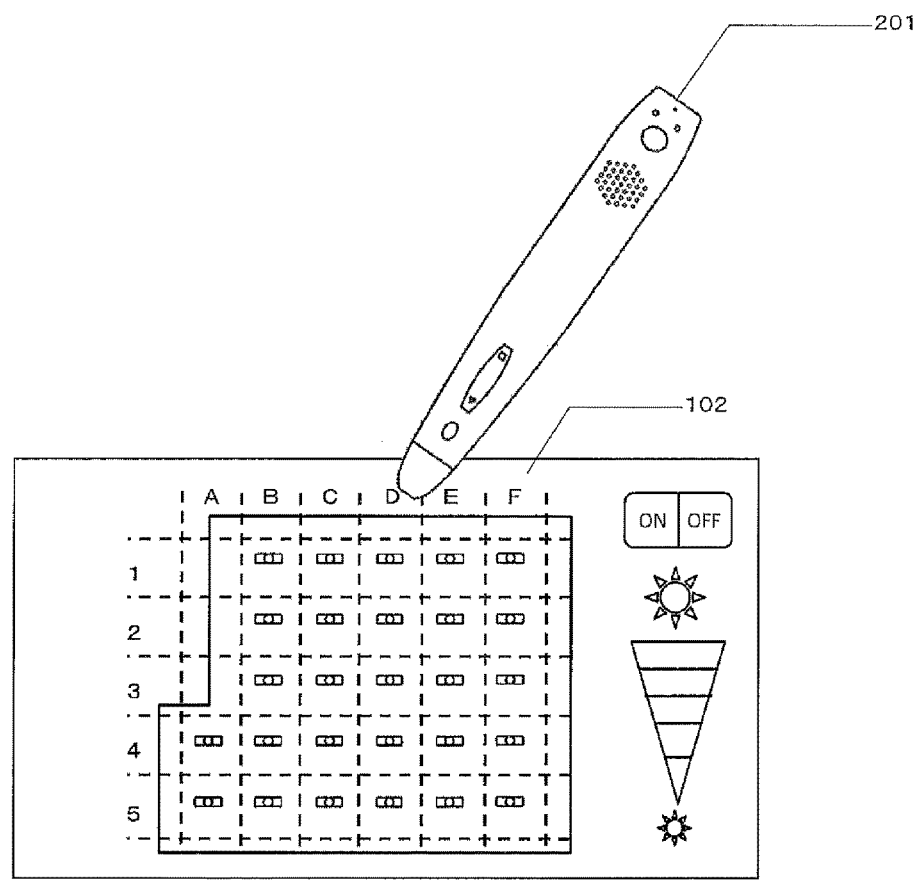
FIG. 9 is a diagram showing the first embodiment (5)

Further, the lighting devices 401 that are lined up in a row (a column) as shown in FIG. 9 may be specified at once. In the example of FIG. 9, a dot pattern in which code values that specify respective rows and columns are encoded in 1-5 rows and A-F columns is printed, and, for example, a piece of dot pattern that encodes a code value that can operate all the lighting devices 401 in a D column is printed around the position where "D" is written.

However, a piece of dot pattern that encodes a code value that can simultaneously specify the lighting devices 401 that have been arbitrary selected and grouped in advance can be printed superimposedly over or printed near a text or an image that clearly indicates the group to a user.

Second Embodiment

The second embodiment of the present invention will be described.

While the lighting devices 401 can be specified using code values when the number of lighting devices 401 is small or the layout of the lighting devices 401 is simple, coordinate values are preferably used when the number of lighting devices 401 is large or the layout is not simple.

A data table that associates each lighting device 401 and a coordinate value is stored in the storage means, not shown, inside or outside of the remote controller body 201.

Further, including code values that specify a building or a floor in the format of the dot pattern facilitates the management of the data table. When the remote control device specifies a building or a floor, that is preferably indicated by flushing of an LED or by sound output means that is equipped in the remote controller body 201. Alternatively, that is preferably indicated by a display of the display means 501.

Further, using coordinate values enables input processing by the movement locus of the remote controller body 201 and operation actions thereof.

The analysis method of the movement locus of the remote control device 201 is omitted as the method is described in detail in the International Publication WO2010/061584. However, the analysis method of a movement locus may be any analysis method of a movement locus that is devised at present or will be devised in the future without limitation.

While the operation of the remote control device in the second embodiment is common as with the steps (2), (3) in the first embodiment, the operation of the remote control device in the second embodiment can specify a plurality of lighting devices 401 by the movement locus of the remote controller body 201 in the specification method of lighting devices 401 in the step 1. The method will be described below.

<Specification by Lasso Selection>

Figure 10:
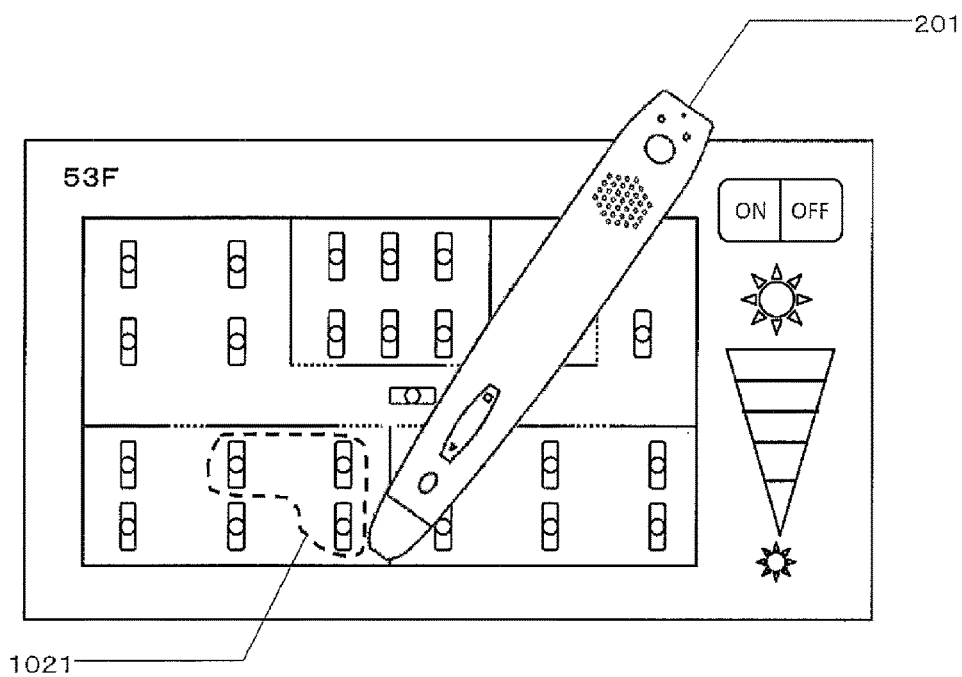
FIG. 10 is a diagram showing a second embodiment (1)

The method shown in FIG. 10 resembles so-called "lasso selection," which defines the curve line (or the straight line) by the movement locus of the remote controller body 201 as a boundary 1021 and specifies all the lighting devices 401 corresponding to the coordinate values included in the boundary 1021.

<Specification by Rectangular Selection>

Figure 11:
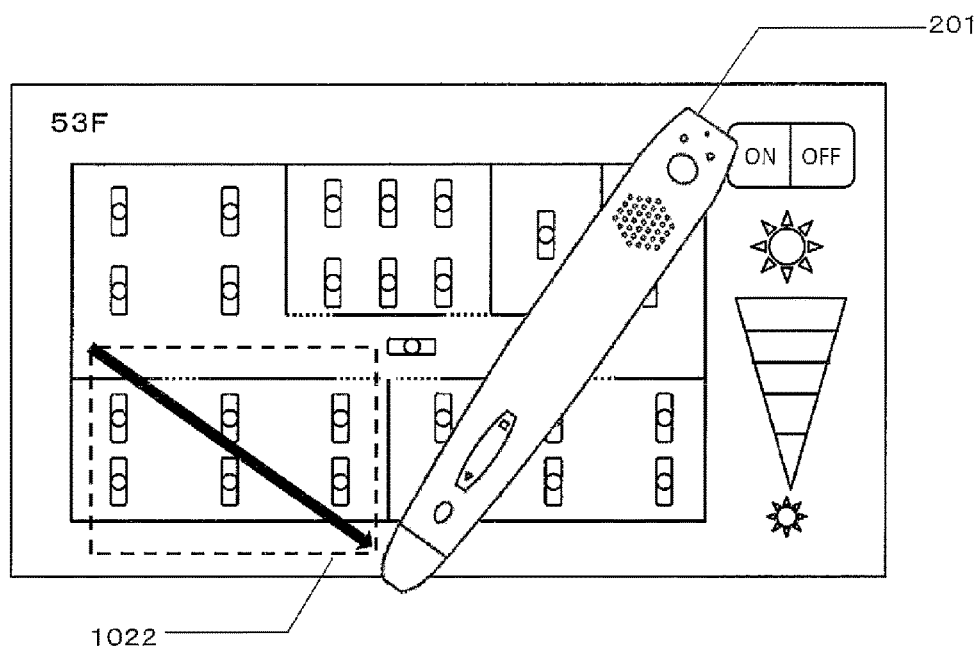
FIG. 11 is a diagram showing the second embodiment (2)

The method shown in FIG. 11 resembles so-called "rectangular selection," which specifies all the lighting devices 401 corresponding to the coordinate values included in a rectangular area 1022 that has two points of the start point and the end point of the movement locus of the remote controller body 201 as opposing angles. Other than the rectangular selection, a selection range tool of a circle and the like can be used with the distance between the two points of the start point and the end point of a movement locus as the radius or diameter thereof.

<Specification by Line>

Figure 12:
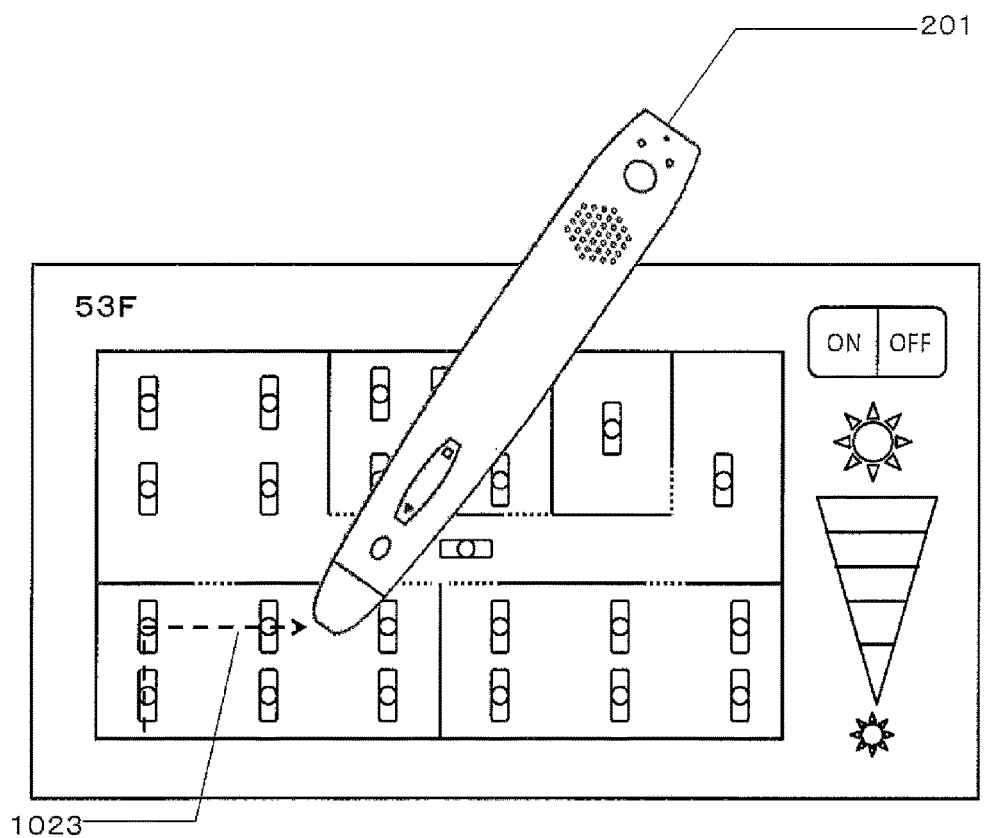
FIG. 12 is a diagram showing the second embodiment (3)

The method shown in FIG. 12 specifies all the lighting devices 401 corresponding to the coordinate values on the line 1023 of the movement locus of the remote controller body 201.

<Diversion to Other Equipment>

Although, as a representative example, the control system of lighting equipment by remote controlling and an interface device using a dot pattern has been described, the present invention can also be diverted as is to power distribution equipment, air conditioning equipment, ventilating equipment, locking equipment, audio equipment, and the like, and a paper controller can be created according to the equipment with which the control system is implemented.

<Installation of Sensors>

Further, the control system of the present invention may be a control system that comprises one or a plurality of sensors, which is different from the control by the remote control device that uses a dot pattern.

If the control system comprises sensors, the interface device can uniquely specify the control operation for the equipment to be controlled based on the sensor information. It will be appreciated that a conventional remote controller may be additionally used for manually operating part of the operation. Further, it will be appreciated that, if equipment to be controlled is arbitrary specified, a remote control device that uses the dot pattern of the present invention is preferably used at the same time.

It is preferable to use optical sensors for using the control system for lighting equipment; temperature/humidity sensors or dust/$CO_2$ sensors, for air conditioning equipment or ventilating equipment; sound sensors, for audio equipment.

Third Embodiment

The following will describe a third embodiment of the present invention.

It should be noted that the same components as the first and second embodiments will be omitted to describe.

The control system according to the third embodiment comprises a paper controller, a remote control device, and an interface device.

On the paper controller, an image and/or a text that clearly indicates the control operation of equipment to be controlled is printed superimposedly over or is printed near a dot pattern in which dot codes that directly or indirectly correspond to the control operation are encoded.

The remote control device, comprising storage means that stores a table that includes a direct or indirect correspondence between a dot code that is encoded in a dot pattern printed on the paper controller and control information that is the coded control operation of equipment, images the dot pattern, decodes the dot code, and transmits control information corresponding to the dot code from the storage means. As a specific example, the storage means stores control information that corresponds to a dot code to be read by the remote control device and a code that is set by operation of the remote control device. The association corresponding to the dot code includes direct indication of control information in at least part of the dot code, as well as, indirect association using a table. It should be noted that, in the indirect association, control operation of a variety of equipment that is associated with dot codes that are read by a remote control device and codes set by operation of the remote control device is stored in the control information table and corresponding control information is retrieved therefrom.

The interface device comprises the interface device that performs processing of receiving control information from the remote control device and controls equipment to be controlled based on the control information.

The role and system of each device will be described in detail below.

<Setting ID Information for Equipment>

If there are a plurality of pieces of equipment to be controlled, unique ID information may be set for each equipment. Here, ID information of the lighting device 401 to be controlled by each interface device 301 is registered in advance in the storage means, not shown, inside or outside the interface device 301. The ID information of the lighting device 401 that was specified in the step (2) of the first embodiment may be added to the control information, which is transmitted from the remote controller body 201 to all the interface devices 301, and the transmitted control information is verified with the ID information registered for all the interface devices 301 that received the information so as to control only the lighting devices that match the ID information. In this way, a control system can be constructed with low costs without advanced processing such as uniquely allocating characteristics of signals, such as a frequency, transmitted from the remote controller body 201 to all the interface devices 301. It should be noted that registration in the storage means, not shown, inside or outside the interface device 301 can be registered, updated, or deleted from the remote controller body 201. Further, registration of ID information in the storage means, not shown, inside or outside the interface device 301 may also be performed by touching, by the remote controller body, an association on a paper controller, on which the lighting devices 401 and the interface devices 301 are clearly indicated and superimposedly printed over a dot pattern. As such, even if there is a large number of equipment to be simultaneously controlled, the equipment can be appropriately managed since each piece of equipment is managed by the ID information.

It should be noted that, in such a case, equipment may be grouped and ID information may be set for the group.

Such ID information may be set for the interface devices, instead of setting for equipment. Further, ID information may be set for both equipment and interface devices. Further, if the equipment is grouped, an interface device may be provided for the group, or an interface device may be provided for each piece of equipment in the group.

<Other Examples of Paper Controller>

Next, the following will describe a paper controller when ID information is set for each piece of equipment or grouped equipment as described above.

A dot pattern of encoded ID information is printed on the paper controller. Here, the dot pattern is superimposedly printed in the layout portion that indicates the arrangement of equipment.

The storage means of the remote control device stores ID information that corresponds to dot codes to be read by a remote control device and codes that are set by operation of the remote control device. The association corresponding to the dot codes includes direct indication of control information in at least part of the dot codes, as well as, indirect association using a table. It should be noted that, in the indirect association, the control operation of a variety of equipment including ID information corresponding to dot codes that are read by a remote control device and codes that are set by operation of the remote control device is stored in the control information table and ID information is retrieved from corresponding control information.

In this way, the equipment can be controlled only by touching the layout portion of the paper controller by the remote controller body.

It will be appreciated that, in addition to the ID information, a variety of above-described control information may be directly encoded in the dot pattern.

Here, the dot code format of the paper controller will be described with reference to FIGS. 63A to 63C.

FIG. 63A is a case where only a code value is defined in the dot code. The code value is uniquely associated with ID information FIG. 63B is a case where a code value and coordinate values are defined in the dot code. The code value is uniquely associated with ID information, while the coordinate values are associated with the position of an icon that indicates the arrangement of each piece of equipment. In this way, if the equipment is grouped, an ID of the grouped equipment can be specified by a code value, and a specific piece of equipment in the group can be specified by the coordinate value, enabling a user to control a desired piece of equipment among the grouped equipment only by a single touch. That is, a desired piece of equipment can be specified among the equipment that is grouped by the same ID. Further, a desired piece of equipment may be specified using a method of specifying a plurality of lighting devices 401 by a movement locus of the remote controller 201 as described in the second embodiment.

FIG. 63C is a case where a plurality of code values are defined in the dot code. Such a format is used particularly when a plurality of layout portions are provided on the paper controller. The code value 1 is associated with a layout portion, while the code value 2 is associated with ID information. If a user touches one of the plurality of layout portions by a remote control device, which layout portion was touched among the plurality of layout portions is recognized by the code value 1, and the ID information of the equipment of the layout portion is recognized by the code value 2. Then, which piece of equipment is touched among the equipment (particularly, grouped equipment) is recognized by the coordinate values. As such, according to the dot pattern of the Inventor, even if a plurality of layout portions are printed, a desired piece of equipment can be easily controlled by a touch of the remote controller body 201 or a movement locus of the remote controller body 201.

Further, in the present invention, the dot code may be stored in the storage means in association with a place where equipment is installed.

The place where equipment is installed is a room, the number of a floor, a building, a street, a bridge, a tunnel, an area, or the like.

This dot code may be provided in the controller portion of the paper controller or in the layout portion thereof. Alternatively, the dot code may be provide in both thereof. For example, if the dot code is provided only in the controller portion, the place where the equipment that is desired to be controlled exists is specified by a user touching the controller portion. Next, by touching the layout portion, the equipment to be controlled is specified. If the dot code is provided only in the layout portion, a user's touch on the layout portion by the remote controller body 201 or a movement locus of the remote controller body 201 easily specifies the place and content of the equipment to be controlled.

Further, the paper controller may be printed over a plurality of pages, each page for any of rooms, the number of floors, buildings, streets, bridges, tunnels, areas, and the like.

<Clock Function>

In the example, a clock function may be provided in the remote control device or the interface device.

If a clock function is provided in the remote control device, a table that includes a direct or indirect correspondence between time (clock time) and control information is stored in the storage means. FIG. 64 shows an example of such a table. For example, to control an air-conditioning device of an office building, a table as shown in FIG. 64 is stored in advance. If a user touches the layout portion where air conditioners are arranged, the clock function of the remote control device recognizes the touching time, refers to the table, and performs the touched processing at the time. For example, if a touch is made at 9:15 a.m., the set temperature becomes 29 degrees Celsius and all the air conditioners start operating.

If a clock function is provided in the interface device, storage means is further provided in the interface device. Then, a table as shown in FIG. 64 is stored in the storage means. When receiving control information from the remote control device, the interface device recognizes the received time. The processing thereafter is the same as the case of the remote control device.

It should be noted that such time setting may be performed by a paper controller. For example, icons that signify numbers from 0 to 9 are printed in the controller portion of the paper controller, and each icon is superimposedly printed on a piece of dot pattern in which each number is encoded. When a user touches the number icon, the table may be set or updated with set time. It will be appreciated that the table may be set or updated by touching, tracing or other operation on the paper controller.

As such, by providing a clock function, a control according to time can be automatically performed, thereby providing a highly convenient system while easily saving energy consumption.

<Save Function>

The remote control device can be further provided with a save function.

The save function is a function of recording and storing operation a user performed to the paper controller.

The save function is performed by a save button provided on the remote controller or a save icon provided on the controller portion of the paper controller. The save icon is superimposedly printed on a piece of dot pattern in which a dot code corresponding to the save function is encoded. After a user performed predetermined operation, pressing the save button or touching the save icon records/stores operation in a storage unit. Specifically, in the case of lighting equipment, specified lighting equipment is saved, and, when the power is turned ON again after being turned OFF, the lighting equipment to be controlled has already been specified. It will be appreciated that the strength and color tone of the light of all or specified lighting equipment can also be saved in the same way.

<Audio Output Means, Audio Recognition Means>

The remote control device may further be provided with audio output means.

As such, a user can conduct operation and processing of the remote controller in accordance with the guides from the audio output means.

Further, the remote controller may further be provided with audio recognition means. In this way, operation and processing can be performed by audio recognition, instead of touch operation to a dot pattern, or together with touch operation. For example, having a clock function as described above, time can be set by saying time by voice, such as "9:15," instead of setting time by touching number icons. In addition, a variety of operation, such as, "turn the power ON," "turn the power OFF," "brighter," "darker," becomes possible.

<Display Means>

The remote control device can be further provided with display means.

The display means may be a screen, such as a liquid crystal display, not shown, provided on the remote controller body. This screen displays operation and processing that should be performed by a user.

As such, a user can conduct operation and processing of the remote controller in accordance with the guides displayed on the display means.

It should be noted that, as shown in FIG. 4, the display means may be a smartphone, a tablet, or a PC.

<Lighting Equipment>

The following will describe a case where the equipment is lighting equipment further in detail.

If the equipment is lighting equipment, the sensor is at least one of an illuminometer, a color-illuminometer, a luminance meter, and a color-luminance meter, and the sensor information is at least any one of illumination, color illumination, luminance, and color luminance.

Here, the illuminometer measures the brightness of the surface of an object that is lit. The color-illuminometer measures the color of light that lights the surface of the object. The luminance meter measures the brightness of the light source. The color-luminance meter measures the brightness and color of the light source by the same sensibility as human eyes'.

Having such a sensor, brightness and color of the light source can be appropriately controlled.

Further, LED lighting equipment can also be used as the lighting equipment as described above. In such a case, the interface device repeats turning on and off at a predetermined frequency with fast speed and controls the LED lighting device with the time interval of lighting and the time interval of lighting out. Specifically, the interface device repeats turning on and off at a predetermined frequency with fast speed and transmits PWM (pulse width modulation) that indicates time intervals of lighting and lighting out as control signals to the control device of the LED lighting device.

<Parameters>

Predetermined parameters can be set to control equipment or devices that configure the equipment. Predetermined parameters include, for example, brightness, color, turning-on timing, turning-off timing, and the like.

In such a case, figures and texts that clearly indicate parameters are superimposedly printed over the dot pattern on the paper controller. In the dot pattern, are encoded dot codes that are directly or indirectly associated with the parameters.

If a user touches a parameter on the paper controller by the remote control device, the remote control device reads the dot pattern and transmits the parameter associated with the dot code to the interface device. The interface device stores the received parameter as the control operation and controls the devices to be controlled accordingly.

<Paper Controller>

Figure 65:
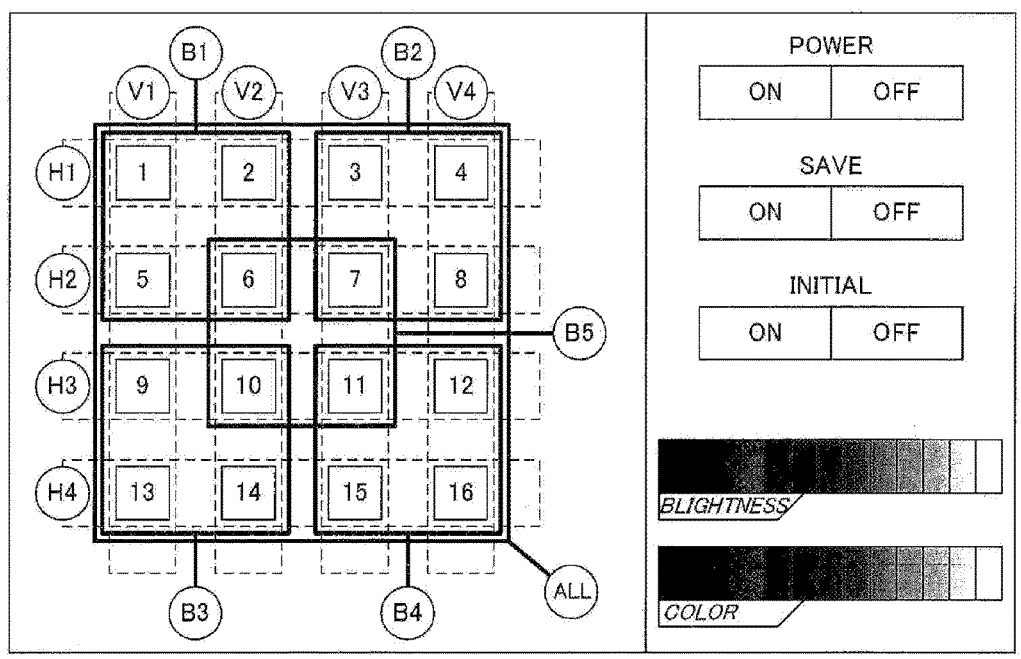
FIG. 65 is a diagram showing an example of the paper controller of the present invention.

FIG. 65 is a diagram illustrating another example of a paper controller.

The paper controller of FIG. 65 is a paper controller for controlling lighting equipment (LED). The functions of respective icons are as follows:

(1) POWER ON: Turn ON selected LED (brightness and color are set according to stored values)
(2) POWER OFF: Turn OFF selected LED
(3) SAVE ON: Store the value of selected LED group
(4) SAVE OFF: Employ initial information without storing the value of selected LED group
(5) INITIAL ON: Use the initial value of the value of selected LED (brightness, color)
(6) INITIAL OFF: Use stored setting value
(7) BLIGHTNESS: Change brightness of selected LED (8) COLOR: Change color of selected LED
(9) B1: Control (select) LEDs 1, 2, 5, 6 collectively
(10) B2: Control (select) LEDs 3, 4, 7, 8 collectively
(11) B3: Control (select) LEDs 9, 10, 13, 14 collectively
(12) B4: Control (select) LEDs 11, 12, 15, 16 collectively
(13) B5: Control (select) LEDs 6, 7, 10, 11 collectively
(14) V1: Control (select) LEDs 1, 5, 9, 13 collectively
(15) V2: Control (select) LEDs 2, 6, 10, 14 collectively
(16) V3: Control (select) LEDs 3, 7, 11, 15 collectively
(17) V4: Control (select) LEDs 4, 8, 12, 16 collectively
(18) H1: Control (select) LEDs 1, 2, 3, 4 collectively
(19) H2: Control (select) LEDs 5, 6, 7, 8 collectively
(20) H3: Control (select) LEDs 9, 10, 11, 12 collectively
(21) H4: Control (select) LEDs 13, 14, 15, 16 collectively
(22) ALL: Control (select) all LEDs collectively With the paper controller, each LED can be controlled by touching an icon, on which is written a number, by a remote controller body. Further, LEDs in a region (a group) surrounded by a dashed line can be collectively controlled by touching icons, such as V1, B1.

As such, since a single touch can control both a LED or and a plurality of LEDs, and a plurality of groups and each LED can be simultaneously selected and controlled, the paper controller is superior in convenience.

Fourth Embodiment

The fourth embodiment of the present invention will be described.

It should be noted that the same components as the first to third embodiments will be omitted to describe.

Figure 66:
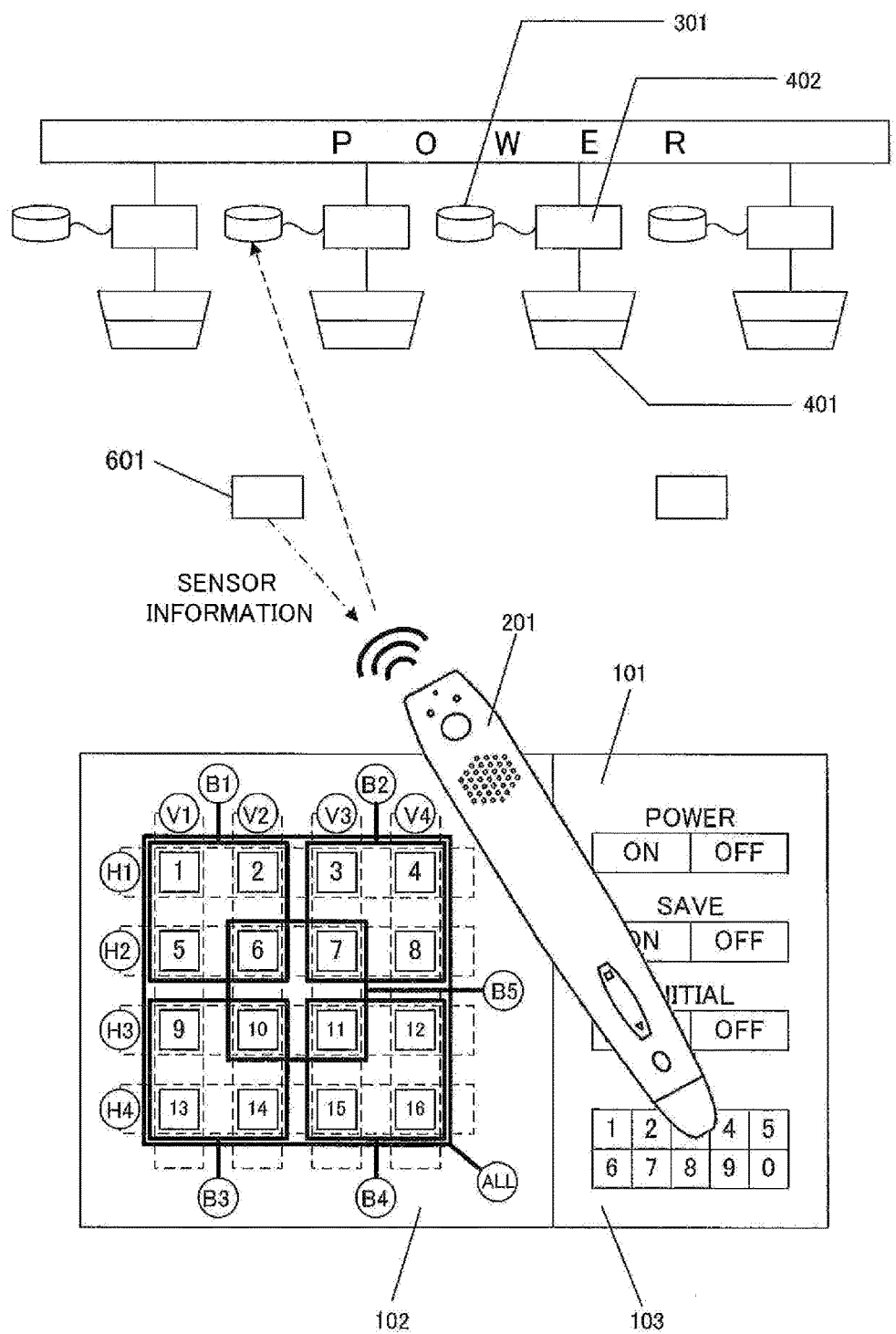
FIG. 66 is a diagram for illustrating a control system using sensors.

FIG. 66 shows an example of the fourth embodiment.

The control system according to the fourth embodiment comprises an interface device, a remote control device, and a sensor 601.

The interface device controls a plurality of pieces of equipment to be controlled based on control information. It should be noted that the interface device may be integrally configured with a control device.

The remote control device transmits control information based on the control operation to the interface device.

The sensor (optical sensor in FIG. 66) transmits sensor information to the remote control device or the interface device.

While the details will be described later herein, the fourth embodiment features that the remote control device sets at least any one of a sensor target value and a sensor information target range with a predetermined method and the remote control device or the interface device performs processing of controlling an output value of equipment to be controlled by adjusting as necessary the control operation in accordance with a predetermined algorithm so that the sensor information belongs within the sensor information target range.

<Sensor>

In the above <Installation of sensor>, an example where the control system of the present invention comprises one or a plurality of sensors has been described.

The following will describe a method where, by setting an optimal environment in advance, the remote control device or the interface device adjusts an output value of equipment while controlling the equipment as necessary to make the optimal environment according to the sensor information.

<Adjustment of Control Using Sensor>

The sensor information target value and the sensor information target range are set as the sensor information that is detected by the sensor. The interface device or the remote control device that receives the sensor information adjusts as necessary the control operation so that the sensor information belongs within the sensor information target range. If a user sets only one of the sensor information target value and the sensor information target range, a calculation method for calculating the other may be defined in advance. If only the sensor information target value is set, the sensor information target range may be defined as a range of plus/minus 10% of the target value. If only the sensor information target range is set, the sensor information target value may be defined as the middle value of the target range.

The following will describe an example of algorithm in which control operation is adjusted as necessary. Sensors are arranged at predetermined positions corresponding to the arrangement of the equipment to be controlled. The following calculates an influence coefficient calculation function of an output value of equipment that is controlled based on the control operation corresponding to the sensor information that is measured by the sensors, whereupon the output value of the equipment to be controlled is controlled so that the output value will be within the sensor target range by the following procedure.

Where equipment to be controlled is: $L_1$ to $L_m$
an output value of equipment according to the control operation: $Lb_1$ to $Lb_m$
a reference output value of equipment according to the control operation: $_0Lb_1$ to $_0Lb_m$
an equipment output value for a sensor target value: $_1Lb_1$ to $_1Lb_m$
a sensor: $S_1$ to $S_n$
a sensor target value: $_tSb_1$ to $_tSb_n$
a sensor target range: $_{tmin}Sb_1$ to $_{tmax}Sb_1$, $_{tmin}Sb_n$ to $_{tmax}Sb_n$
a sensor information value for a reference output: $_0Sb_1$ to $_0Sb_m$
a sensor information value for an equipment output calculation value: $_1Sb_1$ to $_1Sb_m$ and
a sensor information value upon calculating an influence coefficient: $Sb_{11}$ to $Sb_{nm}$,
the influence coefficient calculation function is expressed as follows:

$$\begin{Bmatrix} Sb_1 \\ \vdots \\ Sb_n \end{Bmatrix} = \begin{bmatrix} _1\alpha_1 & \sim & _1\alpha_m \\ \vdots & & \vdots \\ _n\alpha_1 & \sim & _1\alpha_m \end{bmatrix} \begin{Bmatrix} Lb_1 \\ \vdots \\ Lb_m \end{Bmatrix} \quad (1)$$

In order to acquire an influence coefficient $\alpha$, an influence coefficient calculation sensor information value $_0Sb_{11}$ to $_0Sb_{nm}$ may be calculated when equipment $L_1$ to $L_m$ outputs piece by piece a reference output value of the equipment according to the control operation.

That is, if only equipment $L_1$ outputs $_0Lb_1$, and the measured sensor information value $_0Sb_{11}$ to $_0Sb_{nm}$ is substituted in the formula (1), the following can be obtained:

$$\begin{Bmatrix} _0Sb_{11} \\ \vdots \\ _0Sb_{n1} \end{Bmatrix} = \begin{bmatrix} _1\alpha_1 & \sim & _1\alpha_m \\ \vdots & & \vdots \\ _n\alpha_1 & \sim & _1\alpha_m \end{bmatrix} \begin{Bmatrix} _0Lb_1 \\ 0 \\ \vdots \\ 0 \end{Bmatrix}$$

That is, $$\begin{Bmatrix} {}_0Sb_{11} \\ \vdots \\ {}_0Sb_{n1} \end{Bmatrix} = \begin{Bmatrix} {}_1\alpha_1 * {}_0Lb_1 \\ \vdots \\ {}_n\alpha_1 * {}_0Lb_1 \end{Bmatrix}$$

which can be converted to $$\begin{Bmatrix} {}_1\alpha_1 \\ \vdots \\ {}_n\alpha_1 \end{Bmatrix} = \begin{Bmatrix} {}_0Sb_{11}/{}_0Lb_1 \\ \vdots \\ {}_0Sb_{n1}/{}_0Lb_1 \end{Bmatrix}$$

if the same calculation is conducted for ${}_0Lb_1$ to ${}_0Lb_m$, the following influence coefficient can be obtained:

$$\begin{bmatrix} {}_1\alpha_1 & \sim & {}_1\alpha_m \\ \vdots & & \vdots \\ {}_n\alpha_1 & \sim & {}_n\alpha_m \end{bmatrix} = \begin{bmatrix} {}_0Sb_{11}/{}_0Lb_1 & \sim & {}_0Sb_{1m}/{}_0Lb_m \\ \vdots & & \vdots \\ {}_0Sb_{n1}/{}_0Lb_1 & \sim & {}_0Sb_{nm}/{}_0Lb_m \end{bmatrix} \quad (2)$$

Here, if the sensor target value is ${}_tSb_1$ to ${}_tSb_n$, the output value ${}_1Lb_1$ to ${}_1Lb_m$ of the equipment will be calculated by the following formula. It should be noted that the output value of the equipment and the sensor information value sometimes have nonlinear relationships, in which cases, the calculation precision may not be sufficient except near the reference output value ${}_0Lb_1$ to ${}_0Lb_m$ of the equipment.

$$\begin{Bmatrix} {}_1Lb_1 \\ \vdots \\ {}_1Lb_m \end{Bmatrix} = \begin{bmatrix} {}_0Sb_{11}/{}_0Lb_1 & \sim & {}_0Sb_{1m}/{}_0Lb_m \\ \vdots & & \vdots \\ {}_0Sb_{n1}/{}_0Lb_1 & \sim & {}_0Sb_{nm}/{}_0Lb_m \end{bmatrix}^{-1} \begin{Bmatrix} {}_tSb_1 \\ \vdots \\ {}_tSb_n \end{Bmatrix} \quad (3)$$

By controlling the equipment so as to output the above-calculated output value ${}_1Lb_1$ to ${}_1Lb_m$, the output value can be controlled to be within the sensor target range. In other words, once the influence coefficient is calculated by a formula (2), then, the output value of corresponding equipment can be determined by setting a target value of a position where a sensor is arranged upon measurement by a formula (3) without further arranging a sensor.

However, as described above, since there are cases where the output value of the equipment and the sensor information value have nonlinear relationships, calibration is needed when the measurement result ${}_1Sb_1$ to ${}_1Sb_m$ of the sensor when the output value is ${}_1Lb_1$ to ${}_1Lb_m$ is not within the sensor target range ${}_{tmin}Sb_1$ to ${}_{tmax}Sb_1$, ${}_{tmin}Sb_n$ to ${}_{tmax}Sb_n$. As a calibration method, the following will describe three patterns: a simple calibration; and two kinds using nonlinear influence coefficients.

1) Simple Calibration

First, if a sensor target difference value that is obtained by subtracting the sensor target value ${}_tSb_1$ to ${}_tSb_n$ from the measurement result ${}_1Sb_1$ to ${}_1Sb_m$ of the sensor is $\Delta Sb_1$ to $\Delta Sb_n$, an equipment output calculation difference value $\Delta Lb_1$ to $\Delta Lb_m$ for a sensor target difference value is calculated by the following formula:

$$\begin{Bmatrix} \Delta Lb_1 \\ \vdots \\ \Delta Lb_m \end{Bmatrix} = \begin{bmatrix} {}_0Sb_{11}/{}_0Lb_1 & \sim & {}_0Sb_{1m}/{}_0Lb_m \\ \vdots & & \vdots \\ {}_0Sb_{n1}/{}_0Lb_1 & \sim & {}_0Sb_{nm}/{}_0Lb_m \end{bmatrix}^{-1} \begin{Bmatrix} \Delta Sb_1 \\ \vdots \\ \Delta Sb_n \end{Bmatrix} \quad (4)$$

By calculating an output value ${}_2Lb_1$ to ${}_2Lb_m$ by adding the calculated value $\Delta Lb_1$ to $\Delta Lb_m$ to the output value ${}_1Lb_1$ to ${}_1Lb_m$, and controlling the equipment so as to output the output value ${}_2Lb_1$ to ${}_2Lb_m$, the output value can be controlled to be within the sensor target range. However, if the measurement result that was measured again by the sensor is not within the sensor target range, the same processing is repeated until the measurement result is within the sensor target range.

2) Calibration by Recalculating an Influence Coefficient Using the Current Output Value First, by the same method as the induction of the formula (2), a sensor information value ${}_1Sb_{11}$ to ${}_1Sbn_m$ is measured when equipment $L_1$ to $L_m$ outputs piece by piece an output value ${}_1Lb_1$ to ${}_1Lb_m$ using a formula (1), and the influence coefficient is recalculated as follows:

$$\begin{bmatrix} {}_1\alpha_1 & \sim & {}_1\alpha_m \\ \vdots & & \vdots \\ {}_n\alpha_1 & \sim & {}_1\alpha_m \end{bmatrix} = \begin{bmatrix} {}_1Sb_{11}/{}_1Lb_1 & \sim & {}_1Sb_{1m}/{}_1Lb_m \\ \vdots & & \vdots \\ {}_1Sb_{n1}/{}_1Lb_1 & \sim & {}_1Sb_{nm}/{}_1Lb_m \end{bmatrix} \quad (5)$$

Here, if the sensor target value is ${}_tSb_1$ to ${}_tSb_n$, the output value ${}_2Lb_1$ to ${}_2Lb_m$ after calibration will be calculated by the following formula:

$$\begin{Bmatrix} {}_2Lb_1 \\ \vdots \\ {}_2Lb_m \end{Bmatrix} = \begin{bmatrix} {}_1Sb_{11}/{}_1Lb_1 & \sim & {}_1Sb_{1m}/{}_0Lb_m \\ \vdots & & \vdots \\ {}_1Sb_{n1}/{}_1Lb_1 & \sim & {}_1Sb_{nm}/{}_0Lb_m \end{bmatrix}^{-1} \begin{Bmatrix} {}_tSb_1 \\ \vdots \\ {}_tSb_n \end{Bmatrix} \quad (6)$$

By controlling the equipment so as to output the calculated output value ${}_2Lb_1$ to ${}_2Lb_m$, the output value can be controlled to be within the sensor target range. However, if the measurement result that was measured again by the sensor is not within the sensor target range, the same processing is repeated until the measurement result becomes within the sensor target range.

3) Calibration by Recalculating Influence Coefficient Using the Output Difference Value First, an output value ${}_2Lb_1$ to ${}_2Lb_m$ is calculated by adding the output difference value $\Delta Lb_1$ to $\Delta Lb_m$ calculated by the formula (4) to the output value ${}_1Lb_1$ to ${}_1Lb_m$, and the sensor information value ${}_2Sb_1$ to ${}_2Sb_{nm}$ when the equipment is controlled so as to output the output value ${}_2Lb_1$ to ${}_2Lb_m$ is acquired. Then, the difference value $\Delta Sb_1$ to $\Delta Sb_m$ between the sensor information value and the sensor target value ${}_tSb_1$ to ${}_tSb_n$ will be as follows:

$$\begin{Bmatrix} \Delta Sb_1 \\ \vdots \\ \Delta Sb_n \end{Bmatrix} = \begin{Bmatrix} {}_2Sb_1 - {}_tSb_1 \\ \vdots \\ {}_2Sb_n - {}_tSb_1 \end{Bmatrix} \quad (7)$$

Further, by the same method as the induction of the formula (2), a difference value $\Delta_1Sb_{11}$ to $\Delta_1Sb_{nm}$ of the sensor information value with reference to the sensor information value ${}_1Sb_{11}$ to ${}_1Sb_{nm}$ when output value ${}_2Lb_1$ to ${}_2Lb_m$ of equipment $L_1$ to $L_m$ is sequentially output piece by piece is calculated using the formula (1), and an influence coefficient using the output difference value $\Delta Lb_1$ to $\Delta Lb_m$ is calculated as follows:

$$\begin{bmatrix} {}_1\alpha_1 & \sim & {}_1\alpha_m \\ \wr & & \wr \\ {}_n\alpha_1 & \sim & {}_n\alpha_m \end{bmatrix} = \begin{bmatrix} \Delta_1 Sb_{11}/\Delta Lb_1 & \sim & \Delta_1 Sb_{1m}/\Delta Lb_m \\ \wr & & \wr \\ \Delta_1 Sb_{n1}/\Delta Lb_1 & \sim & {}_1 Sb_{nm}/\Delta Lb_m \end{bmatrix} \quad (5)$$

Here, from the difference value $\Delta Sb_1$ to $\Delta Sb_n$ with reference to the sensor target value, the output value ${}_3Lb_1$ to ${}_3Lb_m$ after calibration is calculated by the following formula:

$$\begin{Bmatrix} {}_3Lb_1 \\ \wr \\ {}_3Lb_m \end{Bmatrix} = \begin{Bmatrix} {}_1Lb_1 \\ \wr \\ {}_1Lb_m \end{Bmatrix} + \begin{bmatrix} \Delta_1 Sb_{11}/\Delta Lb_1 & \sim & \Delta_1 Sb_{1m}/\Delta Lb_m \\ \wr & & \wr \\ \Delta_1 Sb_{n1}/\Delta Lb_1 & \sim & {}_1 Sb_{nm}/\Delta Lb_m \end{bmatrix}^{-1} \begin{Bmatrix} \Delta Sb_1 \\ \wr \\ \Delta Sb_n \end{Bmatrix} \quad (8)$$

By controlling the equipment so as to output the calculated output values ${}_3Lb_1$ to ${}_3Lb_m$, the output value can be controlled to be within the sensor target range. However, if the measurement result that was measured again by the sensor is not within the sensor target range, the same processing is repeated until the measurement result becomes within the sensor target range.

It should be noted that, while, in the above description, an influence coefficient calculation function (1) was calculated, an influence coefficient table may be calculated instead. The influence coefficient table comprises coefficients for calculating the output values of equipment to be controlled with reference to the sensor information of one or a plurality of sensors by the influence coefficient calculation function. In such a case, the output values are calculated using the influence coefficient table and output.

Further, in the above "(3) Calibration by recalculating influence coefficient using the output difference value," a difference influence coefficient table may be calculated instead of calculating a difference influence coefficient calculation function of the formula (5).

The difference influence coefficient table comprises coefficients for calculating difference output values of equipment to be controlled with reference to the sensor difference information of one or a plurality of sensors by the difference influence coefficient calculation function.

It should be noted that, as shown in FIG. 66, when the remote control device that controls equipment by imaging the dot pattern and decoding the dot code is used, the sensor information target range can be set by the paper controller 101. In such a case, in the layout portion 102 of the paper controller 101, icons that specify one or a plurality of sensors are superimposedly printed over the dot pattern. In the controller portion 103, icons that indicate numerical values are superimposedly printed over the dot pattern. A user touches an icon that specifies a sensor with the remote control device and inputs the numerical value of a target range by touching a number icon. As such, a sensor information target range can be easily set for each sensor.

In such a case, the arrangement of equipment to be controlled and the positions of the sensors may be associated with the dot code.

Further, the positions of the sensors may preferably be associated with the coordinate values of the dot codes. In this way, the positions of the sensors can be uniquely specified.

Alternatively, a sensor information target range may be set by a button, a pointer, or a touch panel that is provided on the remote control device, or a sensor information target range and the position of a sensor may be set using a smartphone as the remote control device. It should be noted that, instead of a smartphone, a portable telephone or a tablet PC may also be used as the remote control device.

Figure 67A:
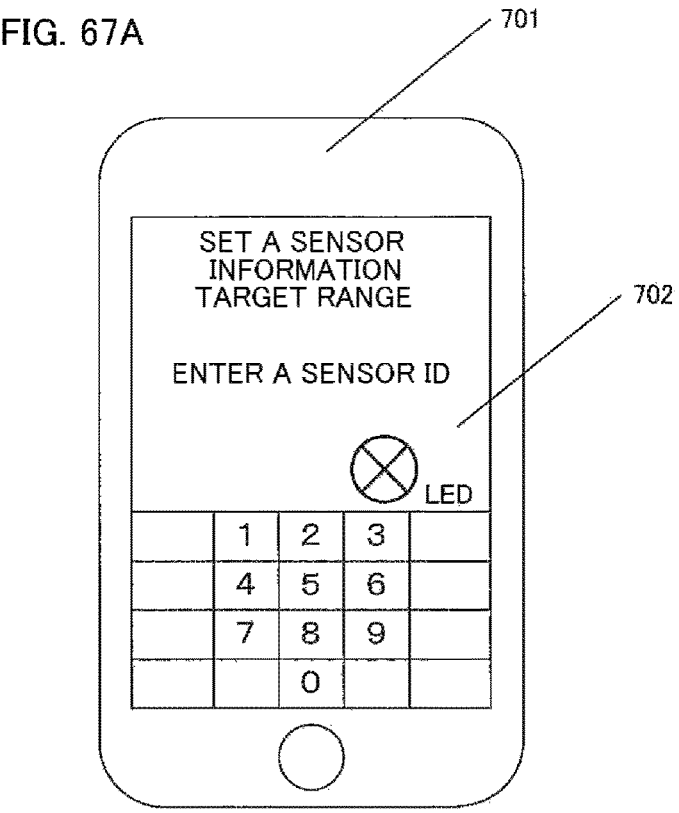
FIGS. 67A and 67B are diagrams for illustrating a case of using a smartphone as a remote controller in a control system using sensors.
Figure 67B:
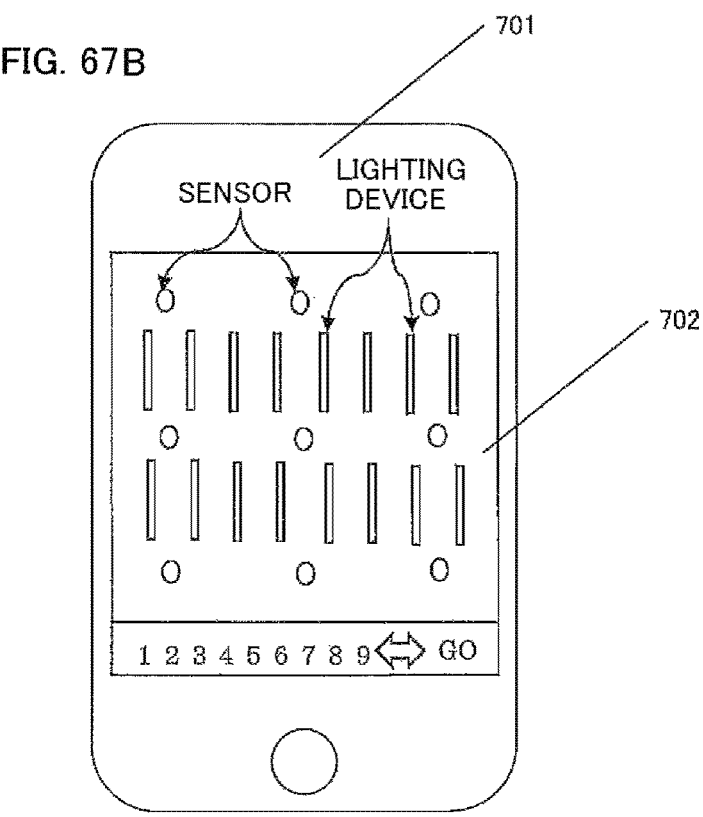

FIGS. 67A and 67B are diagrams showing an example of a case where a smartphone 701 is used as a remote controller.

In FIG. 67A, texts such as "Set a sensor information target range" and "Set a sensor ID" are displayed on the display 702 of the smartphone 701. A user inputs a sensor information target range and an ID of the sensor that is desired to be controlled using the key pad. As such, the sensor information target range of the desired sensor can be set.

In FIG. 67B, a schematic view of sensors and lighting devices is displayed on the display 702 of the smartphone 701. Numbers 0 to 9, an arrow, and a text "GO" are displayed on the lower portion of the screen. A user determines a sensor information target range by the following procedure:

(1) Touch a number to determine the lower limit value of the sensor information target range.
(2) Touch the arrow.
(1) Touch a number to determine the upper limit value of the sensor information target range.
(4) Select a sensor
(5) Touch "GO."

As such, for example, if "24" is input at (1) and "30" is input at (3), the sensor information target range becomes 24 to 30.

In this way, for the touched sensor, the sensor information target range is set from 24 to 30. It should be noted that, while, normally, a sensor and the lighting device of which brightness is to be adjusted are associated in advance, a user may further determine which lighting device to be adjusted by touching the lighting device.

Further, the lower limit value and the upper limit value of a sensor information target range may be determined after selecting a sensor.

It should be noted that the sensors may further include position sensors. The position sensors transmit sensor information that includes the position information of the sensors.

As such, the interface device or the remote control device can detect from which sensor among the arbitrarily arranged sensors the sensor information was transmitted.

INDUSTRIAL APPLICABILITY

The present invention has industrial applicability as an input interface for a facility management system including power distribution equipment, lighting equipment, air-conditioning equipment, ventilating equipment, locking equipment, and audio equipment. However, the industrial applicability of the present invention is not intended to restrict the technical range of the present invention.

DESCRIPTION OF REFERENCE NUMERALS

101 PAPER CONTROLLER
102 LAYOUT PORTION
1021 BOUNDARY
1022 RECTANGULAR AREA
1023 LINE OF MOVEMENT LOCUS OF REMOTE CONTROL DEVICE
103 CONTROLLER PORTION

1031 POWER ON
1032 POWER OFF
1033 LIGHT ADJUSTMENT
201 REMOTE CONTROL DEVICE
301 INTERFACE DEVICE
401 LIGHTING DEVICE
402 CONTROL DEVICE
501 DISPLAY DEVICE
601 SENSOR
701 SMARTPHONE
702 DISPLAY

The invention claimed is:

1. A control system comprising:
an interface device that controls a plurality of pieces of equipment to be controlled based on control information;
a remote control device that transmits the control information based on control operation to the interface device; and
a plurality of sensors that transmit sensor information to the remote control device, wherein
at least two or more sensors of a same type are included among the plurality of sensors,
each of the two or more sensors of the same type is arranged at different positions and transmits sensor information of a same type that is detected from different places of at least two of the plurality of pieces of equipment to be controlled, and
the remote control device is set a sensor information target value and/or a sensor information target range for the two or more of sensors of the same type by at least a predetermined method and includes, in the control information, processing for controlling an output value of the equipment to be controlled by adjusting as necessary the control operation in accordance with predetermined algorithm so that each of the sensor information of the same type detected from the different places belongs within each of the sensor information target range.

2. A control system comprising:
an interface device that controls a plurality of pieces of equipment to be controlled based on control information;
a plurality of sensors that transmit sensor information to the interface device, wherein
at least two or more sensors of a same type are included among the plurality of sensors,
each of the two or more sensors of the same type is arranged at different positions and transmits sensor information of a same type that is detected from different places of at least two of the plurality of pieces of equipment to be controlled, and
the interface device includes, in the control information, processing of the interface device for controlling an output value of the equipment to be controlled by adjusting as necessary a control operation in accordance with predetermined algorithm so that each of the sensor information of the same type detected from the different places belongs within each of a sensor information target range.

3. The control system according to claim 2, further comprising a remote control device, and
wherein the remote control device is set a sensor information target value and/or a sensor information target range for the two or more sensors of the same type by at least a predetermined method and transmits the sensor information target value and/or a sensor information target range to the interface device.

4. The control system according to either claim 1 or 2, wherein
the predetermined algorithm calculates an influence coefficient calculation function or an influence coefficient table for each of the equipment to be controlled for the sensor information of the two or more sensors of the same type, at a predetermined position, that is measured by causing each of the equipment to be controlled to output a predetermined reference output value, outputs again an output value that was calculated using the influence coefficient calculation function or the influence coefficient table for the sensor information target value, and adjusts as necessary the control operation.

5. The control system of claim 3, wherein
in the predetermined algorithm, when
equipment to be controlled is $L_1$ to $L_m$,
an output value of the equipment, $Lb_1$ to $Lb_m$;
a reference output value of the equipment, $_0Lb_1$ to $_0Lb_m$;
an equipment output calculation value for a sensor target value, $_1Lb_1$ to $_1Lb_m$;
a sensor, $S_1$ to $S_n$;
a sensor information value for the output value of the equipment, $Sb_1$ to $Sb_m$;
a sensor target value, $_1Sb_1$ to $_1Sb_n$;
a sensor target range, $_{tmin}Sb_1$ to $_{tmax}Sb_1$, $_{tmin}Sb_n$ to $_{tmax}Sb_n$;
a sensor information value for a reference output, $_0Sb_1$ to $_0Sb_m$;
a sensor information value for the equipment output calculation value, $_1Sb_1$ to $_1Sb_m$; and
a sensor information value upon calculating an influence coefficient, $Sb_{11}$ to $Sb_{nm}$,
the sensor information value $Sb_1$ to $Sb_m$ for the output value of the equipment $Lb_1$ to $Lb_m$ is expressed by a formula (1), $$\begin{Bmatrix} Sb_1 \\ \vdots \\ Sb_m \end{Bmatrix} = \begin{bmatrix} _1\alpha_1 & \sim & _1\alpha_m \\ \vdots & & \vdots \\ _n\alpha_1 & \sim & _n\alpha_m \end{bmatrix} \begin{Bmatrix} Lb_1 \\ \vdots \\ Lb_m \end{Bmatrix} \quad (1)$$

an influence coefficient α is calculated by a formula (2) that is obtained by substituting the influence coefficient calculation sensor information value $_0Sb_{11}$ to $_0Sb_{nm}$, when the equipment $L_1$ to $L_m$ sequentially outputs piece by piece the reference output value $_0Lb_1$ to $_0Lb_m$ of the equipment for the control operation, in the formula (1), $$\begin{bmatrix} _1\alpha_1 & \sim & _1\alpha_m \\ \vdots & & \vdots \\ _n\alpha_1 & \sim & _1\alpha_m \end{bmatrix} = \begin{bmatrix} _0Sb_{11}/_0Lb_1 & \sim & _0Sb_{1m}/_0Lb_m \\ \vdots & & \vdots \\ _0Sb_{n1}/_0Lb_1 & \sim & _0Sb_{nm}/_0Lb_m \end{bmatrix} \quad (2)$$

from the sensor target value $_tSb_1$ to $_tSb_n$, the output value $_1Lb_1$ to $_1Lb_m$ of the equipment is calculated by a formula (3), and $$\begin{Bmatrix} _1Lb_1 \\ \vdots \\ _1Lb_m \end{Bmatrix} = \begin{bmatrix} _0Sb_{11}/_0Lb_1 & \sim & _0Sb_{1m}/_0Lb_m \\ \vdots & & \vdots \\ _0Sb_{n1}/_0Lb_1 & \sim & _0Sb_{nm}/_0Lb_m \end{bmatrix}^{-1} \begin{Bmatrix} _tSb_1 \\ \vdots \\ _tSb_n \end{Bmatrix} \quad (3)$$

the output value $_1Lb_1$ to $_1Lb_m$ is output, thereby controlling the equipment so that the output value becomes within the sensor target range.

6. The control system according to claim 3, wherein the predetermined algorithm determines whether sensor information that the two or more sensors of the same type acquired belongs within the sensor information target range, and, if none of the sensor information belongs to the sensor information target range, outputs again an output value that was calculated by a predetermined calibration calculation, which is repeated until the sensor information that the two or more sensors of the same type acquired belongs within the sensor information target range, thereby adjusting the control operation as necessary.

7. The control system according to claim 6, wherein the calibration calculation calculates, based on a difference value between the sensor information and the predetermined sensor information target value, a difference value of an output value of the equipment to be controlled using the influence coefficient calculation function or the influence coefficient table and outputs again an output value by adding the difference value to the previously output output value.

8. The control system according to claim 6, wherein the calibration calculation acquires an influence coefficient calculation function or an influence coefficient table for each of the equipment to be controlled using the previously output output value as a predetermined reference output value and outputs again an output value that was calculated using the influence coefficient calculation function or the influence coefficient table for the predetermined sensor information target value.

9. The control system according to claim 6, wherein the calibration calculation outputs an output value by adding a predetermined difference reference output value to the previously output output value for each of the equipment to be controlled, measures sensor information at predetermined positions of the two or more sensors of the same type, calculates sensor difference information with reference to the previously measured sensor information, calculates a difference influence coefficient calculation function or a difference influence coefficient table for each of the equipment to be controlled corresponding to the sensor difference information at the predetermined positions of the two or more sensors of the same type, calculates a difference value of the output value of the equipment to be controlled using the difference influence coefficient calculation function or the difference influence coefficient table corresponding to a difference value between the previously measured sensor information and the predetermined sensor information target value, and outputs again an output value by adding the difference value to the previously output output value.

10. The control system according to claim 4, wherein the influence coefficient table comprises a coefficient that is used to calculate the output value of the equipment to be controlled by the influence coefficient calculation function corresponding to the sensor information of a predetermined range from the predetermined positions of the two or more sensors of the same type.

11. The control system according to claim 9, wherein the difference influence coefficient table comprises a coefficient that is used to calculate the difference output value of the equipment to be controlled by the difference influence coefficient calculation function corresponding to the sensor difference information of a predetermined range from predetermined positions of the two or more sensors of the same type.

12. The control system according to either claim 1 or 3, wherein the remote control device is a smartphone, a tablet PC, or a portable telephone.

13. The control system according to either claim 1 or 3, wherein
the remote control device comprises a remote controller body and a paper controller, on which an image and/or a text that clearly indicates control operation of the equipment to be controlled is printed superimposedly over or is printed near a dot pattern in which a dot code that directly or indirectly corresponds to the control operation is encoded,
the remote controller body that, comprising storage means that stores a table that includes a direct or indirect correspondence between a dot code that is encoded in the dot pattern printed on the paper controller and control information that is obtained by coding the control operation of the equipment, images the dot pattern, decodes the dot code, and transmits the control information corresponding to the dot code from the storage means, and
on the paper controller, at least an icon that specifies the two or more sensors of the same type and an icon that indicates a numerical value are superimposedly printed over the dot pattern, the icon is imaged by predetermined operation by the remote controller body, and a sensor information target value and/or a sensor information target range is set by the decoded dot code.

14. The control system according to claim 13, wherein
the paper controller further includes a layout portion, on which, if there are a plurality of pieces of the equipment to be controlled and the equipment is grouped, a layout drawing that indicates the arrangement of the grouped equipment and/or the arrangement of each of the equipment is superimposedly printed over or printed near a dot pattern, in which a dot code that uniquely corresponds to ID information of the grouped equipment and/or each piece of the equipment is encoded, and
the table stored in the storage means includes processing of setting the equipment to be controlled that is directly or indirectly associated with a dot code that is encoded in the dot pattern of the layout portion and control information that includes the ID information of the grouped equipment and/or each of the equipment.

15. The control system according to claim 14, wherein
the dot code printed in the layout portion includes a direct or indirect correspondence with coordinate information,
the remote control device includes processing of imaging a plurality of pieces of dot patterns by operation of tracing the paper controller, decoding coordinate information or coordinate information and code information that is encoded in the plurality of pieces of dot patterns, and setting the equipment to be controlled that is associated with coordinate information or code information on a movement locus by the operation of tracing by the remote control device or within a region enclosed by the movement locus.

16. The control system according to claim 13, wherein
on the paper controller, if there are a plurality of pieces of the equipment to be controlled and the equipment is grouped, an icon that indicates the arrangement of the grouped equipment and/or the arrangement of each of the equipment is superimposedly printed over or is printed near a dot pattern in which a dot code that uniquely corresponds to ID information of the grouped equipment and/or each of the equipment is encoded, and the table stored in the storage means includes a direct or indirect correspondence between a dot code that is encoded in the dot pattern of the icon and control information that includes the ID information of the grouped equipment and/or each of the equipment.

17. The control system according to claim 16, wherein the dot code defines a code value or the code value and coordinate information, the code value is uniquely associated with ID information, and the coordinate information is associated with the arrangement of the icon.

18. The control system according to claim 16, wherein there are a plurality of the layout portions, the dot code defines a code value and coordinate information, the coordinate information is associated with the arrangement of the icon, the code value specifies at least the layout portion, and the icon is uniquely associated with the coordinate value and ID information.

19. The control system according to either claim 1 or 2, wherein the interface device includes processing of specifying the control operation for the equipment to be controlled based on the control information and transmitting the control operation as a control signal to the equipment to be controlled.

20. The control system according to either claim 1 or 2, wherein the equipment to be controlled and/or the interface device has ID information for specifying the equipment.

21. The control system according to either claim 1 or 3, wherein the remote control device further comprises a clock function, the storage means stores a table that includes a direct or indirect correspondence between time and the control information based on the time, and the remote control device includes processing of referencing the table and transmitting the control information based on elapsed time of the clock function.

22. The control system according to either claim 1 or 2, wherein the interface device further comprises a clock function and storage means, the storage means stores a table that includes a direct or indirect correspondence of the control information based on the time of the interface device, and the interface device references the table and controls the equipment to be controlled based on elapsed time of the clock function.

23. The control system according to claim 21, wherein the remote control device comprises a remote controller body and a paper controller, on which an image and/or a text that clearly indicates control operation of the equipment to be controlled is printed superimposedly over or is printed near a dot pattern in which a dot code that directly or indirectly corresponds to the control operation is encoded, the dot code encoded in the dot pattern includes a direct or indirect correspondence for setting the time, and the remote control device images one or a plurality of dot patterns by operation of touching or tracing the paper controller, and sets or updates the table.

24. The control system according to either claim 1 or 3, wherein the remote control device further comprises audio output means and/or audio recognition means, and instructs relating to operation of the remote controller or the processing by an audio guide and/or an audio input relating to the operation of the remote controller or the processing.

25. The control system according to claim 14, wherein the predetermined method images an icon that specifies the two or more sensors of the same type that are superimposedly printed over the dot pattern in the layout portion and an icon that indicates a numerical value that is superimposedly printed over the dot pattern by predetermined operation and sets a sensor information target range by the decoded dot code.

26. The control system according to either claim 1 or 2, wherein the two or more sensors of the same type comprise a position sensor and transmit sensor information that includes position information of the sensors to the remote control device or the interface device.

27. The control system according to either claim 1 or 2, wherein the equipment is lighting equipment, the sensor is an illuminometer, a color-illuminometer, or a luminance meter, a color-luminance meter, and the sensor information is illuminance, color-illuminance, or luminance, color-luminance.

28. The control system according to claim 27, wherein the lighting equipment is LED lighting equipment, the interface device repeats tuning on and off at a predetermined frequency with high speed and controls an LED lighting device that configures the LED lighting equipment at a time interval of lighting.

29. A paper controller used for the control system according to claim 13.

30. A remote control device used for the control system according to either claim 1 or 3.

31. An interface device used for the control system according to either claim 1 or 2.

32. The control system according to claim 3, wherein the received sensor information is transmitted device to the interface device via the remote control.

33. The control system according to either claim 1 or 3, wherein the remote control device comprises a remote controller body and a display device, on which an image and/or a text that clearly indicates control operation of the equipment to be controlled is displayed superimposedly over or is displayed near a dot pattern in which a dot code that directly or indirectly corresponds to the control operation is encoded, the remote controller body that, comprising storage means that stores a table that includes a direct or indirect correspondence between a dot code that is encoded in the dot pattern displayed on the display device and control information that is obtained by coding the control operation of the equipment, images the dot pattern, decodes the dot code, and transmits the control information corresponding to the dot code from the storage means, and on the display device, at least an icon that specifies the two or more sensors of the same type and an icon that indicates a numerical value are superimposedly displayed over the dot pattern, the icon is imaged by predetermined operation by the remote controller body, and a sensor information target value and/or a sensor information target range is set by the decoded dot code.

* * * * *